(12) United States Patent
Biswas

(10) Patent No.: US 8,554,615 B2
(45) Date of Patent: Oct. 8, 2013

(54) CONTEXT-INDUCED WIRELESS NETWORK TRANSPORT FOR CONTENT AND PROFILE INFORMATION

(75) Inventor: Subir Biswas, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 681 days.

(21) Appl. No.: 12/712,075

(22) Filed: Feb. 24, 2010

(65) Prior Publication Data

US 2010/0217660 A1    Aug. 26, 2010

Related U.S. Application Data

(60) Provisional application No. 61/154,792, filed on Feb. 24, 2009.

(51) Int. Cl.
*G06Q 30/00* (2012.01)
(52) U.S. Cl.
USPC .................. 705/14.38; 705/14.39; 705/14.49; 705/14.58; 705/14.64
(58) Field of Classification Search
USPC ....................................................... 705/14.38
See application file for complete search history.

(56) References Cited

U.S. PATENT DOCUMENTS

2005/0064814 A1 *  3/2005  Matsuo et al. ................ 455/41.1
2007/0038516 A1 *  2/2007  Apple et al. ..................... 705/14

OTHER PUBLICATIONS

McLaughlin, "Cheap GPS Cell Phones", PC Magazine, Aug. 8, 2007, found on line at pcmag.com/article2/0,2817,2168366,00.asp.*

Yunck et al., "A History of GPS Sounding", Special Issue for Applications of the Constellation Observing System for Meteorology, Ionosphere and Climate (COSMIC), Journal of Terrestrial, Atmospheric and Oceanic Sciences, Taipei, Taiwan, Oct. 1999, pp. 1-20.*
Quigley, "Ye Old Laptop as a Server", Linux(TM) Journal #164, Dec. 1, 2007, found on line at linuxjournal.com/article/9803.*
Thorpe, "An Intro to Moving Averages: Popular Technical Indicators", AAII Journal, Aug. 1999, American Association of Individual Investors.*
Wingert et al., "CDMA 2000 1xRTT Security Overview", Qualcomm® White Paper, Aug. 2002.*
"TR45.3, Appendix A to IS-54 (Rev. B), Dual-Mode Cellular System Authentication, Message Encryption, Voice Privacy Mask Generation, Shared Secret Data Generation, A-Key Verification, and Test Data", Cryptome Archive, Dec. 13, 1999.*
Fall, Kevin; Varadhan, Kannan; "The *ns* Manual (formerly *ns* Notes and Documentation), The VINT Project"; 2002.

(Continued)

*Primary Examiner* — John G Weiss
*Assistant Examiner* — Scott C Anderson
(74) *Attorney, Agent, or Firm* — Harness, Dickey & Pierce, P.L.C.

(57) ABSTRACT

In accordance with the present invention, context-induced wireless network information and content transport systems and methods are provided. In another aspect of the present application, a system includes first and second mobile devices that store respective interest profiles. A further aspect of the present application provides that wireless point-to-point connections are formed when the first and second mobile devices are in close physical proximity to each other. In another aspect, the mobile devices automatically exchange advertising content between each other based on the respective interest profiles over the wireless point-to-point connections. Yet another aspect employs a content distribution device wirelessly transmitting advertising content to one of the first and second mobile devices when the one of the first and second mobile devices is in close physical proximity to the content distribution device. A method of operating such a wireless network is also provided.

10 Claims, 42 Drawing Sheets

(56) References Cited

OTHER PUBLICATIONS

Costa, Paolo; Musolesi, Mirco; "Socially-aware Routing for Publish-Subscribe in Delay-tolerant Mobile Ad Hoc Networks"; 2008.
Al-Karaki, Jamal N.; Kamal, Ahmed E.; "Routing Techniques in Wireless Sensor Networks: A Survey"; Dec. 2004.
Ioannidis, Stratis; Chaintreau, Augustin; Massoulie, Laurent; "Optimal and Scalable Distribution of Content Updates over a Mobile Social Network"; Apr. 2009.
Lindgren, Anders; Doris, Avril; Schelen, Olov; "MobiHoc Poster: Probabilistic Routing in Intermittently Connected Networks"; Mobile Computing and Communications Review, vol. 7, No. 3; 2003.
Cerf, V. et al.; "Interplanetary Internet (IPN): Architectural Definition"; May 2001.
Pujol, Josep; Toledo, Alberto Lopez; Rodriguez, Pablo; "Fair Routing in Delay Tolerant Networks"; Apr. 2009.
Vahdat, Amin; Becker, David; "Epidemic Routing for Partially-Connected Ad Hoc Networks"; Duke University; Apr. 2000.
Balasubramanian, Aruna; Levine, Brian Neil; Venkataramani, Arun; "DTN Routing as a Resource Allocation Problem"; University of Massachusetts; 2007.
Yoneki, Eiko; Hui, Pan; Crowcroft, Jon; "Distinct Types of Hubs in Human Dynamic Networks"; University of Cambridge; 2008.
Intanagonwiwat, Chalermek; Govindan, Ramesh; Estrin, Deborah; "Directed Diffusion: A Scalable and Robust Communication Paradigm for Sensor Networks"; 2000.
Warthman, Forrest; "Delay-Tolerant Networks (DTNs) A Tutorial" v.1.1; Mar. 5, 2003.
Letaief, Khaled Ben; Zhang, Wei; Cooperative Communications for Cognitive Radio Networks; Proceedings of the IEEE; vol. 97, No. 5; May 2009.
Nosratinia, Arai; Hunter, Todd E.; Hedayat, Ahmadreza; "Cooperative Communication in Wireless Networks"; IEEE Communications Magazine; Oct. 2004.
Hui, Pan; Crowcroft, Jon; Yoneki, Jon; BUBBLE Rap: Social-based Forwarding in Delay Tolerant Networks; 2008.
Akyildiz, Ian F.; Su, Weilian; Sankarasubramaniam, Yogesh; Cayirci, Erdal; Georgia Institute of Technology; "A Survey on Sensor Networks"; IEEE Communications Magazine; Aug. 2002.
Vulkadinovic, Vladimir; Helgason, Olafur Ragnar; Karlsson, Gunnar; "A Mobility Model for Pedestrian Content Distribution"; Mar. 2009.

\* cited by examiner

| One content item [64 bytes] |
|---|

| First Fragment [22 bytes] | Second Fragment [22 bytes] | Third Fragment [20 bytes] |
|---|---|---|

FIG. 12A

| Type declaration [5 bit] | GCI declaration [19 bit] | Content data [152 bit] |
|---|---|---|

FIG. 12B

| Type declaration [5 bit] | GCI declaration [19 bit] | Content data [152 bit] |
|---|---|---|

FIG. 12C

| Type declaration [5 bit] | GCI declaration [19 bit] | Content data [136 bit] |
|---|---|---|

FIG. 12D

| | See Below | Device ID | | Owner ID | | Beacon Sequence # | | Interest Bitmap Vector | | | |
|---|---|---|---|---|---|---|---|---|---|---|---|
| Byte # | 0 | 1 | 2 | 3 | 4 | 5 | 6 | 7 | 8 | 9 | 10 |

| | See Below | See Below | Variable Area | | | | | | | |
|---|---|---|---|---|---|---|---|---|---|---|
| Byte # | 11 | 12 | 13 | 14 | 15 | 16 | 17 | 18 | 19 | 20 | 21 |

| | Variable Area | | | | | |
|---|---|---|---|---|---|---|
| Byte # | 22 | 23 | 24 | 25 | 26 | 27 |

Byte 0

| | Packet Type | | Device Type | | Packets to Follow | | | |
|---|---|---|---|---|---|---|---|---|
| Bit # | 7 | 6 | 5 | 4 | 3 | 2 | 1 | 0 |

Byte 11

| | Number of Requests | | | Number of Offers | | | Owner Type | |
|---|---|---|---|---|---|---|---|---|
| Bit # | 7 | 6 | 5 | 4 | 3 | 2 | 1 | 0 |

Byte 12

| | Date Present | First CGI/Time Information | | | | | | |
|---|---|---|---|---|---|---|---|---|
| Bit # | 7 | 6 | 5 | 4 | 3 | 2 | 1 | 0 |

FIG. 15A

| | See Below | Device ID | | Packet ID | | Data ... | | | | | |
|---|---|---|---|---|---|---|---|---|---|---|---|
| Byte # | 0 | 1 | 2 | 3 | 4 | 5 | 6 | 7 | 8 | 9 | 10 ... |

Byte 0

| | Packet Type | | Device Type | | Number of Fragments | | Current Fragment ID | |
|---|---|---|---|---|---|---|---|---|
| Bit # | 7 | 6 | 5 | 4 | 3 | 2 | 1 | 0 |

FIG. 15B

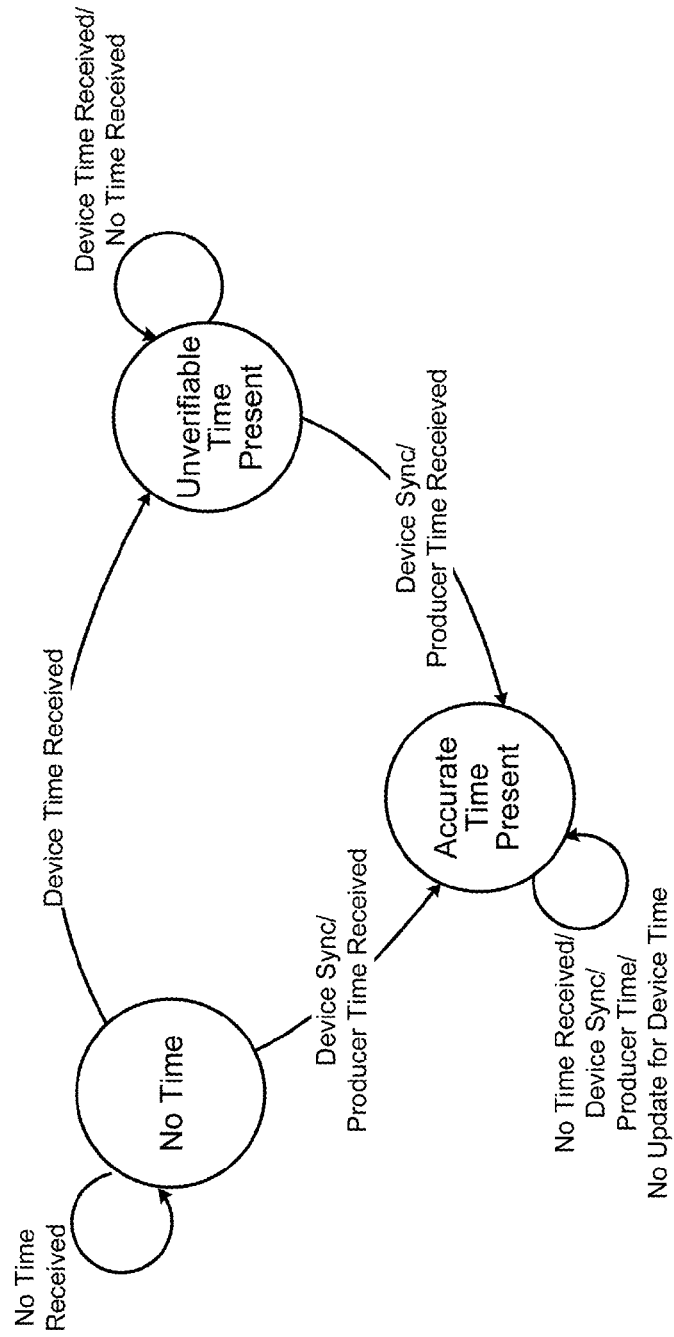

Control Byte

| | Packet Type | | Device Type | | Control packet subtype | | | |
|---|---|---|---|---|---|---|---|---|
| Bit # | 7 | 6 | 5 | 4 | 3 | 2 | 1 | 0 |

FIG. 18A

Subtype 1

| | Control Byte | Producer ID | | Device ID to Check | |
|---|---|---|---|---|---|
| Byte # | 0 | 1 | 2 | 3 | 4 |

FIG. 18B

Subtype 2

| | Control Byte | Device ID Sending | | GCI 1 | | | End of GCI 1, Beginning of GCI 2, ... | | |
|---|---|---|---|---|---|---|---|---|---|
| Byte # | 0 | 1 | 2 | 3 | 4 | 5 | 6 | 7 | ... |

FIG. 18C

Subtype 3

| | Control Byte | Producer ID | | Device ID | | Global Content ID to be sent | | | |
|---|---|---|---|---|---|---|---|---|---|
| Byte # | 0 | 1 | 2 | 3 | 4 | 5 | 6 | 7 | 8 |

FIG. 18D

| Control Byte | Device ID | | Frag. Byte | Packet ID | | Data ... | | |
|---|---|---|---|---|---|---|---|---|
| 0 | 1 | 2 | 3 | 4 | 5 | 6 | 7 | 8 | byte #

FIG. 19A

Byte 3

| | # of fragments | | current fragment # | | reserved | | | |
|---|---|---|---|---|---|---|---|---|
| bit # | 7 | 6 | 5 | 4 | 3 | 2 | 1 | 0 |

FIG. 19B

| Control Byte | Producer ID | | Device ID | | Global Content ID to be deleted | | | |
|---|---|---|---|---|---|---|---|---|
| 0 | 1 | 2 | 3 | 4 | 5 | 6 | 7 | 8 | byte #

FIG. 19C

| Control Byte | Device ID | |
|---|---|---|
| 0 | 1 | 2 | byte #

FIG. 19D

CONTEXT-INDUCED WIRELESS NETWORK TRANSPORT FOR CONTENT AND PROFILE INFORMATION

CROSS-REFERENCE TO RELATED APPLICATIONS

This application claims the benefit of U.S. Provisional Application No. 61/154,792, filed on Feb. 24, 2009. The disclosure of the above application is incorporated herein by reference in its entirety.

FIELD

The present disclosure relates generally to wireless networks and more particularly to context-induced information and content transport in wireless networks.

BACKGROUND

Referring now to FIG. 1, a functional block diagram of exemplary Internet connectivity is shown. A distributed communications system, such as the Internet 102, is connected to by various mobile phone provider networks, such as those shown at 104-1 and 104-2. In addition, Internet service providers, such as Internet service provider 106 connect to the Internet 102.

Mobile devices 108 connect to the mobile phone provider networks 104. Mobile devices 108-1 and 108-2 communicate with the mobile phone provider network 104-1. The mobile devices 108-1 and 108-2 communicate with each other and access the Internet 102 via the mobile phone provider network 104-1. Similarly, mobile devices 108-3, 108-4, and 108-5 communicate with the mobile phone provider network 104-2. The Internet service provider 106 provides connectivity to the Internet 102 for a desktop computer 110 and a laptop computer 112. A wireless access point (not shown) schematically located between the Internet service provider 106 and the laptop 112 provide wireless connectivity to the laptop computer 112.

Content servers 114 provide content, such as hypertext markup language (html) content, image content, video content, audio content, application content, etc. via the Internet 102. The content provided by the content servers 114 includes advertising related content, such as sale announcements, redeemable coupons, advertisements, and event notifications. This content is provided in a unidirectional client-server model, where the content is provided from the content servers 114 to end users via the mobile devices 108 or desktop/laptop computers 110/112.

Referring now to FIG. 2A, an information flow diagram presents a traditional mode of advertising content delivery. Content 200 includes sale announcements 202, coupons 204, advertisements 206, and event notifications 208. The content 200 is provided to print and electronic media 220, which is consumed by a consumer 222. In this traditional mode, the content 200 is published in the print and electronic media 220 without regard to individual characteristics of the consumer 222. For example, an advertisement is placed in a newspaper, which will then be the same for every reader of the newspaper, regardless of their individual interests. As another example, a banner advertisement is displayed at the top of a website. Again, this is not tailored to the individual interests of the consumer 222.

Advertisers infer general characteristics of the consumer 222 based on the categories of information and presentation of the print and electronic media 220. For example, advertisers could place computer advertisements at the top of a webpage dedicated to computer networking. However, no individual characteristics of the consumer 222 are taken into account.

Referring now to FIG. 2B, a more sophisticated example of content delivery according to the prior art is presented. The content 200 is managed by a delivery policy 250. The consumer 222 interacts with the Internet 102 using computers and computer-based mobile devices 252. An online context 254 of the consumer 222 is detected. The online context 254 includes the websites visited by the consumer 222 and the links followed by the consumer 222. The online context 254 is used by the delivery policy 250 to determine what content to provide to the consumer 222. The online context 254 is used to create a consumer profile 256 corresponding to the consumer 222. The delivery policy 250 uses the consumer profile 256 when selecting and distributing the content 200 to the consumer 222.

A physical context 258 of a consumer 222 is also detected with varying accuracy. An Internet protocol (IP) address of the consumer 222 is used to estimate a geographic location of the consumer 222. The physical context 258 is used by the delivery policy 250. In one example, when the online context 254 indicates that the consumer 222 has visited computer-related websites, and the physical context 258 indicates that the consumer 222 is likely in California, the delivery policy 250 uses this information to provide an event notification related to a San Francisco computer show to the consumer 222.

SUMMARY

In accordance with the present invention, context-induced wireless network information and content transport systems and methods are provided. In another aspect of the present application, a system includes first and second mobile devices that store respective interest profiles. A further aspect of the present application provides that wireless point-to-point connections are formed when the first and second mobile devices are in close physical proximity to each other. In another aspect, the mobile devices automatically exchange advertising content between each other based on the respective interest profiles over the wireless point-to-point connections. Yet another aspect employs a content distribution device wirelessly transmitting advertising content to one of the first and second mobile devices when the one of the first and second mobile devices is in close physical proximity to the content distribution device. A method of operating such a wireless network is also provided.

The present disclosure is advantageous over traditional systems because the wireless point-to-point connections of the present application make the network inherently location-aware and context-aware. Further, exchange of advertising content is not limited by server or backbone bandwidth and is not subject to usage or data charges. Additional advantages include the ability to store profiles stored in the mobile devices. These profiles can therefore be used to control content exchange based on user interests. Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIGS. 12A-12D graphically depict the fragmenting of a content item into three fragments;

FIGS. 15A and 15B are exemplary packet structures for beacon packets and data packets, respectively;

FIG. 16A is an exemplary packet structure for conveying time information;

FIG. 16B is an exemplary state diagram for maintaining time information;

FIGS. 18A-18D and 19A-19D are exemplary control packet structures for performing content redemption;

DETAILED DESCRIPTION

Figure 1:
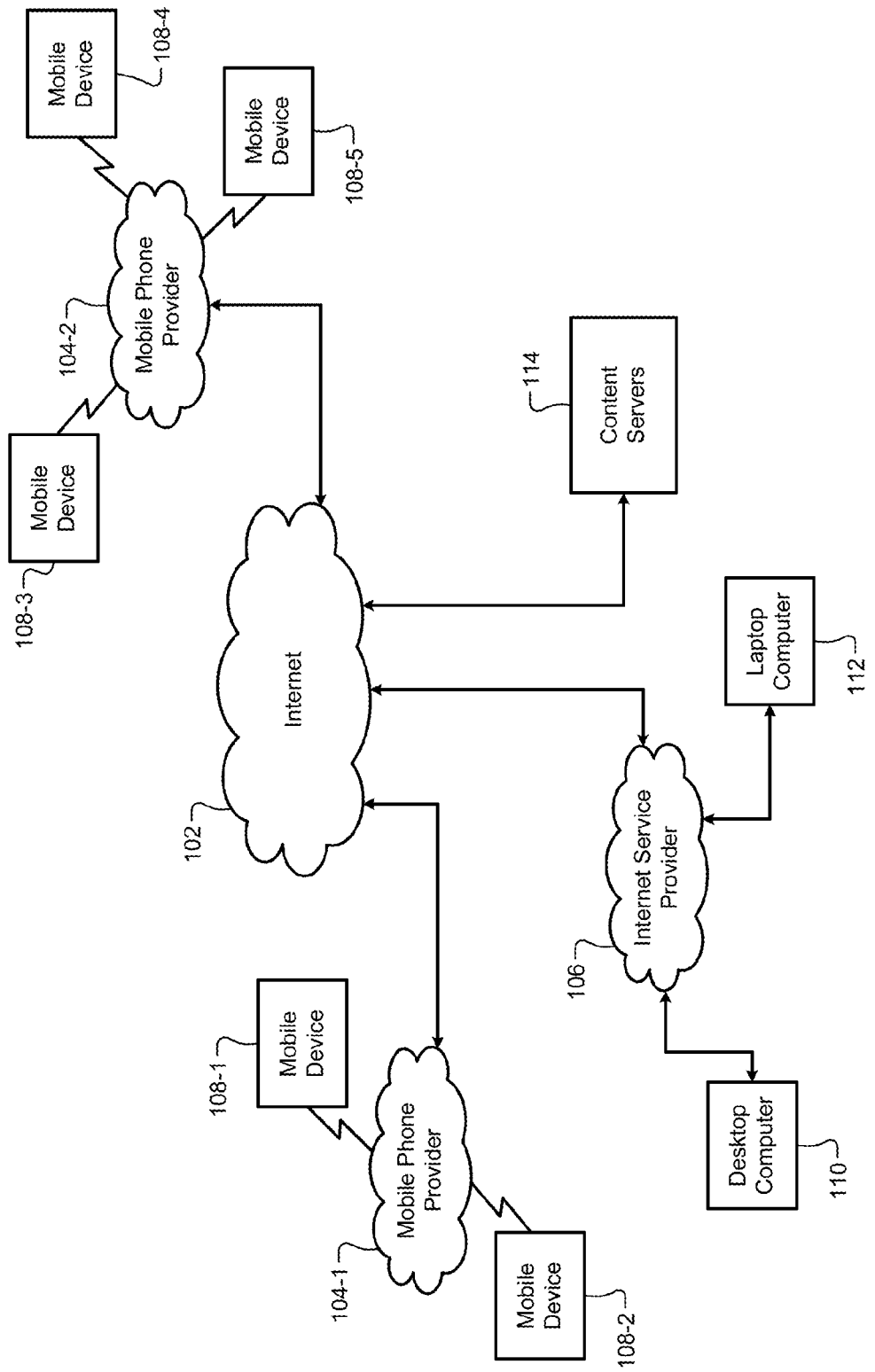
FIG. 1 is a functional block diagram of exemplary Internet connectivity according to the prior art.
Figure 2B:
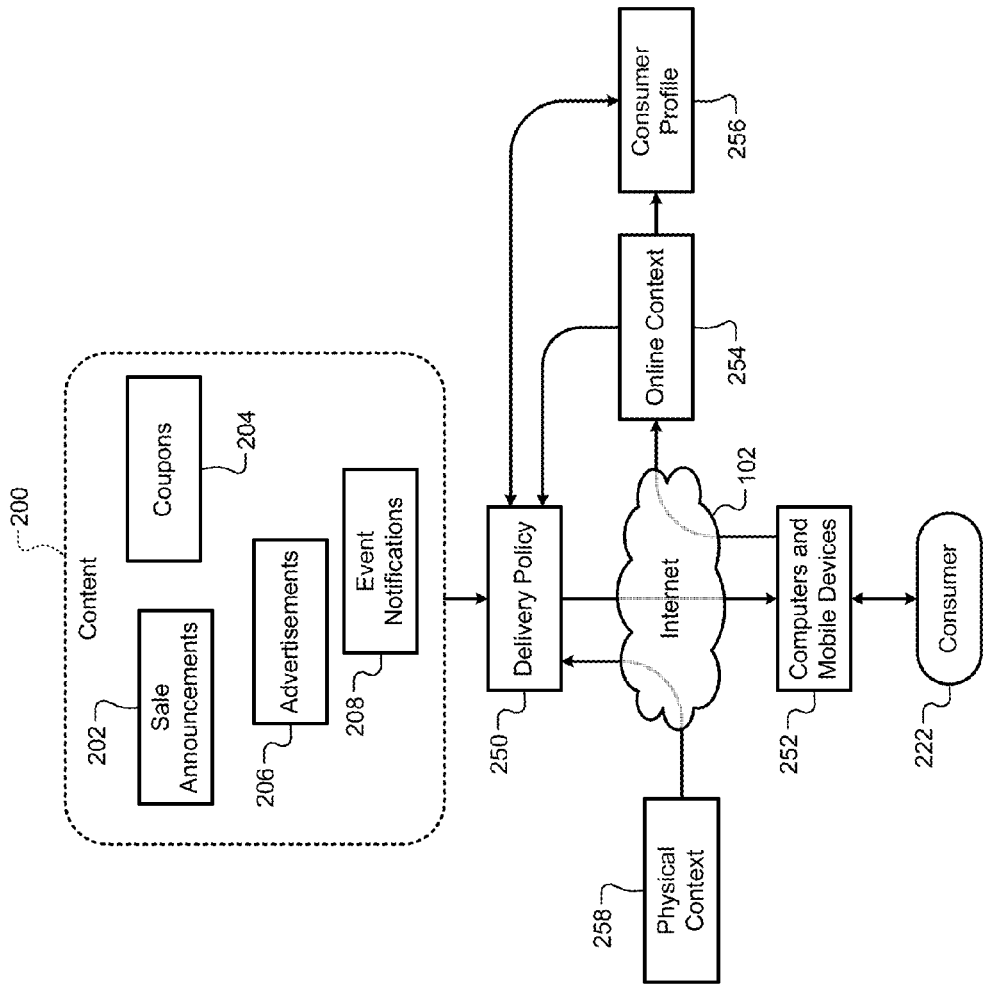
FIG. 2B is an information flow diagram showing a more sophisticated example of content delivery according to the prior art.
Figure 2A:
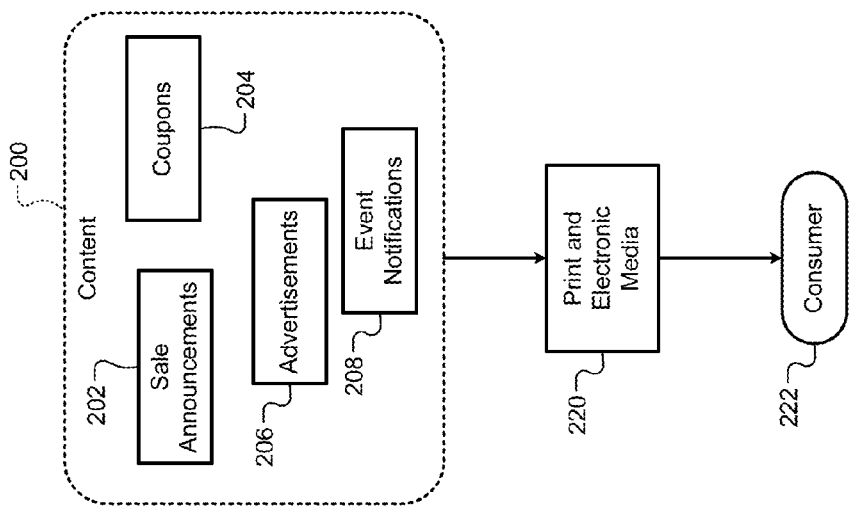
FIG. 2A is an information flow diagram presents a traditional mode of advertising content delivery according to the prior art.

Context-aware content delivery is being actively investigated and implemented by a number of electronic and online advertising delivery companies, such as Google Inc. and Yahoo! Inc. Their Internet-based approaches rely either on voluntary input from the consumer or on tracking web browsing habits to profile consumers' interests for targeted content delivery. These approaches are incomplete in that they are not able to infer a consumer's interest level by observing behavioral context from the consumer's day-to-day activities and inter-personal interaction. Internet-based approaches are not aware of a consumer's community interactions, such as at home, work, gym, malls, restaurants, etc.

When consumers carry mobile devices, such as mobile phones, their location is tracked. The mobile phones determine position using global positioning system (GPS), Wi-Fi hot spot detection, and mobile communications tower triangulation. A database could then be created that maps position to buildings, such as homes, stores, and restaurants. In addition, if date and time information is incorporated into the database, individual events are identified. For example, when a mobile device is located in a stadium at one time, the consumer may be participating in a cheerleading competition. However, at a different time, the consumer may be watching a football game in the same location.

This approach, however, is still limited by the client-server paradigm. Although the locations and attendance records of individual consumers can be analyzed by a server, the social interaction of consumers in close proximity to each other is not being leveraged. Further, any commonality of interests between interacting consumers is difficult to analyze in a client-server model.

By contrast, an ad hoc peer-to-peer networking scheme inherently comprehends social interaction. According to the present disclosure, mobile devices carried by users wirelessly interact with other devices in close proximity. These other devices include mobile devices carried by other users and/or fixed devices, which can be located in, for example, stores, restaurants, public places, and entertainment venues. In various implementations, there is a one-to-one pairing of users and mobile devices. Each mobile device acts as a wireless node that communicates with other wireless nodes over a wireless channel. The nodes may be programmed so that they exchange information automatically unless the devices are turned off. The devices exchange information as they come into proximity with each other. Therefore, in some implementations, even if users do not know each other, their mobile devices may still exchange information.

The mobile device may develop profile information for the associated user based on events the user has attended, places the user has visited, products the user purchased, and stores the user has patronized. These profiles may also be adjusted based on the user's proximity to other users. As the frequency of user interaction increases, the likelihood of similar interests correspondingly increases. Therefore, profile information for one user may be adjusted based on profile information for a second user with whom the first user frequently interacts.

Frequent visits to certain locations or frequent attendance of certain events may also indicate user interests. User interests may control the types of information each node requests and receives. By limiting the information each device receives, the system uses less bandwidth and the user is more likely to receive information of interest. As nodes come into contact with each other, they inform each other of their respective interest profiles and exchange information if there is at least some level of common interest. As nodes move throughout the network, they continue to exchange information with each other, constantly gathering new information and acquiring information from other parts of the network. In this way, information is diffused throughout the entire network based on user interest.

Content, such as sale announcements, coupons, advertisements, and event announcements, is provided to the mobile devices of the users in a variety of ways. This content is provided by wireless devices operated by stores. For example, upon visiting a sporting goods store, the sporting goods store could provide a user's mobile device with a tennis supplies coupon. Based on user profiles, this content is shared with the mobile devices of other users. The mobile devices therefore form a distributed store-and-forward network.

In addition to being an efficient decentralized transport mechanism that does not use server or trunk resources, physical proximity increases the likelihood that distributed content is relevant. In various implementations, coupons could be redeemed at a point of sale so that the user does not have to maintain physical paper coupons. Such systems may achieve simplicity by not providing the user with any direct data input—the point of sale could be used to govern coupon redemption.

While centralized sources generally work well for information that is very immediate and applies to large bodies of people, decentralized distribution generally works well for information that is more specialized, longer lasting, and can be acquired from nodes that publish information to interested users in close proximity. For example, distributing Amber alerts or other security alerts (such as weather alerts) over a decentralized mobile system does not work well because full distribution could take a long time. Further, such alerts are equally applicable to everyone—not just selected interest groups.

Cooperative ad hoc protocols based on interest may be useful in an environment having many low cost sensors that operate with limited amounts of power. For purposes of illustration, the principles of the present disclosure are discussed in the context of advertisements and other similar content distributed to prospective consumers/purchasers. However, the present disclosure is not limited to this context.

For example, in developing countries, villages could be equipped with nodes that inform each other of the types of problems in the respective villages: food or vaccine shortages, textbook needs, disease, etc. Aid workers in the area could then be equipped with a mobile node through which they could exchange information about needs from various areas and efforts at meeting those needs. Aid workers and organizations could employ interest profiles related to the type of work that they perform. For example, a medical aid organization may not receive information regarding the need to drill a well.

Figure 3:
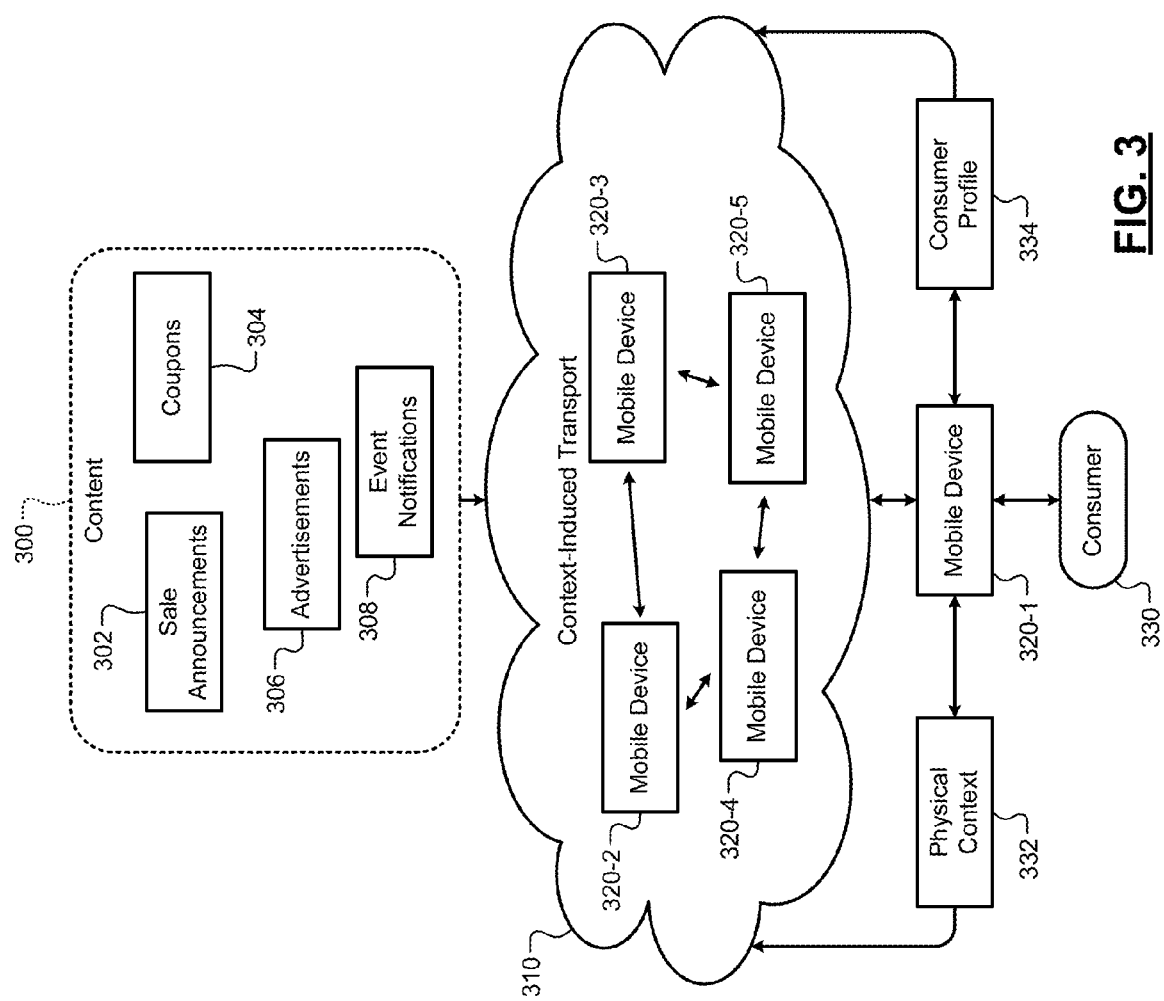
FIG. 3 is an information flow diagram presenting exemplary information flow in a system.

Referring now to FIG. 3, an information flow diagram presents exemplary information flow in a preferred embodiment according to the principles of the present disclosure. Content 300 is generated by content producers. The content 300 includes elements such as sale announcements 302, coupons 304, advertisements 306, and event notifications 308. For purposes of clarity, the same reference numbers will be used in the drawings to identify similar elements.

The content 300 is injected into a context-induced transport network 310. At various times, mobile devices 320 communicate with each other, thereby creating the context-induced transport network 310 which changes with time. A mobile device 320-1 is carried by the consumer 330. The mobile device 320-1 interfaces with other mobile devices, such as mobile devices 320-2, 320-3, 320-4, and 320-5.

There are different approaches to inject new content into the system. One approach is for users to upload content 300 that interests them to their device, such as via a computer interface. Another approach is having a central server that broadcasts new information periodically. The server itself could broadcast the information, or one or more relays remote from the server could broadcast the information. For example, the server could parse different pages from the Internet, sort the information into the different types and prepare the data. Every user that is in range of one of the relays receives the latest news according to the device's interest vector.

Mobile device 320-1 interacts with the other mobile devices 320 based upon their physical proximity. The context-induced transport network 310 is therefore not a fixed entity, but a dynamic location-oriented network. Physical context 332 of the consumer 330 is inherently built into context-induced transport network 310. In a preferred embodiment, the mobile devices 320 are prohibited from creating new content, and thereby restricted to disseminating the content 300 injected into the context-induced transport network 310. A consumer profile 334 is developed for the consumer 330. In the preferred embodiment, the consumer profile 334 is stored in the mobile device 320-1. The mobile device 320-1 exchanges data with other mobile devices 320 through the context-induced transport network 310 based upon the contents of the consumer profile 334 as well as the profiles of the other mobile devices 320.

Figure 4:
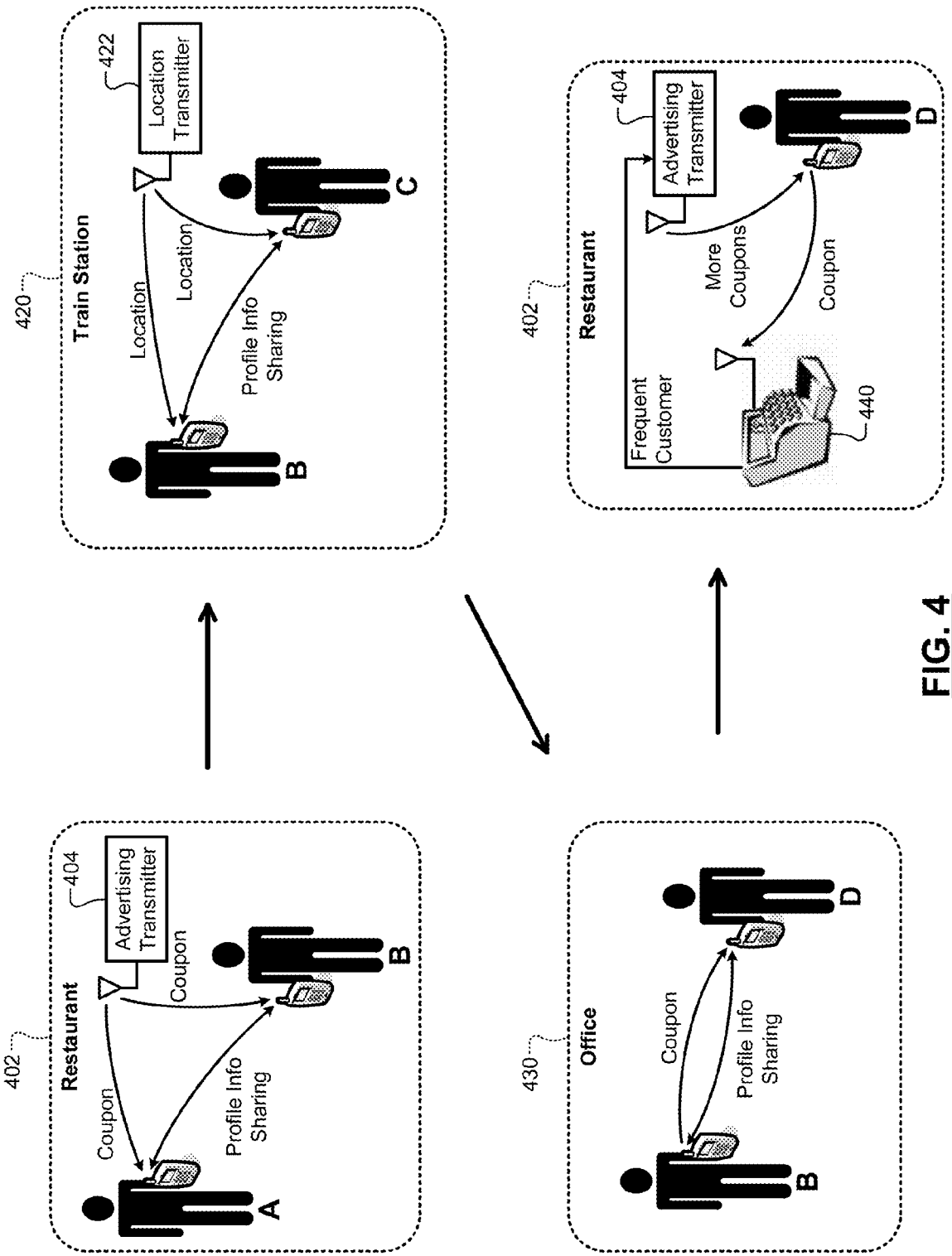
FIG. 4 is a simplified diagrammatic illustration showing exemplary content distribution of a context-induced transport network.

Referring now to FIG. 4, a simplified illustration of exemplary content distribution made possible by the context-induced transport network is shown. A restaurant 402 hosts an advertising transmitter 404. The advertising transmitter 404 stores coupons and advertisements relating to the restaurant 402. In the upper left, Consumer A and Consumer B are shown visiting the restaurant 402. Consumers A and B are each shown holding a mobile device.

Although the mobile device is depicted as a mobile phone, mobile devices according to the present disclosure are not so limited. Mobile devices may be integrated with other devices, such as media players, and mobile devices may be deployed as standalone devices. The mobile devices store profiles for Consumer A and Consumer B, respectively. Each of the mobile devices receives advertisements and coupons from the advertising transmitter 404. In addition, the mobile devices exchange profile information based on their presence in the restaurant 402 and their proximity to each other. The mobile devices may adjust their profiles to reflect their proximity to each other as well as their presence in the restaurant 402.

Consumer B then travels to a train station 420, where consumer C is located. The train station 420 includes a location transmitter 422. The location transmitter 422 transmits location information to the mobile devices of Consumer B and Consumer C indicating that they are located in the train station. The mobile devices of Consumer B and Consumer C share profile information.

Consumer B then arrives at an office 430, where consumer D is located. The mobile devices of Consumer B and Consumer D exchange profile information. The mobile device of Consumer B recognizes a correlation between the profile of Consumer D and the coupon received from the restaurant 402. The mobile device of Consumer B then transmits the coupon to the mobile device of Consumer D.

Consumer D then visits the restaurant 402. The mobile device of Consumer D transmits the restaurant coupon to a cash register 440. The cash register 440 then applies the coupon to the bill of Consumer D. The results of the coupon are displayed on the bill so that Consumer D recognizes the value of the coupon. The mobile device of Consumer D adjusts its profile to reflect usage of the coupon. The cash register 440 records the coupon usage by Consumer D. After a predetermined usage pattern of coupons, the cash register 440 indicates to the advertising transmitter 404 that Consumer D is a frequent customer. The advertising transmitter 404 then transmits additional and more valuable coupons to the mobile device of Consumer D.

Coupons and other content are associated with a variety of parameters, such as replication permissions. Some content is prevented from being forwarded to other consumers. Subscribers can limit loyalty-rewarding content to only the consumer who receives the content. The advertising transmitter 404 creates a log entry that pairs a unique identifier of a consumer with an identifier of a distributed coupon. To prevent fraud, the cash register 440 analyzes the log entries to ensure that the consumer attempting to redeem a coupon is actually the one who received the coupon.

Setting a propagation depth of a coupon to zero prevents the coupon from being transmitted. Setting a propagation depth of a coupon to one allows the original consumer to transmit the coupon to other consumers. The propagation depth is decremented as part of the transmission process. Therefore, for the other consumers, the coupon will have a propagation depth of zero, disallowing any further distribution of the coupon. Setting a propagation count for a coupon limits the number of times the coupon can be transmitted by any single consumer. Content producers mark content with an expiration date. This causes coupons to expire after a predetermined period of time. The mobile devices may delete content automatically when the expiration date has passed. This also allows sale announcements and event notifications to be deleted once the event has passed.

Figure 5:
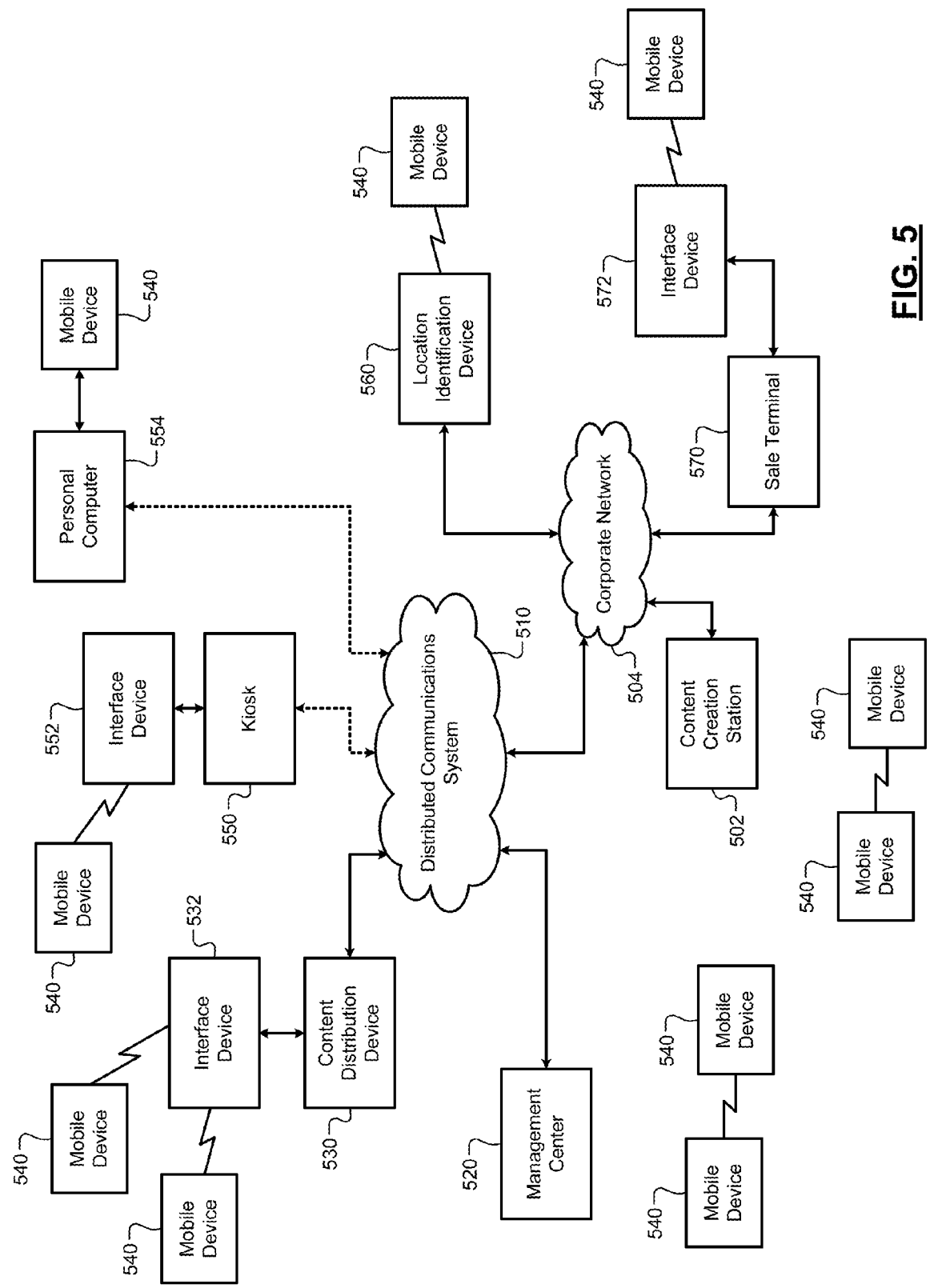
FIG. 5 is a simplified functional block diagram of a system.

Referring now to FIG. 5, a simplified functional block diagram of a system according to the principles of the present disclosure is presented. A content creation station 502 is used to create content for consumers. The content creation station 502 includes software running on a personal computer. The content creation station 502 is associated with a company that operates a corporate network 504. The corporate network 504 is connected to a distributed communications system 510, such as the Internet. Content created by the content creation station 502 is provided to a management center 520.

The management center 520 is operated by a service provider, which manages the context-induced infrastructure. The management center 520 manages distribution of created content, tracks content distribution, and determines billing. Businesses and individuals subscribe to the service provider, which sells or leases other hardware components of the context-induced infrastructure. The management center 520 provides content from the content creation station 502 to a content distribution device 530. The content distribution device 530 is located within a store or a public area. The content distribution device 530 includes or is connected to an interface device 532.

The interface device 532 can wirelessly connect to a mobile device 540. In FIG. 5, various mobile devices 540 are shown. A single mobile device 540 could be connected in each of the configurations shown at various times. Alternatively, multiple mobile devices 540 can be connected simultaneously in the configurations shown. The content distribution device 530, via the interface device 532, provides content for one of the mobile devices 540. In various embodiments, the content distribution device 530 provides all stored content to the mobile device 540. The mobile device 540 then discards content that doesn't match the profile stored within the mobile device 540. Alternatively, the mobile device 540 issues a request for specific content or general types of content.

Alternatively, the content distribution device 530 provides identifying information related to stored content to the mobile device 540. Based on this identifying information, the mobile device 540 can determine which content to request from the content distribution device 530. Further, profile information from the mobile device 540 is provided to the content distribution device 530, which the content distribution device 530 can use to select content for transmission to the mobile device 540.

The content distribution device 530 keeps records of the content distributed and to whom the content was distributed. The content distribution device 530 provides this information to the management center 520. The management center 520 uses the content distribution information for billing purposes. The service provider charges a fee based on the amount of content distributed to consumers. In one embodiment, pennies or fractions of a penny are charged for each piece of a producer's content distributed to a consumer. Charges for content distributed increase when profile information of the consumer to which the content was distributed indicates that the consumer will be more likely to act upon the content.

In the lower left corner of FIG. 5, two pairs of mobile devices 540 are shown establishing wireless communications between each other. The mobile devices 540 exchange content information and profile information. Mobile devices 540 track the amount time they spend in proximity to specific other mobile devices 540. As the amount of interaction increases, the likelihood of commonality of interests rises. Therefore, profile information is more readily adjusted based on other mobile devices 540 with other consumers with whom a given consumer is often associated.

The wireless interaction between the mobile devices 540 occurs without user intervention. In a preferred embodiment, wireless exchange is performed without any notification to the user. This allows consumers to reap the benefits of the mobile devices 540 without having to remember to manually operate them. Consumers interact with the mobile devices 540 using a kiosk 550. The kiosk 550 is included or connected to an interface device 552, which wirelessly communicates with mobile devices 540. A consumer approaches the kiosk 550 in order to interact with the mobile device 540. This allows the mobile devices 540 to be produced with limited input and output features, or with input and output features removed altogether.

A consumer uses the kiosk 550 to browse through content stored in the mobile device 540. The kiosk 550 allows consumers to modify their content and profiles. Various restrictions are placed on these modifications. Some content is not eligible for deletion to ensure that it can be propagated to other consumers. In a preferred embodiment, consumers are restricted in how they adjust their profile. In a preferred embodiment, profile configuration is only allowed when the mobile device 540 is new. This may provide a closer starting point for the profile to converge to the consumer's actual interests, which occurs based on actual purchases, visits, and interactions.

The kiosk 550 communicates with the distributed communications systems 510. The kiosk 550 provides information obtained from the mobile device 540 to the management center 520. This information is used in billing. For example, content producers may be billed based upon how widely their content is disseminated. Consumers may also interface the mobile device 540 to a personal computer 554. The connection between the mobile device 540 and the personal computer 554 is wired or wireless. A wired connection can be made using a universal serial bus (USB) cable. Wireless protocols, such as Bluetooth (Core Specification v2.1+EDR, published Jul. 26, 2007 and Core Specification Addendum 1, published Jun. 26, 2008), ZigBee (IEEE 802.15.4-2006 and 802.15.4a-2007), IEEE 802.11 in ad hoc mode (IEEE 802.11-2007), and/or infrared, may be used.

In various embodiments, software for interfacing with the mobile device 540 is stored within the mobile device 540. The software may appear as a storage volume on the mobile device 540. Therefore, when the mobile device 540 is interfaced to the personal computer 554, software from the mobile device 540 can be executed out of the storage volume. This software can then be used to control the mobile device 540.

To save storage space, the mobile device 540 includes a link to a location where the software can be downloaded. The mobile device 540 also includes code that automatically downloads the software and installs the downloaded software. In an alternative embodiment, software is available for manual download, such as from a website or a file transfer protocol (FTP) server. Through either the kiosk 550 or the personal computer 554, the mobile device 540 acquires additional content. In addition, the kiosk 550 acts as a store-and-forward node by storing content from one mobile device 540 for later delivery to other mobile devices 540.

When the mobile device 540 is brought into a location that does not have a content distribution device, a location identification device 560 can be employed. The location identification device 560 may connect to the corporate network 504 or may be a standalone device. The location identification device 560 provides a name, a category, and/or a unique identifier of the location to the mobile device 540.

In addition, the location identification device 560 indicates an activity currently occurring at that location. For example, in an arena, both sports and music events may take place. For example, the location identification device 560 provides an indication of whether sports or music is currently occurring. Many layers of granularity of this information are possible. Sports could be further specified by the type of sport. In addition, the teams playing can be supplied to the mobile device 540. In a preferred embodiment, the content distribution device 530 includes functionality similar to that of the location identification device 560.

A sale terminal 570 is present where goods and/or services are purchased. For example, products may be purchased and/or admissions fees may be paid. The sale terminal 570 includes or is connected to an interface device 572 that establishes a wireless connection to the mobile device 540. The sale terminal 570 informs the mobile device 540 of the products or services that are being purchased. The sale terminal 570 also receives coupon information from the mobile device 540. In a preferred embodiment, the sale terminal 570 automatically applies coupons. In an alternative embodiment, the sale terminal 570 prompts the consumer as to whether to apply the coupon.

In a preferred embodiment, a sale terminal 570 is connected to the corporate network 504. The sale terminal 570 validates the coupon, such as by querying the management center 520. The sale terminal 570 also provides information about redeemed coupons to the management center 520. Further, devices such as the content distribution device 530, the location identification device 560, and the sale terminal 570 analyzes content stored in the consumers' mobile devices 540 to infer whether that content led the consumer to visit a location or to make a purchase. In a restaurant, the location identification device 560 checks whether mobile devices of consumers visiting the restaurant have received advertisements pertaining to the restaurant. If so, an inference is made that the advertisement affected the consumer's decision to visit the restaurant.

Although FIG. 5 shows only the single corporate network 504, individual corporate networks are present for some or all companies subscribed to the present system. In addition, some locations and/or companies may not have or use a corporate network. The devices of these locations may therefore connect to the management center 520 through other mechanisms, such as through personal networks and/or the distributed communications system 510.

One or more "sink" nodes monitor information from some or all of the other nodes. This monitored information may be routed back to a centralized source for analysis and troubleshooting. For example only, the content distribution device 530 and the sale terminal 570 may store diagnostic information, and periodically transmit this information to the management center 520. The information stored may include everything from which coupons were redeemed to which content items were exchanged between nodes and at what time. This information may be analyzed either in real time or periodically to evaluate the effectiveness of distribution throughout the network.

For example, when a content item is distributed, the distributor may record the type of the content item and a unique identifier of the content item. The distributor may also store the time of distribution and a unique identifier of the node to which the content item was distributed. When a consumer redeems a content item, the point of redemption may record the content type and the unique identifier of the content item. In addition, the point of redemption may record the unique identifier of the consumer and other transaction data, such as amount of money saved as a result of the content item.

Each node may also record, for transmission to the management center 520, statistics regarding operation of the node. For example, each node may store the number of content items transmitted, the number of contents received, and the number of contents requested. These numbers may be periodically transmitted to the management center 520 and then reset. The node may also report the number of neighbors present when the statistics are reported. In addition, the node may report historical neighbor information, such as the average number of neighbors since last reporting.

Figure 6:
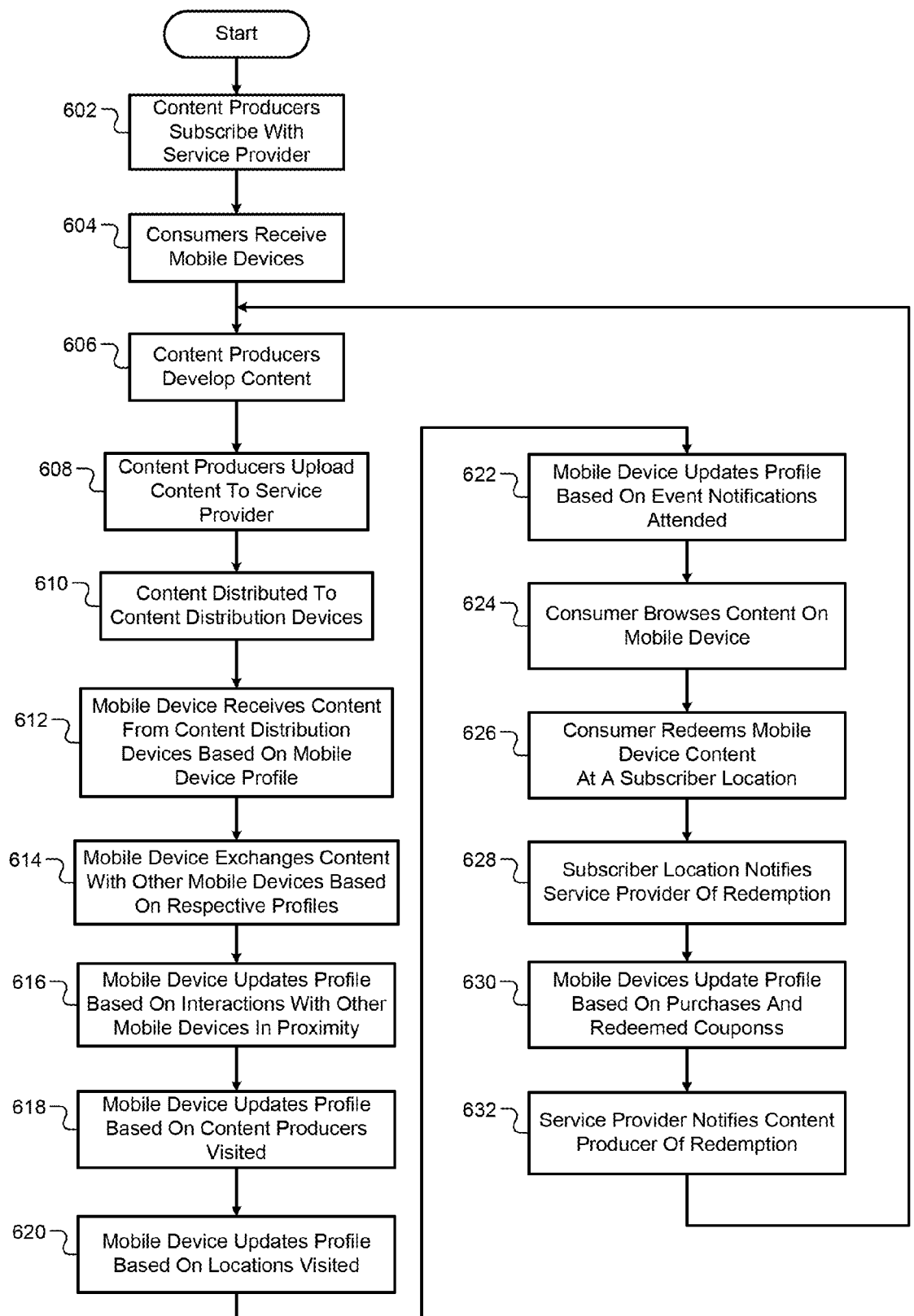
FIG. 6 is a flowchart depicting exemplary steps performed in a system.

Referring now to FIG. 6, a flowchart depicts exemplary control instructions executed by a system according to the principles of the present disclosure. Although the steps of FIG. 6 are shown in a particular order, they can be performed in different orders. Additionally, some steps are performed multiple times or not at all. In step 602, content producers subscribe with a service provider. Control then continues in step 604. However, content producers can continue to subscribe with the service provider. Further, some content producers unsubscribe and are replaced by other content producers.

In addition to content producers, other individuals and businesses subscribe with the service provider. Although these businesses and individuals do not create content, they provide services for the service provider. For example, they may host content distribution devices, location identification devices, and kiosks. In return, the service provider reimburses them, such as by an amount based on content distributed from these devices.

In step 604, users receive mobile devices. Various business models can be implemented to pay for the mobile devices and the fixed devices. According to one business model, mobile devices are provided for free. The cost of the infrastructure, the fixed devices, and the mobile devices is advanced by the service provider. The service provider then recoups these costs over time from subscribers.

As popularity of the mobile devices grows, additional users receive mobile devices. In some markets, the consumers pay for some or all of the cost of the mobile devices they receive. To encourage use, consumers who do not make use of the device are allowed to return the device for distribution to another customer. A service may be provided, such as at a kiosk or personal computer, to clear the profile and/or content of a mobile device in order to transfer it from one consumer to another. Identification checks are performed to prevent multiple people from using coupons from a single mobile device.

In step 606, content producers develop content. As events, sales, and promotions are developed, corresponding content is produced. In step 608, this content is uploaded to the service provider. In step 610, content is distributed to content distribution devices from the service provider. A company distributes its own content to the content distribution devices that it owns. Content items distributed by the subscriber itself are billed by the service provider at a lower rate than those items distributed by other subscribers.

In step 612, a mobile device receives content from various content distribution devices as the mobile device comes into close proximity with those content distribution devices. Content is provided and/or requested based on the mobile device profile. In step 614, a mobile device exchanges content with other mobile devices based on the respective profiles of the mobile devices. In step 616, a mobile device adjusts its profile based on interactions with other mobile devices that are in close proximity to it. The effect of a profile is proportional to the time spent with another mobile device and the places visited with the other mobile device. The duration and frequency of close proximity between two devices is evaluated based on the distance between the devices. The closer the physical proximity, the more likely the consumers associated with the two devices are actually interacting with each other.

Whether two devices are in close proximity is determined by the range limitations of the wireless protocol used. In a preferred embodiment, the output power of the wireless transmitters is limited to establish a predetermined range. When two devices are able to establish a wireless link, they are within that predetermined range, and therefore considered to be in close physical proximity.

Mobile devices have a first predetermined transmission range while fixed devices such as content distribution devices and location identification devices have a longer second predetermined transmission range. In addition, the second predetermined transmission range is adjusted for fixed devices based on their application. Fixed devices can be configured for a store so that they can establish a wireless link with any mobile device in the store. Meanwhile, a shorter range for mobile devices reduces the chances that widely-separated strangers will be considered to be associating with each other.

In step 618, the mobile device adjusts its profile based on content producers visited. In step 620, the mobile device adjusts its profile based on locations visited. In step 622, the mobile device adjusts its profile based on events attended. In step 624, a consumer browses content on the mobile device. This occurs on the device itself, or on a kiosk or personal computer. In step 626, a consumer redeems mobile device content at a subscriber location. This includes using a coupon to make a purchase. Additionally, redemption includes attending an event that has been promoted or visiting a location for which content has been generated. A comparison is performed to see if content corresponding to a given location or event has actually reached this particular mobile device. If not, the inference of the content influencing the consumer's behavior is weaker, although not necessarily impossible. The consumer may have heard of the event from another consumer who did receive the content.

In step 628, the subscriber location notifies the service provider of the redemption. In step 630, the mobile device adjusts its profile based on purchases made, whether or not coupons or other content were redeemed. In addition, the profile is further adjusted based upon the redeemed content. In step 632, the service provider notifies the content producer of the redemption. In addition, the content producer is charged based upon that redemption.

Figure 7A:
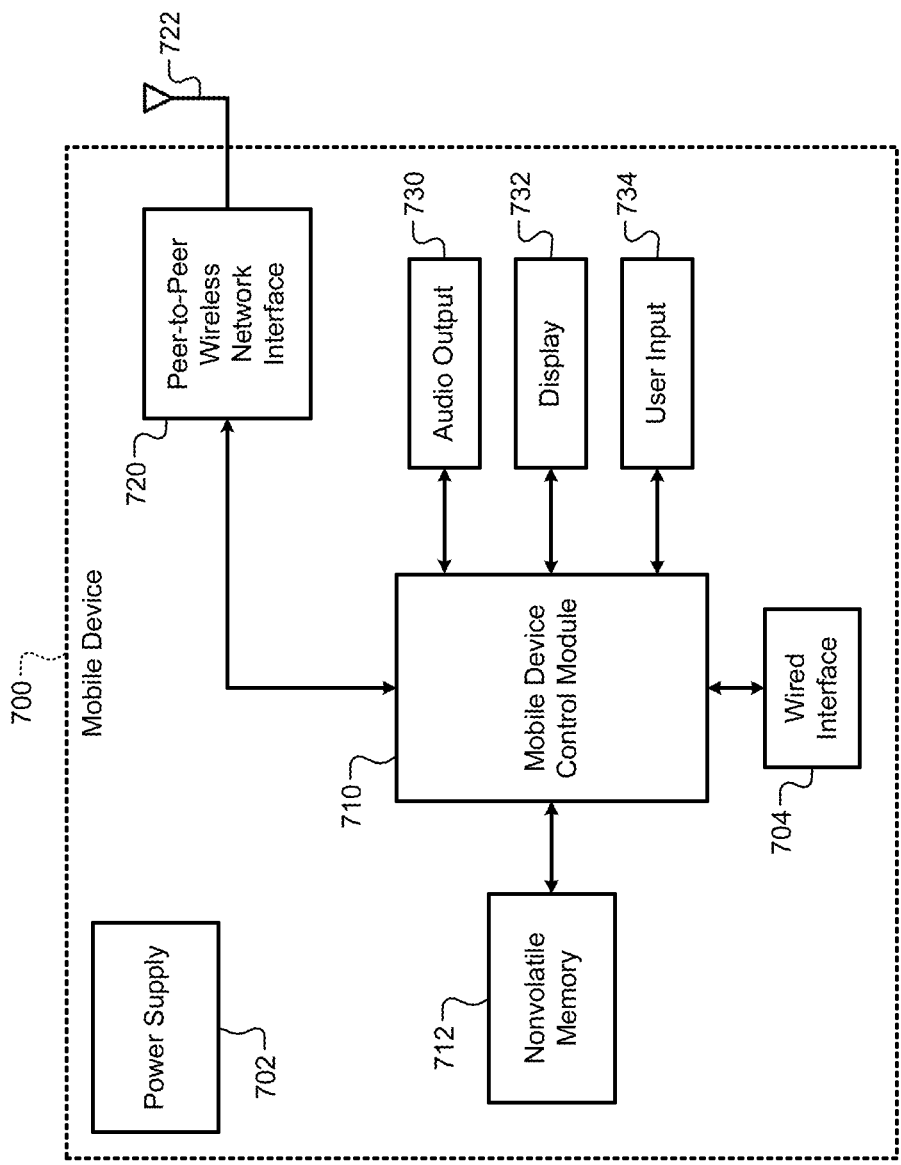
FIG. 7A is a functional block diagram of an exemplary implementation of a mobile device.

Referring now to FIG. 7A, a functional block diagram of an exemplary implementation of mobile device 700 is presented. The mobile device 700 includes a portable power supply 702, such as a battery. The power supply 702 provides power to the remaining components of the mobile device 700. In a preferred embodiment, the mobile device 700 is periodically charged, such as when connected to a computer via a wired connection. Charging power is received through a wired interface 704.

In a preferred embodiment, the wired interface 704 includes a universal serial bus (USB) controller. In one embodiment, the mobile device 700 includes a male USB connector to allow the mobile device 700 to be plugged directly into a female USB port on a computer. Additionally or alternatively, the wired interface 704 may include a female USB connector, whereby the mobile device 700 can be connected to the computer using a USB cable. The USB connectors are standard-, mini-, or micro-sized. The wired interface 704 also allows data to be transferred between a mobile device control module 710 and a computer.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. Examples of suitable memory include read-only memory (ROM), programmable ROM (PROM), electronically-erasable PROM (EEPROM), dynamic random access memory (DRAM), synchronous DRAM (SDRAM), flash memory (including NAND and NOR flash memory), phase change memory, magnetic RAM, and multi-state memory (in which each memory cell has more than two states).

In a preferred embodiment, the mobile device control module 710 executes code from a nonvolatile memory 712. The mobile device control module 710 also stores profile information and content information in the nonvolatile memory 712. The mobile device control module is connected to a peer-to-peer wireless network interface 720. The peer-to-peer wireless network interface 720 establishes a peer-to-peer wireless connection with other mobile devices. The peer-to-peer wireless network interface 720 uses an antenna, such as an external antenna 722.

The peer-to-peer wireless network interface 720 implements one or more wireless protocols, such as Bluetooth, ZigBee, and/or IEEE 802.11 in an ad hoc mode. In a preferred embodiment, the peer-to-peer wireless network interface 720 periodically broadcasts a beacon signal indicating its presence to other devices. In a preferred embodiment, the beacon signal includes a unique identifier of the mobile device 700.

The mobile device 700 may include an audio output 730, a display 732, and a user input 734. In a preferred embodiment, to extend battery life, some or all of these components may be limited in functionality, operated only periodically, or removed altogether. The display 732 may include a single light emitting diode (LED) which may blink to indicate a low battery state or a functional battery state. The user input 734 may include a single button, which indicates to the mobile device control module 710 that some action should be performed. When making a purchase, a consumer may activate the user input 734, thereby instructing the mobile device control module 710 to send and/or accept certain signals to/from the point of sale terminal.

The functionality of the mobile device 700 may be included in a mobile phone. The mobile phone includes an additional wireless interface that communicates with mobile communications towers. Other functionality, such as the power supply 702, the wired interface 704, the nonvolatile memory 712, the audio output 730, the display 732, and the user input 734 can be incorporated into components of a mobile phone well known to those of skill in the art. As an example, the display 732 is superseded by the mobile phone display, which can be used to browse content stored in the nonvolatile memory 712.

Figure 7B:
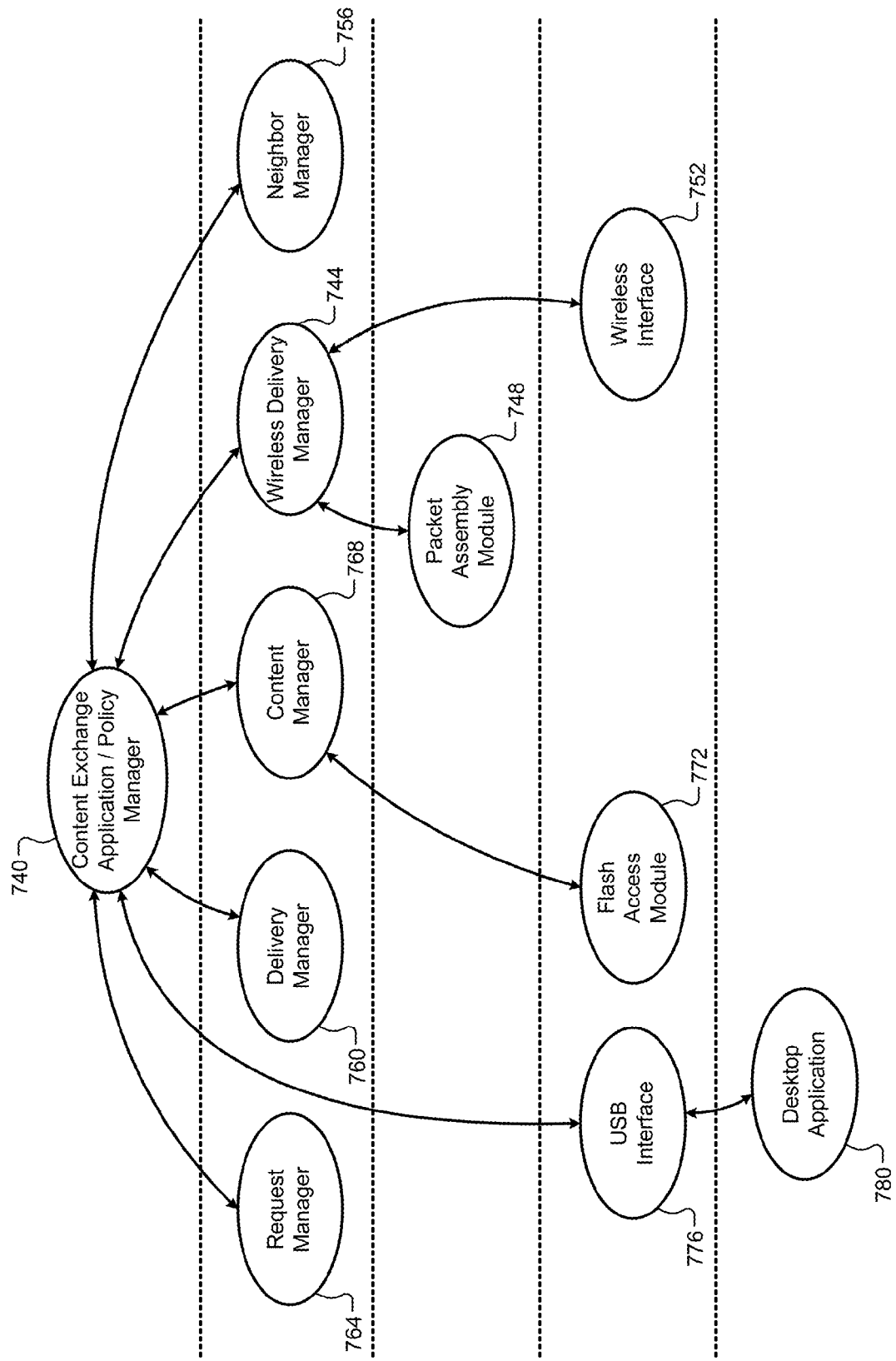
FIG. 7B is a functional block diagram of exemplary functional units of the mobile device of FIG. 7A.

Referring now to FIG. 7B, functional units of the mobile device 700 of FIG. 7A are presented. In various implementations, these functional units may be implemented by the mobile device control module 710 of FIG. 7A. A content exchange application/policy manager 740 coordinates communication with other entities, including other wireless nodes.

The content exchange application 740 may manage information specifying the consumer's interests. This information may be transmitted as a part of a periodic beacon by a wireless delivery manager 744. The wireless delivery manager 744 may use a packet assembly module 748 to assemble packets according to the present disclosure. For example only, the packet assembly module 748 may split blocks of information into fragments based on the packet size currently in use in the network. In addition, the packet assembly module 748 may piece together received fragments.

The wireless delivery manager 744 transmits packets, including beacon packets, using a wireless interface module 758. In various implementations, the wireless interface 758 provides a layer of abstraction between the wireless delivery manager 744 and the peer-to-peer wireless network interface 720 of the FIG. 7A. When beacons are received from other nodes, the content exchange application 740 may inform a neighbor manager 756, which tracks current and recent neighbors encountered by the wireless node.

When a neighbor indicates an interest in a particular type of content, a delivery manager 760 may determine whether any content items of that type are stored on the node. If so, the delivery manager 760 may create an offer message to offer those content items. Similarly, if another node transmits an offer, a request manager 764 may determine whether any of the content items offered are of interest to the node. If so, the request manager 764 may transmit a request requesting the content items of interest. The delivery manager 760 may also be responsible for transmitting items requested by other nodes and receiving content items transmitted by other nodes.

A content manager 768 stores content items in memory using a flash access module 772. Although flash storage is specified for purposes of illustration only, any nonvolatile storage can be used. In various implementations, the flash access module 772 may serve as an abstraction layer to the nonvolatile memory 712 of FIG. 7A. The content manager 768 may create a table using the flash access module 772, where the table includes unique identifiers of content items as well as indications of the type of the content items. In addition, the content manager 768 may track information about each content item, such as when it was received, when it was last transmitted, how many times it has been requested, how many times it has been offered, and whether it has been redeemed.

A universal serial bus (USB) interface 776 allows interaction with the mobile device by a desktop application 780. The desktop application 780 is executed on a computing device separate from the wireless node. For example only, the desktop application 780 may be executed on a computer, a smart-phone, and/or a convergence device, such as a television set-top box. The desktop application 780 may be stored by the mobile device and transmitted to the host prior to execution of the desktop application 780.

Information exchange is done using atomic pieces of information called content items (also called "contents" in shorthand). All content items in the system may be identified using a globally-unique global content identifier (GCID) and a content type (CT). In various implementations, there are 32 distinct content types, which can be represented using 5 binary digits (i.e., the CT is 5 bits long). In various implementations, GCIDs are 20 bits long, allowing approximately 1 million (actually, $2^{20}$) different content items to exist. In such implemenations, a CT/GCID pair is 25 bits long. A three dimensional array may be implemented for content storage—the first dimension describes the content type, the second dimension describes the GCID, and the last dimension stores the data of the content item.

Each content item may be composed of various metadata, which may include the CT/GCID pair, and a fixed size data payload. In various implementations, the total size of a content item is 64 bytes, and the fixed size data payload is 52 bytes. To bypass the size restriction, the data payload may include a reference to an external resource, such as an HTTP link. Alternatively, a compact character encoding can be used, such as a six-bit reduced ASCII encoding.

In addition to the CT/GCID pair, the metadata may include a date of origin, a days to live field, a replicable count (how many times the data can be retransmitted to another user), a flag that dictates whether the content is "redeemable," a bar code, and a hop count. The date of origin may be specified in number of days since a predetermined epoch (such as Jan. 1, 2009) and/or in number of seconds since midnight on the specified day.

To store the content in nonvolatile memory, a flash file system may be used. The file system is partitioned into fixed size blocks corresponding to the defined size of content items. A table maps physical flash blocks to each content item. Each content item is therefore assigned a local content identifier (LCI), which is simply a mask of the top bits of the flash address. To delete all content items, this table can simply be discarded and written clean. In an exemplary implementation, the flash memory may store a maximum of 62 content items, exhibit a read time of 1 second per content item, exhibit a write time of 3 seconds per content item, and a clear time for all contents of 1 second.

Figure 8:
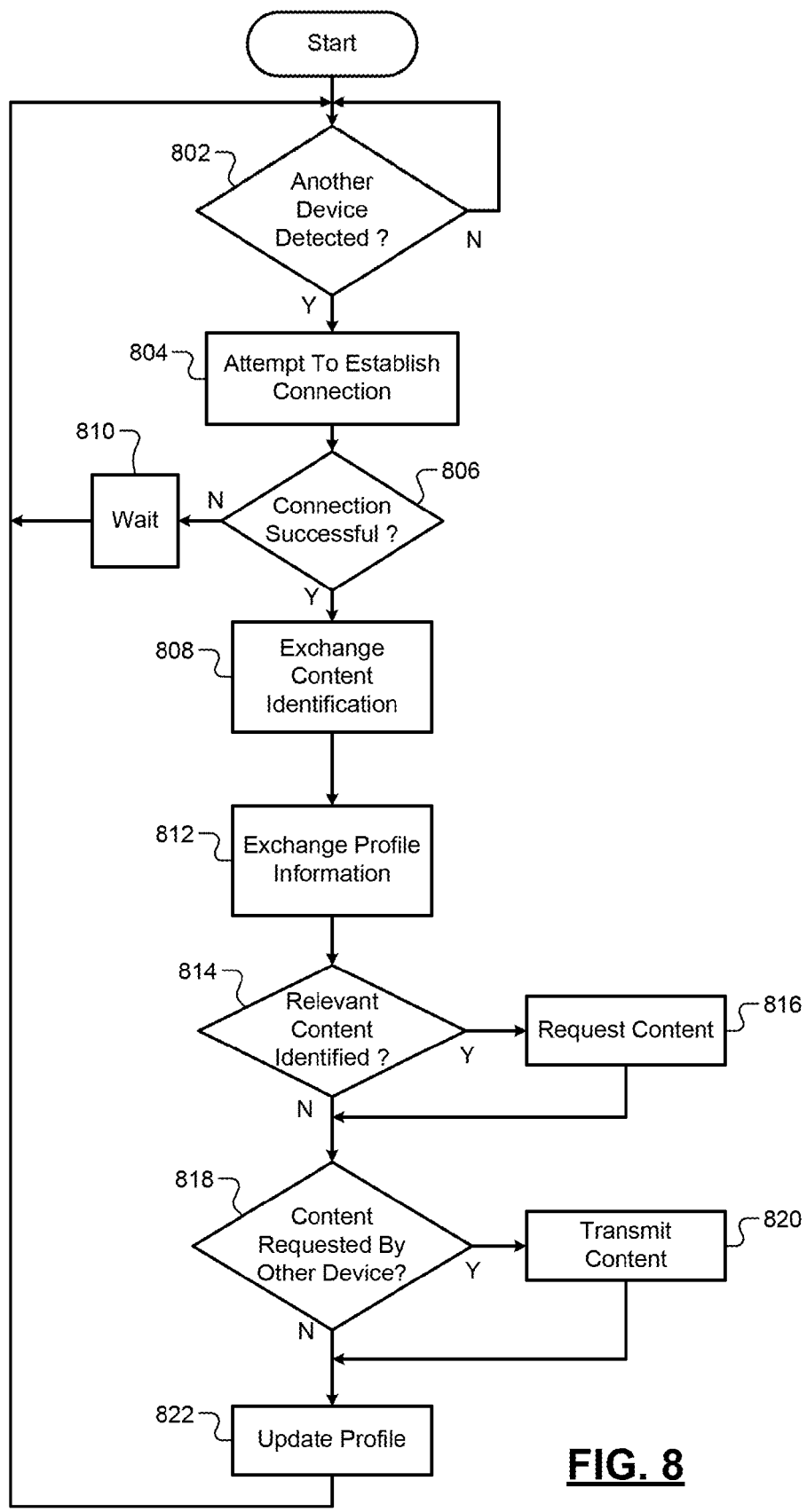
FIG. 8 is a simplified flowchart depicting exemplary steps performed by a mobile device.

Referring now to FIG. 8, a simplified flowchart depicts exemplary control instructions executed by a mobile device according to the principles of the present disclosure. In step 802, the mobile device determines whether another device has been detected. If so, control transfers to step 804; otherwise, control remains in step 802. Other devices include other mobile devices as well as content distribution devices, location identification devices, and kiosks. Their presence is identified based on a beacon they periodically transmit. Alternatively, other devices are identified based on responses to signals broadcast by the mobile device.

In step 804, control attempts to establish a connection to the detected device. In a preferred embodiment, prior to or during establishing the connection, control determines if a connection has recently been established with the detected device. A list of the unique identifiers for recent connections is maintained. If the unique identifier of the detected device is located in the list, control terminates the connection. This prevents devices that remain in close proximity from repeatedly connecting and exchanging information.

In step 806, control determines whether the connection is successful. If so, control transfers to step 808; otherwise, control transfers to step 810. In step 810, control waits for a predetermined period of time before returning to step 802. This predetermined amount of time enhances battery life by preventing multiple failed connection attempts in a row. In addition, the predetermined period of time is sufficient to allow the detected device to end a previous connection and become ready for a new connection. In step 808, control exchanges content identification information with the other device. Assuming that content identification is exchanged in step 808, control continues in step 812, where profile information is exchanged. Control then continues in step 814.

Content identification information is defined at varying levels of granularity. For example, content may be identified by its generation date, its expiration date, the type of content (such as coupon or event announcement), the category of good or service the content relates to, etc. Profile information, meanwhile, represents not just the content of a mobile device, but the historical usage and exposure of the mobile device. The profile therefore indicates, for example, whether the consumer frequently shops at sporting goods stores or often eats at a certain restaurant.

When profile information is exchanged in step 812, identifying information is restricted. Broad categories of information are shared, such as that the consumers frequent Italian restaurants. Limits on profile information exchanged in step 812 can allay privacy concerns regarding the information collected. In step 814, control determines whether content offered by the other device is relevant. If so, control transfers to step 816; otherwise, control transfers to step 818. In step 816, control requests the content and continues in step 818. If content has been requested by the other device, control transfers to step 820, where the content is transmitted. Control then continues in step 822. In step 822, the mobile device profile is adjusted based on content exchanged as well as profile information exchanged. Part of the profile reflects the frequency and duration of interaction with the other device. As these metrics increase, indicating closer association, the degree of profile adaptation in response to profile information of the other device increases. Control then returns to step 802.

Figure 9:
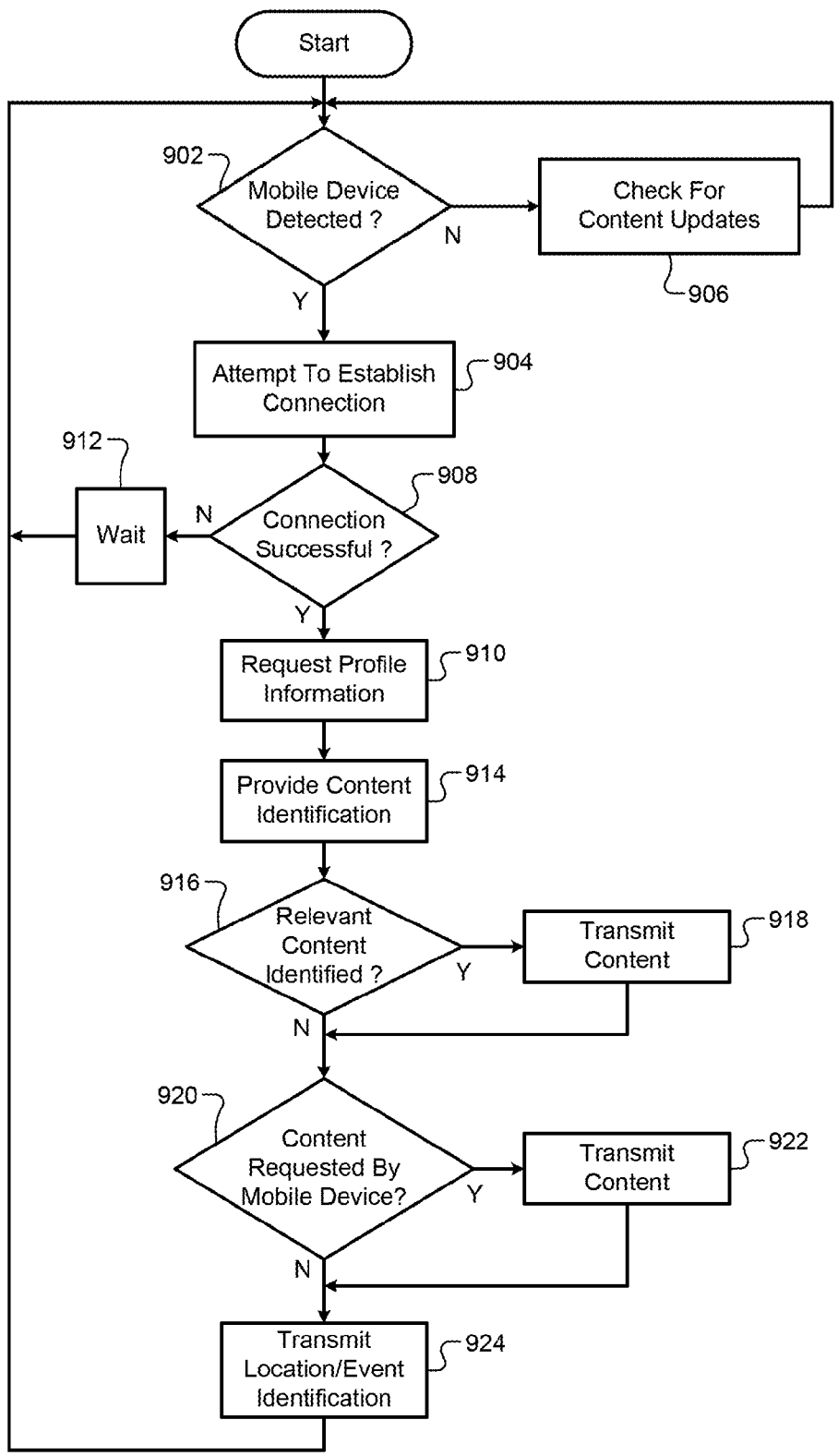
FIG. 9 is a flowchart depicting exemplary steps performed by a content distribution device.

Referring now to FIG. 9, a flowchart depicts exemplary control instructions executed by a content distribution device. In step 902, control determines whether a mobile device is detected. If so, control transfers to step 904; otherwise, control transfers to step 906. In step 906, the content distribution device checks for content updates.

Additional content is downloaded to the content distribution device. In addition, content that has expired or is close to expiring is removed. Checking for content is performed at periodic intervals, such as daily. Control then returns to step 902. In step 904, control attempts to establish a connection to the detected mobile device. In step 908, if the connection is successful, control transfers to step 910; otherwise, control transfers to step 912. In step 912, control waits and then returns to step 902.

In step 910, control requests profile information from the mobile device. In step 914, control provides content identification information to the mobile device. The content identification provided is based on profile information received in step 910. In step 916, control determines whether relevant content is present based on the profile information. If so, control transfers to step 918; where the relevant content is transmitted to the mobile device; otherwise, control transfers to step 920.

In step 920, control determines whether content has been requested by the mobile device. If so, control transfers to step 922, where the content is transmitted; otherwise, control transfers to step 924. In step 924, control transmits identification information relating to present location and/or active event to the mobile device. Control provides the name of the present location as well as a unique identifier of the present location. In addition, control provides an indication of any ongoing events at this location. For example, an event includes a concert, a sporting event, a sale, and/or an in-store promotional event. Control then returns to step 902.

Users of mobile devices may have online presences, such as on social networking websites. For example only, a user may have a profile and pictures posted on a social networking website. The user may identify other users of the social networking website as friends or colleagues. In addition, the user may interact with the other users, such as sending and receiving messages, participating in discussions (such as real-time chats and asynchronous mailing lists, forums, and comment threads), and posting information to the other users' public and private spaces.

The user's mobile device interfaces with the social networking website. The mobile device may include an application for the social networking website, such as when the mobile device includes smart phone functionality. Alternatively, the mobile device connects to the social networking website through an intermediary, such as the user's computer. As described above, the mobile device may connect to the user's computer using wireless or wired protocols, such as USB.

The mobile device determines how closely related the user is to other users of the mobile device. The mobile device may limit its analysis to those other users who are identified as friends/colleagues by the user and who also have mobile devices. The mobile device can analyze factors such as number of messages exchanged with other users, amount of posted content (such as pictures) from user to the other, and number of pictures sharing tags indicating the depiction of both users.

The mobile device can transmit profile data to other users who are sufficiently related to the mobile device's user. In addition, the mobile device may receive profile data from the other users. Based on profile data, the mobile device may upload and/or download content, such as advertising content. The transfer of profile and content information may be performed via the social networking website or may be performed through a side channel, such as a tunnel. In one embodiment, the transfer is performed asynchronously, with uploads stored by the social networking website until the intended recipient next connects to the social networking website and downloads the information.

The mobile device may adjust its profile information based upon online profiles and purchasing history. In a preferred embodiment, Internet transactions involving the user are tracked by the mobile device. Further, coupons from the mobile device are applied to Internet transactions. Internet websites may also provide advertising content to the mobile device. The advertising content may be selected or generated based both on the user's online profile and purchase history and the profile stored by the mobile device.

One of the goals of the present disclosure is to minimize the time it takes to diffuse content items throughout the network. Two different diffusion times may be defined. A local diffusion time may be defined as the time it takes to diffuse selected content items from node i to node i+1—i.e., an exchange between two neighbors. A global diffusion time (t) may be defined as the time it takes for all content to be diffused according to user's interests. In other words, after time τ, content has reached a saturated status: content items are no longer being exchanged anywhere in the network. Another goal of the system may be to maximize throughput, minimizing wasted bandwidth. Diffusion time and throughput may be related because transmitting content more quickly increases throughput and minimizes diffusion time.

Interest-based sensor data collection and routing may be explored using a technique known as directed diffusion, an approach inspired by ant-based routing and gradient-based routing. While directed diffusion works well for routing interest-based information through a network, it may not work well in networks with a topology that changes quickly and/or significantly.

Routing in shifting mobile networks is called delay tolerant networking, and encompasses efforts such as the Interplanetary Internet. While systems such as the Interplanetary Internet sit at a very high networking layer (above a fixed network stack such as TCP/IP), a system according to the present disclosure can be incorporated at a number of different layers. In various implementations, the system is implemented just above the MAC layer, and therefore does not rely on TCP/IP.

While various research has investigated sending specified information from one node to another specified node through a network having high delay and variability, the present disclosure does not attempt to route information to any specific node. Instead, the goal is to disseminate the information to all interested parties, the identities of which are generally not known. Systems that disseminate information to interested parties may be called publish-subscribe systems.

An example of routing in delay tolerant networks is epidemic routing, where a message is delivered to all nodes encountered until the destination node is found. While this protocol minimizes delivery latency, the cost may be prohibitive for sizable networks. One improvement is to use a hop count sent along with each message. Every time the message is routed through another hop, the hop count is decremented. A message with a hop count of one will only be delivered to the destination node. While this hop count limits cost, it may also limit delivery ratio.

The present disclosure uses a replication-based technique to distribute content in publish-subscribe delay tolerant networks. Common goals in routing are to minimize some resource (e.g., average latency, cost, maximum delay). Routing for the present disclosure may be developed to minimize these constraints while maximizing some other variable. For example, achieving maximum distribution of relevant content may dictate that nodes sometimes relay content that is of no interest to the node itself.

The system may be configured to assume that each user expresses some level of interest in certain types of data, and that they would benefit by receiving as much of these interesting types of data as possible. The interests of each user may be expressed as an n-tuple interest vector, $I_{vec}=\{i_1, i_2, \ldots, i_n\}$. Each element of the interest vector specifies how much interest the user has in a corresponding one of n content types. For example only, each element may be a number (such as from 0 to 10) or an enumerated value (such as very interested, interested, somewhat interested, and not interested). The interest vector may be used to determine an interest profile for that user.

Because the network is mobile in nature, topology is determined on a distributed basis. Each of the nodes periodically broadcasts a beacon packet that includes device-specific information such as a node identifier and type. The beacon packets may also include interest information, and may be used to exchange content item information.

Each node that is powered on may periodically broadcast a beacon packet within a beacon cycle. The length of a beacon cycle is specified as the interval [JMIN, JMAX], where JMIN and JMAX are predetermined amounts of time. In other words, every JMIN to JMAX seconds, a node will transmit a beacon packet. The length of the beacon cycle is selected as a uniformly-distributed random time between JMAX and JMIN. The randomization of beacon cycle length helps to decrease packet collisions.

When nodes encounter new neighbors, they exchange interest profile vectors. After exchanging interest profile vectors, nodes can exchange information until they are no longer connected. As there are a finite number of content types, interest profile vectors can be exchanged over the network as part of a simple handshaking packet, after which content diffusion can take place accordingly. Because nodes' interests may change over time, it may be necessary to renew this session periodically if nodes are in contact for long periods of time.

Figure 10A:
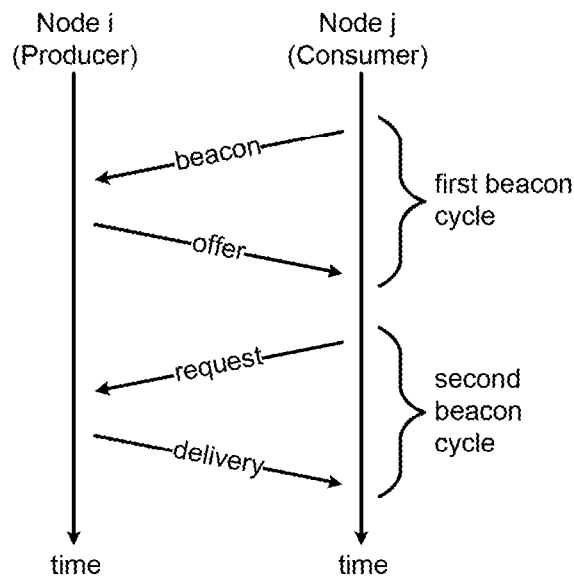
FIG. 10A is an exemplary graphical depiction of packets exchanged pursuant to a beacon, offer, request, delivery (BORD) architecture.

FIG. 10A is an exemplary graphical depiction of a beacon, offer, request, delivery (BORD) structure. In the first beacon cycle, whose length is between JMIN and JMAX, nodes send a beacon, which includes an interest vector. In FIG. 10A, node j may be acting as a consumer, distributing a content item, while node i acts as a producer, receiving the content item.

In the example of FIG. 10A, the consumer happens to transmit a beacon prior to the producer transmitting a beacon. When the producer receives the beacon, the producer updates the neighbor table to record the proximity of the consumer. In addition, as described below, the producer will update neighbor interest information based on the interest vector of the consumer. Every time a packet arrives at a node, some information is stored. Each node may track which neighbors are within receiving range, how many beacons have been received from the neighbors, the interest vectors of the neighbors, and the last time the neighbors transmitted a signal.

A function may periodically check each entry in the neighbor table. If there are entries older than a predetermined time period, the node assumes that the neighbor is out of range. The node may then be removed from the neighbor table. This may prevent a node from attempting to cooperate with a node that is no longer a nearby member of the network.

The producer uses a map of stored content to determine if any content matches the expressed interest of the consumer. If any stored content is a match, the producer adds the content to an offer queue. The offer queue does not include the content itself—instead, the list just includes the type and the GCID of a content item that is ready to be delivered. The producer then broadcasts an offer packet in the same first beacon cycle based on content in the offer queue.

Figure 11:
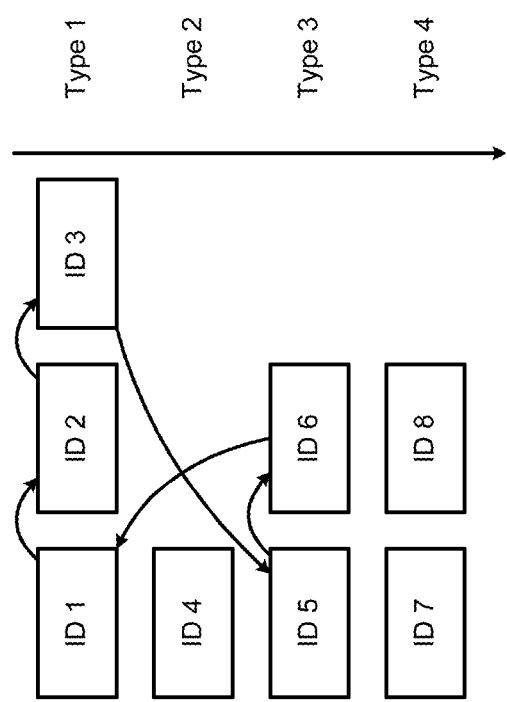
FIG. 11 is a graphical depiction of a round-robin algorithm for content offering.

To make sure offers are made fairly, the producer offers matching contents in a round robin fashion. For example only, see FIG. 11, where eight content items (IDs of 1 to 8) of four types (types 1 to 4) are stored. If the consumer expressed interest in types 1 and 3, the producer could offer the content items in the fashion depicted by arrows. In this example, the content items are offered in the following ID order: 1, 2, 3, 5, 6, 1, 2, . . . . Similar round robin schemes may also be used when requesting content and delivering content.

Referring back to FIG. 10A, when the consumer receives the offer, the consumer determines whether the offered content is of interest. The consumer generates a request queue based on which content from the offer lists is desired. If the interest level is not high enough, or if the node already has the specified content, it will not be re-requested. If a node determines that the content would be beneficial, it places the content type and GCID on the request queue. The consumer broadcasts a request packet in the next beacon cycle based on the request queue.

Based on the request packet, the producer begins preparing the requested content. Using a fixed structure to send data over the wireless channel may make the boundaries of the diffusion time more predictable. In various implementations, each content item is 64 bytes in length and the maximum packet size is 28 bytes.

In such implementations, the content item is split across multiple packets. FIG. 12A is an exemplary depiction of how a content item is split. According to FIG. 12A, one content item of 64 bytes is split into a first fragment of 22 bytes, a second fragment of 22 bytes, and a third fragment of 20 bytes. The split of the content item means that each delivery of a content item requires three packets to be sent over the channel.

FIGS. 12B-12D depict exemplary structures of the three fragments of the content item. FIGS. 12B and 12C each have 22 bytes total, while FIG. 12D has 20 bytes in total. The type declaration defines how the content item is associated with the interest vector, while the global content identifier (GCI) is a unique number that identifies the included content.

For example only, the type declaration may specify which bit of the interest vector corresponds to this content item. In various implementations, the interest vector is 32 entries long, with each entry corresponding to one of 32 content types. The type declaration may then be 5 bits long, which allows a number from 1 to 32 (or 0 to 31) to be specified, identifying with which content type the content item is associated. The content item and GCID allow for easy storage and classification of the content item.

Figure 10B:
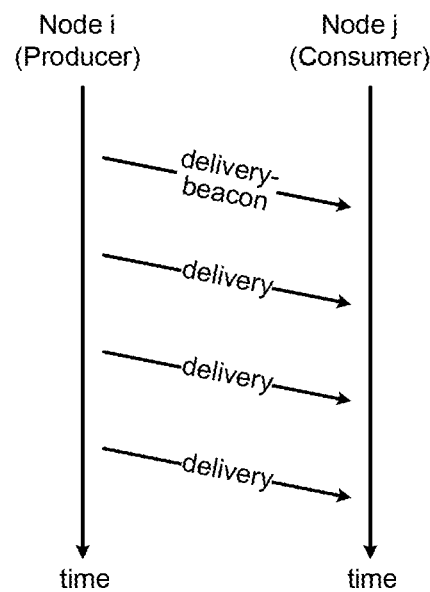
FIG. 10B is an exemplary graphical depiction of multiple-packet delivery of a split content.

FIG. 10B depicts how delivery of a single content is actually performed when splitting is required. Before the actual transmission of content, the producer sends a delivery beacon which indicates the number of packets to follow. In various implementations, the number is a multiple of three because each content item is split into three fragments. The number of content items that can be sent during each beacon cycle may be limited to a predetermined number, such as 5.

Transmitting the fragments may be performed immediately after transmission of the delivery beacon, as shown in FIG. 10B. The fragments may be sent with an inter-packet delay of 100 ms. Groups of fragments for multiple content items may be separated by a delay of 200 ms.

Each fragment is stored into a two-dimensional array, where the first dimension is used to store the fragment ID and the second dimension is used to store the corresponding data. If the number of packets to follow is zero, a node knows that there is no content prepared to send, so in the next beacon cycle that node can send a beacon with its interest vector. If the number of offers or requests is not zero, the node will broadcast its offer and/or request list.

Receiving nodes, including the consumer, then run a reassembly state machine to reassemble the fragmentary data packets into content items, storing them in a buffer and then processing them to see if they should be stored or discarded. Because the protocol is implemented over broadcast, it is possible (or even common) that a node will receive content in which it is not interested. In this case, the content is simply discarded.

An overview of an exemplary protocol for content exchange, as described above, is shown here:

```
Initialize neighbor table
Assemble initial content map from persistent store
Forever {
    i = Uniform random number [Jmin,Jmax]
```

```
    Sleep(i) unless interrupted by transmission
    If beacon received with i time remaining {
        Decode beacon
        Possibly assemble packets following beacon
        Update sending node in neighbor table
        Determine node interests
        Add appropriate information to offer and request lists
        Sleep(i)
    }
    When awake {
        Offers = determine_offers( )
        Requests = determine_requests( )
        Offers_and_requests = partition(Offers, Requests)
        Deliveries = take_from_delivery_queue(D_limit)
        Beacon = assemble_beacon(Offers,Requests,Deliveries)
    }
}
```

Figure 13A:
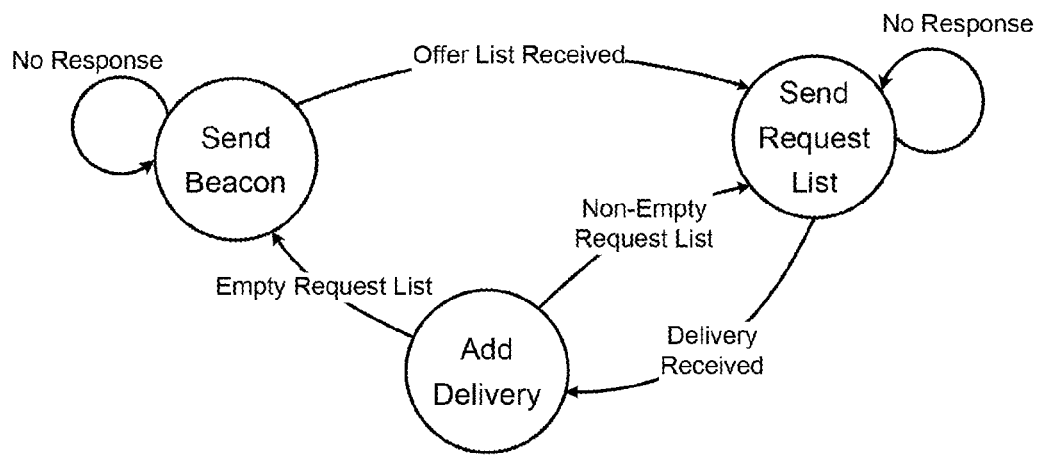
FIGS. 13A-13C are exemplary state diagrams of the BORD architecture.
Figure 13B:
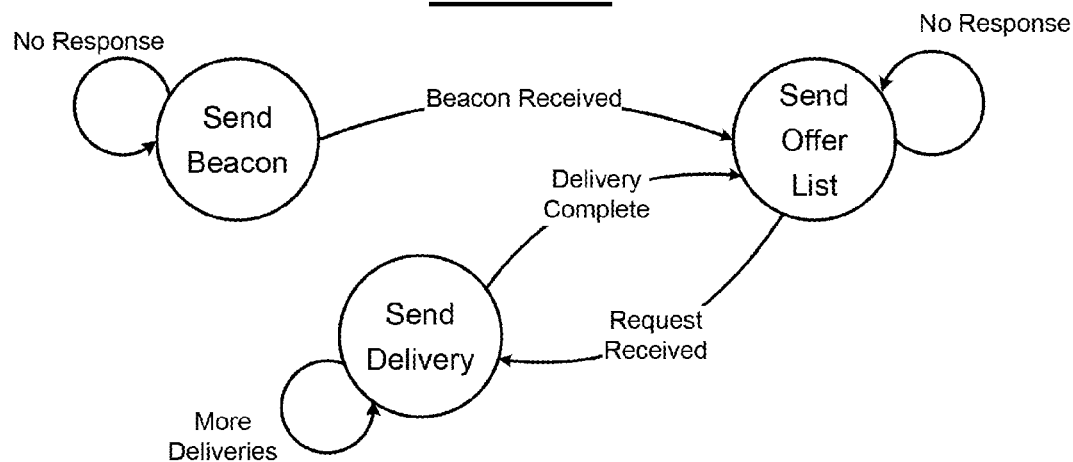
Figure 13C:
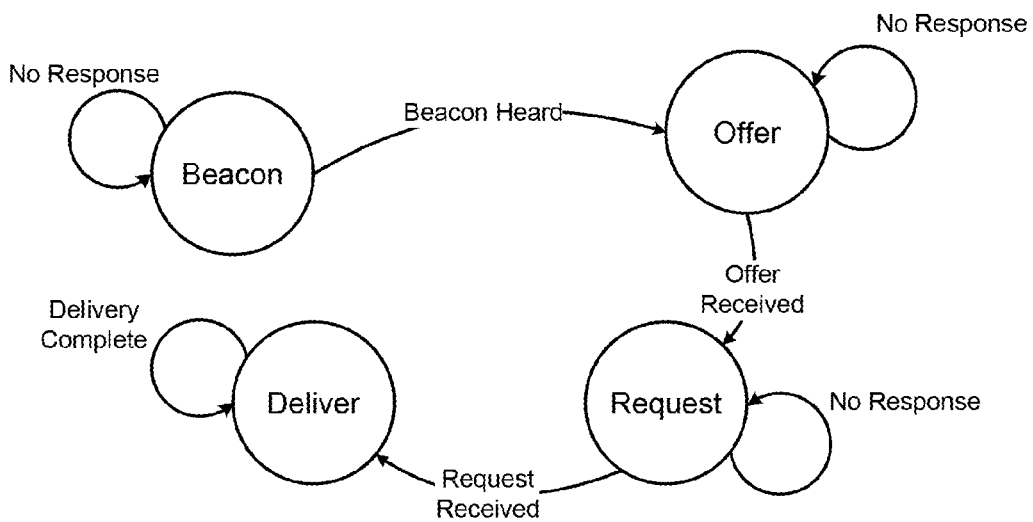

FIGS. 13A-13C are exemplary state diagrams corresponding to the above protocol.

In wireless networks, packet sizes are finite, and therefore nodes are not able to transmit unlimited numbers of offers and requests in the same beacon. The maximum size of a packet and the possible values of the beacon cycle may determine an upper limit for offers and requests in one beacon. Remaining requests and/or offers are saved for the next beacon.

Selfishly transmitting only requests and not transmitting offers might be efficient from the perspective of a single node, but not for the whole network. So, an algorithm that splits the available space for the offers and requests helps to make the network more efficient (diffuse relevant content more quickly).

In one example of splitting available space in one beacon cycle, a ratio is determined as the number of offers that could be made divided by the sum of the number of offers and the number of requests that could be made. The number of offers to actually make is then determined by multiplying the ratio by a maximum space variable. The number of requests to actually make is then determined by subtracting the number of offers to actually make from the maximum space variable. The maximum space variable is equal to the total number of offers or requests that will fit into a single beacon packet, and is currently set to five.

This policy can be adapted to give greater preference to offers or requests. The interest profile vector may be used to split bandwidth fairly between different types of content. For example, if a first content type has half the interest of a second content type, half as much bandwidth may be allocated to exchange the first content type. The interest profile vector may also be used as a cache eviction policy for nodes with aging information. If a node's interests change over time, stored content may become less relevant. The interest profile vector may be used to decide how much, in a relative or an absolute sense, of each content type to keep in memory at all times.

Nodes might choose to selfishly request only content of interest to themselves. However, this may not maximize diffusion of desired content system-wide. System efficiency may increase if nodes store and forward content that is of interest to other nodes and not to themselves. Each of the nodes may therefore track interests of their neighbors.

In simple implementations, nodes only know their own interests and the interests of their adjacent neighbors. Therefore, the diffusion strategy does not take into account neighbors that may have fallen out of range or neighbors that are multiple hops away. Complete diffusion of content relies on the inherent mobility of the nodes. If there is a partition of nodes farther away, some mobile nodes may help these nodes receive content by acting as a carrier. However, for this to happen, the protocol must be modified to take these parameters into account.

There may be a situation in which there is a path between two nodes, but intermediate nodes in the path are not sufficiently interested in a content type for data to be disseminated through the path. Nodes may account for their neighbors over multiple hops to help deliver data. Neighbors far away or with low connectivity may rarely receive content, and so should be accommodated in some way.

Nodes do not know the contents of any other node until they demonstrate interest in a certain content type. By deciding to become interested in a certain content type, there may be a very large number of corresponding contents and thus the node would have to wait longer to be offered content in which it was actually interested. In other words, the cost of becoming interested in a certain type is not known a priori. As a result, round-robin delivery of content may be employed so that content items of one type do not have to wait until all the content items of another type have been delivered.

A node cooperation strategy can be implemented by adjusting the interest profile of a node based on its neighbors' interests. By modulating the interest vector of a node to store "extra" content items that are not of immediate interest, de facto forwarding is begun. Adjusting a node's interest vector to allow cooperation is a natural choice as the interest vector is used to request content and can be used in cache eviction.

For example only, if a set of neighbors' interest vectors is N, the aggregate neighbor interest vector $I_N$ can be defined as:

$$I_N = \frac{\beta}{|N|} \cdot \sum_{i \in N} i,$$

where $|N|$ is the number of vectors in the set N (i.e., the number of neighbors), and $\beta$ is a parameter in the range [0,1] called the cooperation factor.

The cooperation factor $\beta$ allows the extent of cooperation with neighbor nodes to be adjusted. According to the above equation, the aggregate neighbor interest vector is an average of the interest vectors of the neighbors. However, once the connection between nodes is broken (e.g., node timeout), the neighbor table may immediately be culled and cooperation between those nodes will stop.

To address this, a learning-based method can be implemented. Each node can maintain a neighbor history table. The neighbor history table stores the interest vector of each node as well as the time of last contact from the node. The time of last contact can be used to drop nodes from the list, but only after a predetermined amount of time. The last contact time can be used to determine a time-based weight $w_i$ in the range [0,1] for each node. The time-based weight allows more recently contacted nodes to be given more cooperation than older nodes. The aggregate neighbor interest vector can then be defined as:

$$I_N = \frac{\beta}{|N|} \cdot \sum_{i \in N} w_i \cdot i$$

The weights can be determined using an exponential decay. The weight used for each neighbor node i can therefore be defined as $w_i = \alpha e^{-\gamma t}$, where $\alpha$ and $\gamma$ are constants, and t is the time elapsed since neighbor node i was last in contact.

It may be beneficial to add an element of random interest so that nodes store an amount of content that may not be of interest to themselves or current neighbors, but may eventually be disseminated. For example, neighbors of the node may in turn have neighbors that are interested in the content. Further, as the node moves and encounters new neighbors, the content requested by the random interest vector may be of use to the new neighbors. A random vector, $I_R$, is therefore defined. Further, each node maintains its own personal interest vector $I_0$. The node may therefore create an aggregate interest vector I as follows: $I=I_N+I_0+I_R$.

In various implementations, there is a limit to the value of each specific interest vector entry. If this limit is exceeded by the above sum for any interest vector entry, the entry is simply set to the limit. Because indicating interest in many different types of information may be costly, a randomized algorithm may be used to select a fraction of the interests from the other nodes before the aggregate neighbor interest is determined.

This combination of vectors selected by each node allows nodes to cooperate by learning from their environment's interests over time. The main factors in determining cooperation among nodes are the weights assigned to nodes in the history and the cooperation factor $\beta$.

In various implementations, the aggregate interest vector (and the personal and random interest vectors) has 32 entries, corresponding to 32 content types, with each entry being 4 bits long. The entries can therefore assume values from 0-15 (for example only, 0 corresponds to the least interest while 15 corresponds to the most interest).

When transmitting a beacon based on the aggregate interest vector, a binary representation can be used to reduce the amount of information transmitted. With a smaller representation, the aggregate interest vector can even be included within a beacon packet, as described above. For example only, the broadcast interest vector may include 32 bits, with each bit representing a binary interest level in the associated content type. In other words, a first binary value (such as 1) indicates that the node is interested in the corresponding type of content, while a second binary value (such as 0) indicates that the node is not interested in that type of content.

A function can then be defined that converts each element of the aggregate interest vector to an element of the broadcast interest vector. An example function assigns the value true to an element of the broadcast interest vector if the number of stored content items of a corresponding content type is less than the value of the aggregate interest vector. Otherwise, the function assigns the value false to the element.

Another example function assigns the value true to a content type if the element of the aggregate interest vector corresponding to that type is greater than or equal to a predetermined value. Otherwise, the function assigns the value false to the element. For example only, the predetermined value may be half of the maximum value (e.g., 8 when values of 0-15 are possible).

When calculating the aggregate interest vector, the personal and random interest vectors (having values from 0-15) are combined with the aggregate neighbor interest vector. However, the neighbor interest vectors were received from a broadcast, and only have binary values of 0 or 1. Each neighbor interest vector may therefore be scaled to the range of 0-15 before being combined into the aggregate neighbor interest vector. For example only, if the neighbor interest vector bit is one, the interest level may be scaled to 15; similarly, when the neighbor interest vector bit is zero, the interest level for that type of content may be set to zero.

The following outline presents an overview of an exchange protocol incorporating cooperation among nodes:

```
Initialize neighbor table
Assemble initial content map from persistent store
I₀ := personal interest vector
Forever {
    i = Uniform random number [Jmin,Jmax]
    Sleep(i) unless interrupted by transmission
    I_R := random interest vector with constrained length
    I = I₀ + I_R + I_N
    If beacon received with i time remaining {
        Decode beacon
        Possibly assemble packets following beacon
        Update sending node in neighbor table
        I_N := β/|N| * sum(neighbor interests * w_i)
        Add appropriate information to offer and request lists
        Sleep(i)
        I = I₀ + I_R + I_N
    }
    When awake {
        Update neighbor interest vector given node freshness weights
        Offers = determine_offers( )
        Requests = determine_requests( )
        Offers_and_requests = partition(Offers, Requests)
        Deliveries = take_from_delivery_queue(D_limit)
        Beacon = assemble_beacon(Offers,Requests,Deliveries)
    }
}
```

Figure 14A:
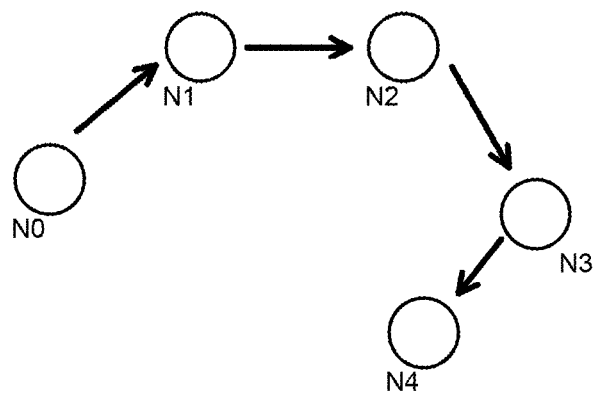
FIGS. 14A and 14B are exemplary network topologies showing routing without cooperation and with cooperation, respectively.

FIG. 14A depicts an exemplary network topology where node 0 represents a producer, and nodes 1-4 represent consumers interested in content from the producer. In this topology, the global diffusion time is therefore the time it takes for content to reach node 4 from node 0. To diffuse a single content item to node 4, the content item makes four hops.

Figure 14B:
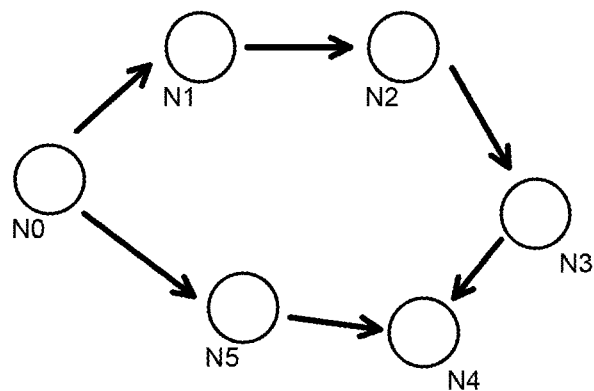

FIG. 14B depicts another exemplary network topology demonstrating the value of cooperation in light of the topology of FIG. 14A. Node 5 is a node that is not interested in the same content as nodes 0-4. If node 5 is not configured to cooperate, node 5 will not request any content on behalf of node 4, and can therefore not participate in the transfer of content to node 4. For this reason, node 5 is not shown in FIG. 14A.

However, in FIG. 14B, node 5 is configured to cooperate and therefore requests content for its neighbor node 4 as well as for itself. Pursuant to a cooperative strategy, the interest vector broadcast by node 5 indicates interests based on the interest vector received from node 4. The content is delivered to node 5 and now requires only a second hop to reach node 4.

Each step of the BORD protocol may use a common beacon packet format. The beacon packet may be transmitted in a broadcast manner, and may therefore omit source and/or destination addresses. The beacon packet includes a combination of fixed information common to all beacons and variable information based upon the current step in the BORD protocol. The allocation of space in the variable portion of the beacon is based upon the balance of requests, offers, and the presence of time information. The presence of this information is described in the fixed portion of the beacon.

FIG. 15A depicts an exemplary structure of a beacon packet. The fixed portion of the beacon packet includes information pertaining to neighbor management and discovery and partitioning of the variable portions of the beacon. The first two most significant bits of the beacon packet (the first byte of the beacon packet) specify the packet type. For example only, the packet type of a beacon packet is set to 1. In the first byte of the beacon, the packet type is followed by the device type (2 bits), which specifies the device as a consumer (1) or a producer (2), and the number of data packets to follow (4 bits).

The next two bytes include a 16-bit Device ID, which, like a MAC (media access control) address, uniquely identifies the node. This is also used as the producer ID. The Device ID is then followed by an Owner ID, which is an ID unique to an owner. Next, a 16-bit beacon sequence number specifies the number of beacons sent by the broadcasting node since booting. Next is a 32-bit (4-byte) Interest Vector, which is a compact binary representation of a node's interest in the 32 different types of content (1 bit for each type of content).

Byte 11 specifies the structure of the variable portion of the beacon. The three most significant bits of byte 11 specify the number of requests present in the variable portion. The next three bits specify the number of offers present in the variable portion. The remaining two bits are used to store Owner Type. In various implementations, the order of the offers and requests in the variable portion is predetermined. For example, the offers may be located first, followed by the requests.

The most significant bit of byte 12 indicates whether or not time information is present in the beacon. If so (e.g., a value of '1'), the first 28 bits of the variable portion of the beacon store the time information according to the time protocol. Otherwise, the time information bit is followed by the first Offer/Request global content identifier.

FIG. 16A depicts an exemplary format for time information. The date may be measured in number of days since Jan. 1, 2009. The time may be measured in number of seconds since midnight. The date may be represented by an unsigned 11-bit number, while the number of seconds is represented by an unsigned 17-bit number.

FIG. 16B depicts an exemplary state diagram for maintaining time information. The device initially begins in the state where no time information is available. Three mechanisms for receiving time information are shown. The node may receive time information from the beacon packet of another device (referred to as device time received). This may be considered less reliable than receiving time from a fixed producer (referred to as producer time received) or from a host computer (referred to as device sync), such as via USB.

A different structure may be defined for delivery (or, data) packets, as shown in FIG. 15B. In implementations where a content item is 64-bytes in size and a maximum size of a wireless packet is 28 bytes, each content item must be split into at least three fragments. Thus, the delivery packets are designed to accommodate the appropriate fragmentation.

In the first byte of the delivery packet, the two most significant bits are used for the packet type, which may be the value '2' for data packets. The next two bits are used for the device type of the source, followed by two bits to denote the number of total fragments comprising the content item. The last two bits of the first byte are used to denote the number of the current fragment.

The next two bytes of the data packet store the Device ID of the source and the two bytes after that store the packet ID for the entire content item delivery. This Packet ID is assigned by the transmitter for a complete set of fragments to verify complete delivery and allow fragment reassembly. The variable area is used for offers and requests, including the type and identifier of an offer or request. When each content item is split into three fragments, the fragment number is 0, 1, or 2. Bytes 5 to 27 store data.

Figure 17:
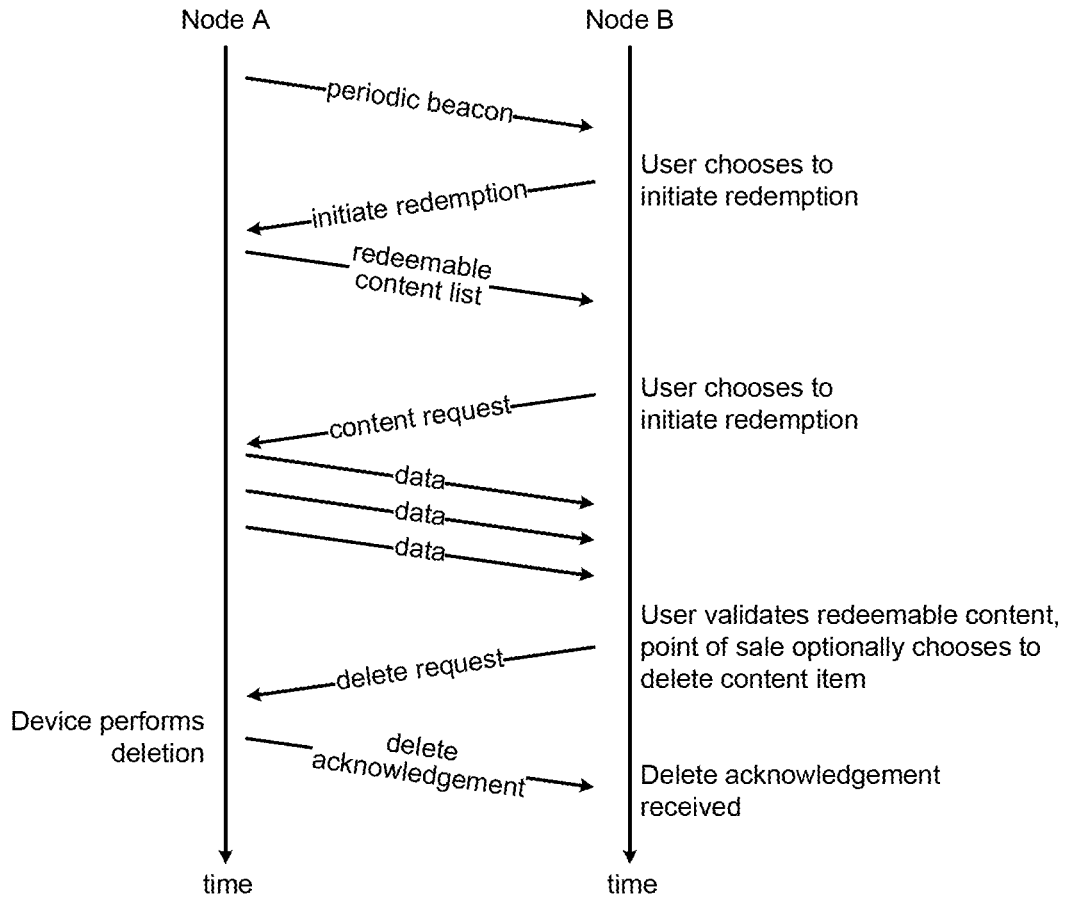
FIG. 17 is an exemplary graphical depiction of packets exchanged during redemption of a content item.

FIG. 17 graphically depicts an exemplary packet exchange where a content item is redeemed. Node A represents the user's device, while node B represents a redemption station, such as a point of sale terminal at a checkout counter. The user may interact with the point of sale terminal, such as in implementations where the user device does not include user input or output capabilities.

Upon redemption, the point of sale terminal may decide to instruct the user's device to delete the content item. Alternatively, the point of sale terminal may instruct the user's terminal to decrement or set to zero the number of additional forwards of the content item. This prevents (or limits the extent of) further diffusion of this particular content item. Additionally or alternatively, a lock may be placed on the content item, which prevents the content item from being redeemed again, but allows the content item to be forwarded. The lock may also prevent the content item from being deleted, so that the content item wouldn't be eventually deleted and then received from another user.

FIGS. 18A-18D and 19A-19D depict exemplary packet formats for performing content redemption, such as is depicted in FIG. 17. FIGS. 18B-18D are three types of control packets, which each share a control byte shown in FIG. 18A. The control packet subtype of the control byte specifies one of a number of subtypes. Three of the subtypes are shown in FIGS. 18B-18D: specifically, a check contents (initiate redemption) command, a redeemable content listing, and a redemption request (content request) command, respectively.

FIGS. 19A-19B depict an exemplary format for sending data (specifically, a content item) using a control packet. Because the content item is larger than the maximum packet size, the content item will be broken into fragments. FIG. 19C depicts an exemplary format for a delete request, and FIG. 19D depicts an exemplary format for a delete confirmation.

Simulation software may be used to simulate the wireless network. Various aspects of routing or cooperation may be developed and tested more easily in simulation than in an actual system. The large-scale behavior of devices may be visible without needing to purchase additional devices and waiting for test scenarios to develop in real-time. Simulation may also allow times to be measured more easily than in a physical network.

Actual devices may be implemented using a tinyOS environment that does not have a debugger, and errors in the implementation may be difficult to find. Therefore the simulator can give an insight in possible errors or errors in the semantic. Furthermore, any test scenario will run more slowly in the hardware implementation than in the simulator. Thus, the simulator gives the opportunity to give an insight into the large scale effects which would rather be impossible in the hardware implementation.

Further, simulation is useful because the model for the network is parameterized by a large number of states and policies: e.g., node contents, offers, requests, how offers and requests split, the number of contents that can be delivered during each beacon period. These parameters make a formal mathematical model complex, and are instead well suited to simulation. Another reason for using a simulation based model is that network non-idealities can be introduced and adjusted: e.g., packet collision, drop rate, and various network delays.

Suitable simulation software includes network simulator, version two (NS2). NS2 may be used to simulate wired and wireless networks, and is an open-source program. NS2 is a discrete event network simulator, written in C++ and OTcl (an object-oriented extension of Tcl), which offers the easy changes to parameters of OTcl along with the execution speed of C++. For this reason, the network topology is implemented in OTcl. Furthermore, content injection is implemented in OTcl. To inject a content, the OTcl code injects the content type, content GCI, and content itself into the node. In summary, the OTcl implementation declares the network topology, the boundaries of the network, the start and end of the simulation, and the content injection. These items are defined using OTcl because they may change many times.

To take measurements of diffusion time, a simulation may initially boot all nodes and then run the state evolution until the network reaches the diffused state where no more content can be exchanged. The diffusion time is then recorded. Using Monte Carlo testing, a distribution for diffusion time given an arbitrary topology and initial node conditions can be constructed by running the simulation many times.

The network simulator offers the opportunity to create different scenarios, including placing nodes anywhere in a defined area. For some simulation purposes, a non-mobile configuration is used, where nodes are assigned an initial position hard-coded by the OTcl implementation and stay at that place for the entire simulation. Assuming that no movement occurs may be a reasonable assumption for some situations, such as when people are sitting in a restaurant or in a classroom.

When developing the beacon, offer, request, delivery (BORD) protocol, emphasis may be placed on minimizing the diffusion time. Thus, the test protocol measures the diffusion time to give an insight into the system's performance. Again, the diffusion time is defined as the time interval, measured in seconds, between starting the simulation and reaching a saturated network where content exchange is no longer occurring. The diffusion time can be measured over numerous rounds of simulation. After measuring many diffusion times, a probability density function (pdf) can be plotted to analyze and optimize system parameters.

Based on the fact that tinyOS does not have memory management, some implementation aspects may be solved differently in simulation. Content storage in the hardware implementation may be provided by two models: flash access module and content manager. The flash access module creates a rudimentary file system with functionality comparable to that of memory allocation. It assigns fixed size blocks with unique addresses and provides access to free assigned blocks.

The content manager in tinyOS is an advanced data structure that manages the storage of content on the flash. The content manager uses flash access to allocate, free, write, and read from the flash memory blocks. The tinyOS content manager then maintains a data structure that stores how much content is in the flash, where the content is located, and the type of content stored.

Because NS2 has memory management, creating the content manager may be simpler in simulation. In NS2, the content manager may simply be a three-dimensional character array. Simulation may also allow opportunities for line-by-line code debugging. Therefore, the simulator may be used to find errors in the tinyOS implementation.

Each scenario can be progressed from sending a single content item through the network to sending 20 content items. A case represents a single sub-scenario, where the number of content items to be sent is varied. In the below examples, each scenario includes 20 cases. Each case may be simulated a large number of times, such as 10,000, to minimize sampling error. Having a large number of results provides a smooth probability density function and an accurate average diffusion time.

As a quantitative example, in implementations where a beacon cycle is 20-25 seconds, delivery of a single content item from a first node to a second node takes an average of 60 seconds. In order to run 10,000 iterations, the hardware devices would have to run for approximately seven days (10,000/(60*24)). In order to perform similar tests for numbers of content items ranging from 2 to 20, the hardware device would run for more than 140 days. This 140 days would be even longer with a more complex topology (i.e., one that isn't simply unidirectional transmission of content from one node to another). As a result, full characterization of the system using the hardware devices would take years. On the other hand, simulating 10,000 iterations may take only an hour.

The simplest topology is one having two connected nodes, where one node (the producer) sends content to another (the consumer). In various implementations, there are two types of nodes. Mobile nodes that exchange content are called consumer nodes. Consumer nodes consume information from each other but don't generate any new content for the system. There are also nodes that are connected to desktop computers and communicate with other nodes. Because these nodes have the possibility to control what new content is injected into the system (via a user interface, server daemon, etc. . . . ), they are called producer nodes.

Other types of nodes are possible as long as they follow protocols according to the present disclosure. Examples of other types of nodes are packet sniffing nodes, which simply listen to the network data as it is exchanged and relay the information to a storage system for processing. Redemption interfacing nodes may also be implemented, which allow content items such as coupons to be redeemed during a transaction.

From a high-level perspective, producer nodes function as consumer nodes with an interest profile whose values are all set at their lowest possible levels. In the following example, the binary interest vector of the producer is set to all zeroes while the binary interest vector for the consumer is set to all ones.

Figure 20A:
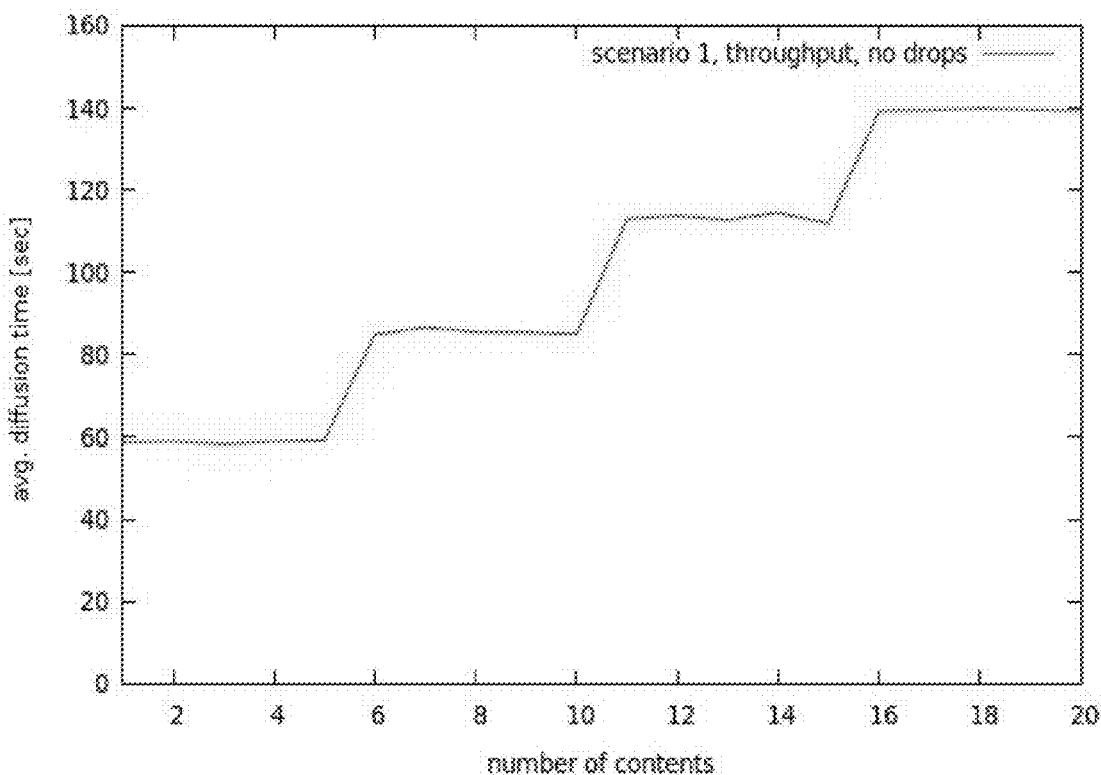
FIG. 20A is a chart of average diffusion time versus number of content items for scenario 1.

FIG. 20A presents the number of contents to send on the x axis and the average diffusion time on the y axis. Twenty cases are simulated: sending from one to twenty contents from the producer to the consumer. The current implementation of the protocol offers the possibility to send i content items in one beacon. Because i is greater than 1 (e.g., 5, in FIG. 20A), there is a step after every increase of 5 content items.

Figure 20B:
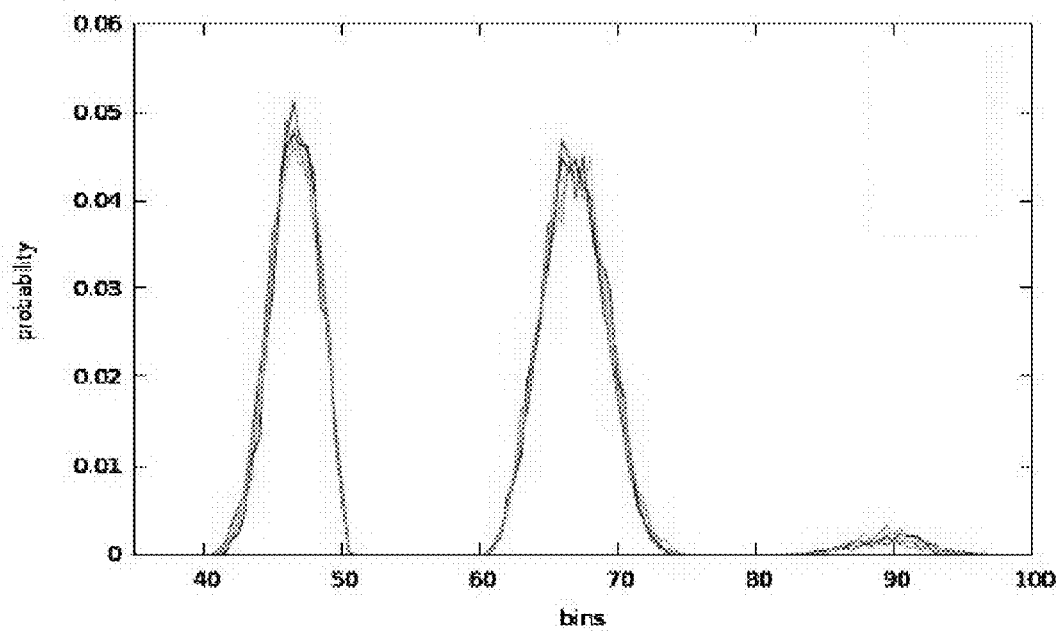
FIG. 20B is a chart of probability density functions of diffusion times for five cases of scenario 1.

FIG. 20B shows a probability distribution function (pdf) of average diffusion time for the first five cases. Note that the pdfs are nearly the same. The 10,000 simulation iterations mean that there is a set of 10,000 diffusion times for each case. There are three peaks in the figure, which is caused by the beaconing. Each peak represents a beacon cycle.

In other words, the pdf is quantized around different peaks. This behavior is because, in the simplistic two-node content exchange situation, interaction is governed by the distribution of the beacon cycles. Further, because beacons carry a quantized number (i) of contents, the time to send one through i (5 in this example) contents should be equivalent up to propagation delay. The first peak is in between 2*JMIN and 2*JMAX, where JMIN is chosen to be 20 seconds and JMAX is chosen to be 25 seconds.

The minimum number of beacon cycles for a transaction between the two nodes can be calculated as one plus the ceiling function of the number of content items sent divided by a maximum space. Maximum space defines the maximum number of content items a node can send in a single beacon. The additional plus one term is caused by the fact that the nodes send their first beacon after JMIN to JMAX.

Figure 21C:
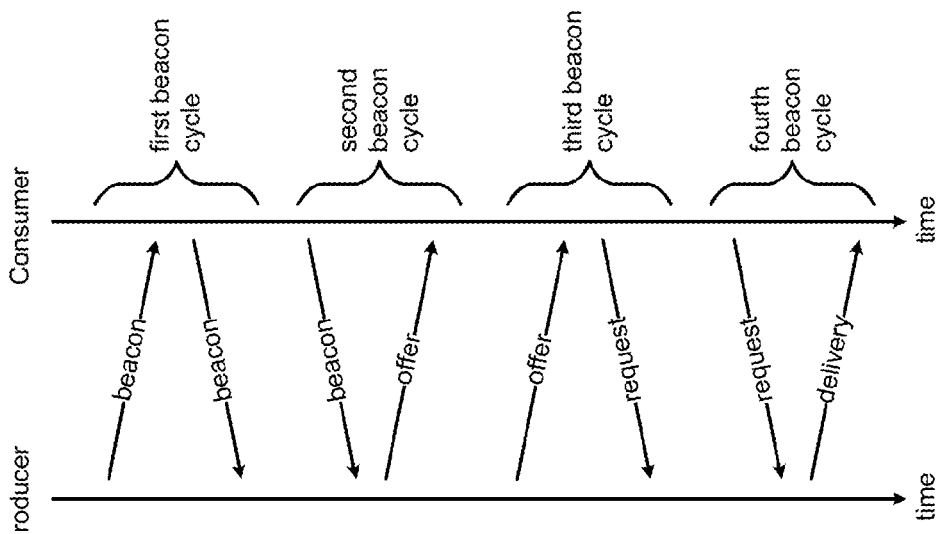
FIGS. 21A-21C are exemplary packet exchanges when sending 1-5 content items according to scenario 1.
Figure 21B:
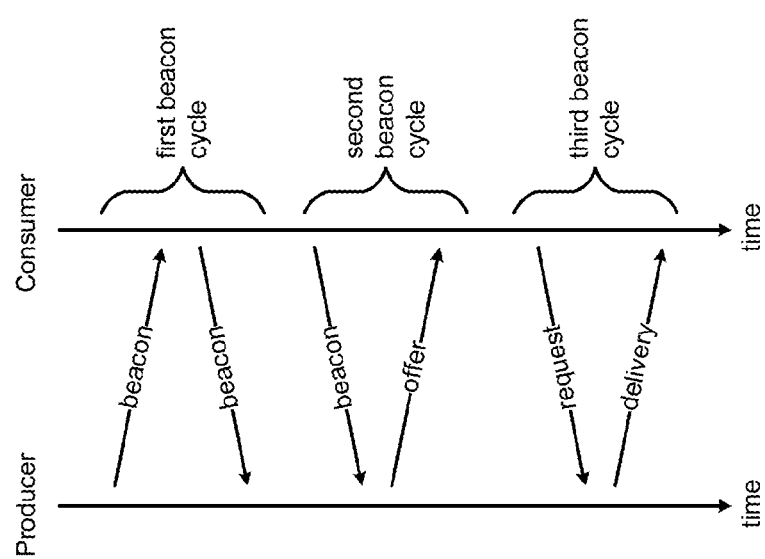
Figure 21A:
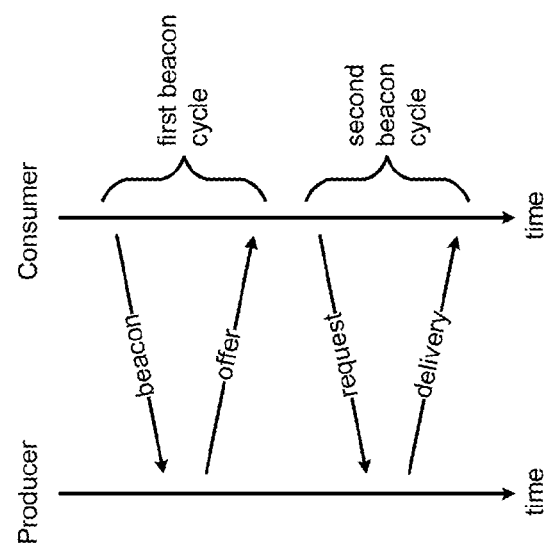

FIGS. 21A, 21B, and 21C graphically depict situations where the number of beacon cycles needed to transmit the same amount of content varies. As FIG. 21A shows, the best case needs two beacon cycles, which corresponds to the first peak (between 40 and 50 seconds). FIG. 21B shows a situation that results in the second pdf peak (between 60 and 70 seconds). FIG. 21C shows a worst case scenario where the network needs four beacon cycles to exchange all the content. This corresponds to the third peak of FIG. 20B (between 80 seconds and 100 seconds).

By increasing the number of content items sent, the number of peaks will increase. Each peak represents a cycle where the network reached a saturated state. Therefore, sending six to ten content items over the channel will result in more peaks in the pdf.

Figure 22:
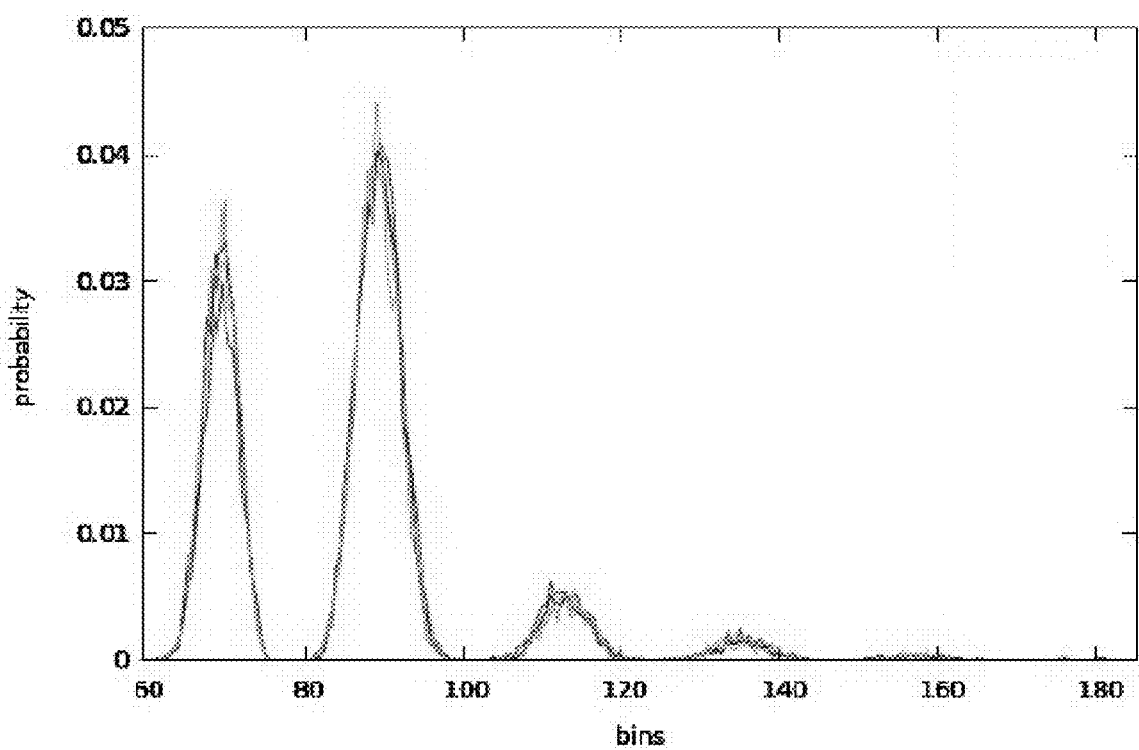
FIG. 22 is a chart of probability density functions of diffusion times for five cases of scenario 1.
Figure 23B:
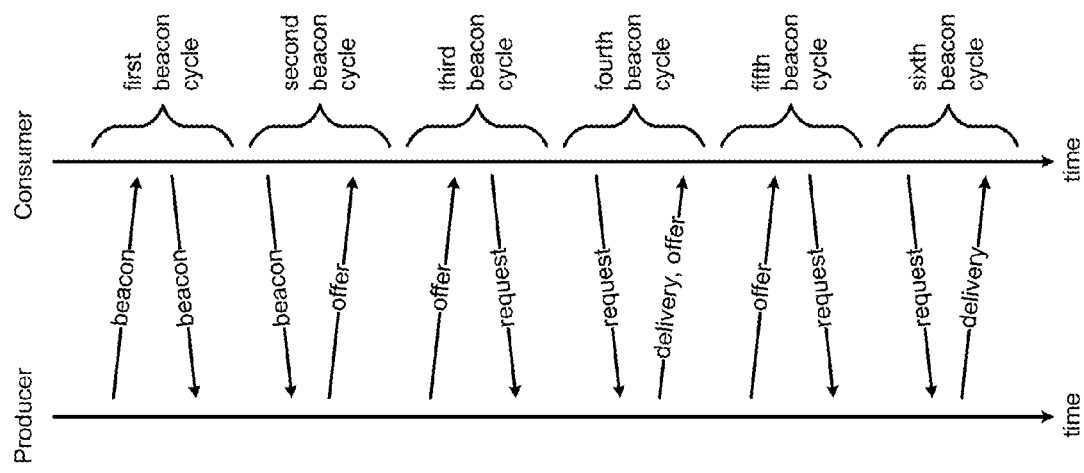
FIGS. 23A-23B are exemplary packet exchanges when sending 6-10 content items according to scenario 1.
Figure 23A:
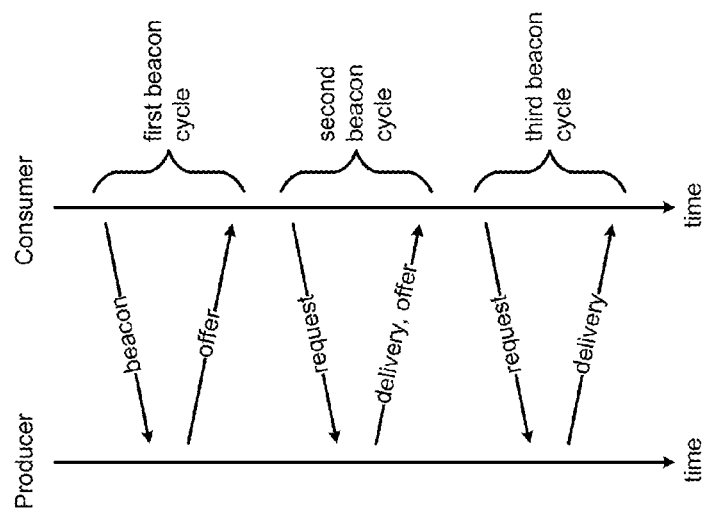

FIG. 22 depicts pdfs for cases where six to ten content items are transmitted. FIGS. 23A and 23B graphically depict the messages sent in the best and worst case possibilities, respectively, for broadcast of 6 to 10 content items. In comparison to FIG. 21A, the best case should have one additional cycle. This is explained by the fact that a new offer list is sent with the delivery beacon of the first delivery. On the other hand, the worst case needs two more cycles when compared to FIG. 21C. The number of peaks in the pdf may correspond to the number of beacon cycles needed for the whole transaction.

In FIG. 22, the minimum diffusion time is between 3*JMIN and 3*JMAX (60 seconds to 75 seconds), while the maximum diffusion time is in the interval of 6*JMIN to 6*JMAX (120 seconds to 150 seconds). The average number of beacon cycles required is four.

Figure 24A:
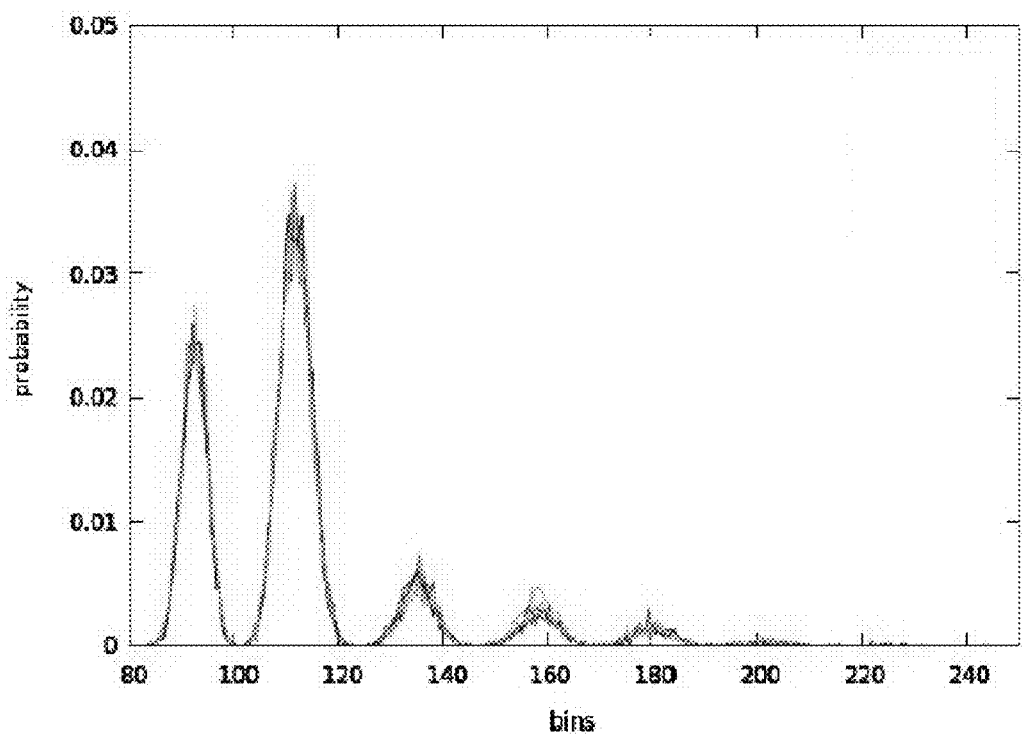
FIGS. 24A-24B are charts of probability density functions of diffusion times of scenario 1 for 11-15 content items and 16-20 content items, respectively.

FIG. 24A shows a pdf of cases where eleven to fifteen content items are transmitted. According to FIG. 24A, the worst case of the transaction of eleven to fifteen content items is between 8*JMIN and 8*JMAX (160 seconds to 200 seconds). The minimum diffusion time is in the interval of 4*JMIN to 4*JMAX (80 seconds to 100 seconds). As the number of content items is increased from one range of cases to the next, the minimum number of beacon cycles increases by one, while the maximum number of beacon cycles increases by two.

Figure 24B:
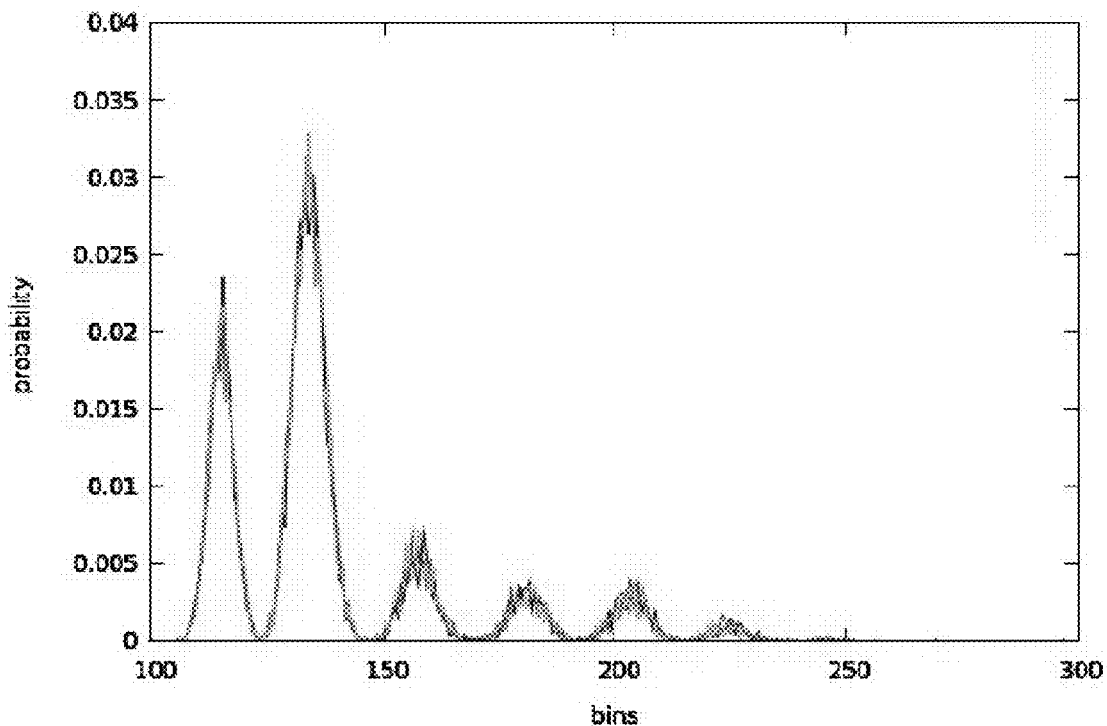

To test this observation, FIG. 24B depicts pdfs for sixteen to twenty content items being transmitted. The minimum number of beacon cycles should be five, which corresponds to the peak between 5*JMIN and 5*JMAX (100 seconds to 125 seconds). Similarly, the maximum number of beacon cycles increased by two to 10. Therefore, the boundaries for sending sixteen to twenty content items from the producer to the consumer is [5*JMIN, 5*JMAX] for the best case and [10*JMIN, 10*JMAX] for the worst case. That means, the diffusion time ranges between 100 seconds and 250 seconds.

Figure 25:
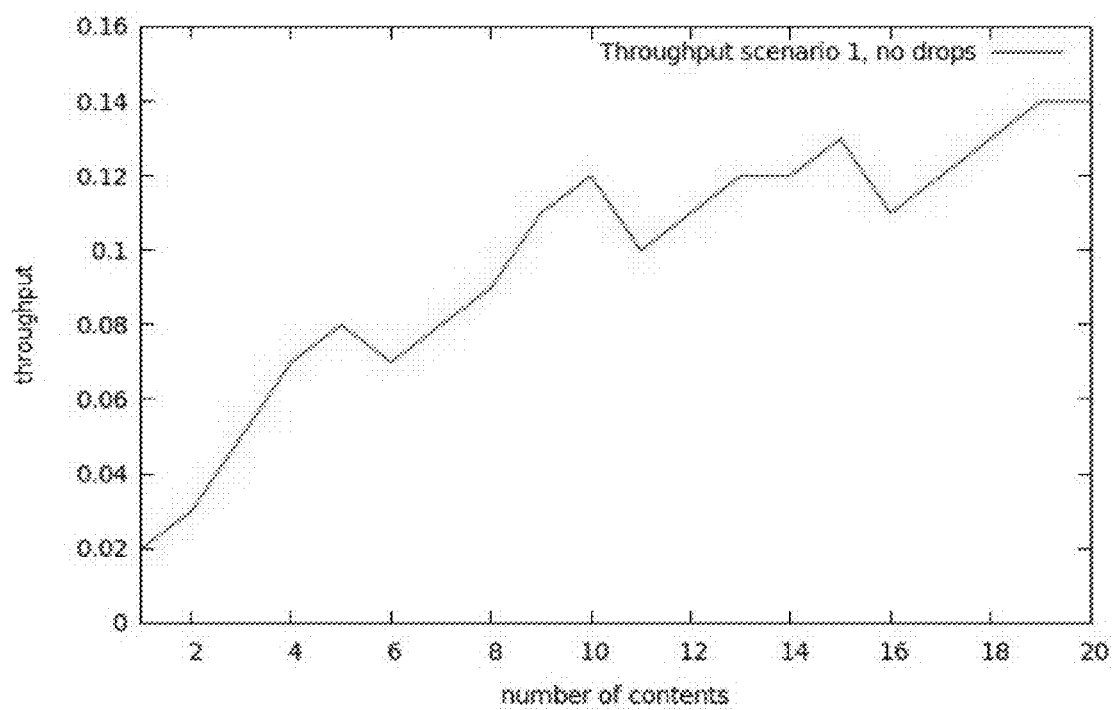
FIG. 25 is a chart of throughput with respect to number of content items transmitted according to scenario 1.

Next, throughput of the system can be studied. Throughput may be defined as the number of content items sent divided by diffusion time. FIG. 25 depicts throughput with respect to number of content items transmitted. The throughput generally increases in a linear fashion until certain values are reached. At these points, the throughput decreases and then begins to increase again.

FIG. 25 shows three of these points—after sending five, ten and fifteen contents. This behavior can be explained by the above simulations and the BORD structure. Whenever an additional beacon cycle is needed to send all the data, the throughput decreases because the additional beacon cycle is not fully used. For example, when sending six contents, one beacon cycle is completely used for the transmission of the first five content items, while the second beacon cycle is used only to send the sixth content item. The second cycle, however, is capable of transmitting an additional four content items during that beacon cycle. Therefore, the throughput begins to increase again as the second cycle becomes more fully used.

In a second scenario, both nodes begin with content. If the amount of content is equal, and both nodes are interested in the content of the other, there is twice as much content to exchange in the network. The nodes may split their offers and requests as described above. As in scenario 1, each case is simulated 10,000 times. For scenario 2, there are 20 cases: ranging from sending one content item in each direction to sending twenty content items.

Figure 26A:
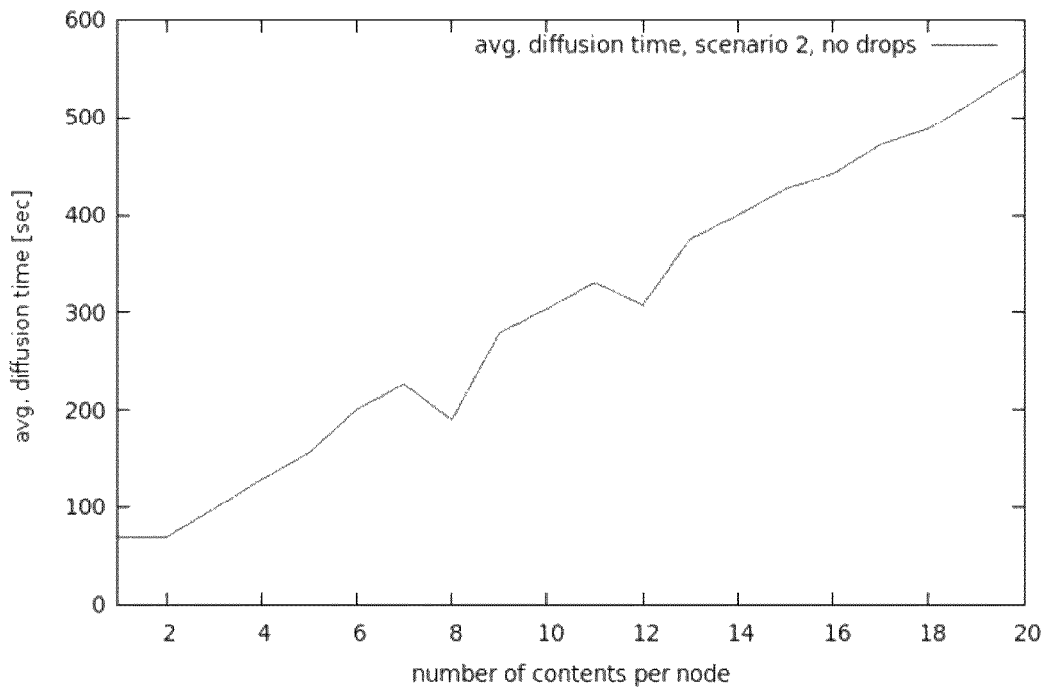
FIG. 26A is a chart of average diffusion time with respect to the number of contents per node according to scenario 2.

FIG. 26A is a chart of average diffusion time with respect to the number of contents per node. In other words, each point in the graph corresponds to average diffusion time of a different case. Note that FIG. 26A does not exhibit the stair-step response of FIG. 20A. This is because the available space in any given beacon is split. The only flat spot (same value of diffusion time as number of content items increases) occurs when increasing from one to two content items. There, the nodes do not have to split the available space for the offers and requests, so these two cases act similar as the first five cases from scenario 1.

The two instances where the average diffusion time of FIG. 26A does not monotonically increase occur at 8 and 12 content items. This form, as already mentioned, split the beacon in a rather fair way to act less selfish and more efficient for the whole network. These two instances occur when an additional cycle was not necessary for sending all the content.

Figure 26B:
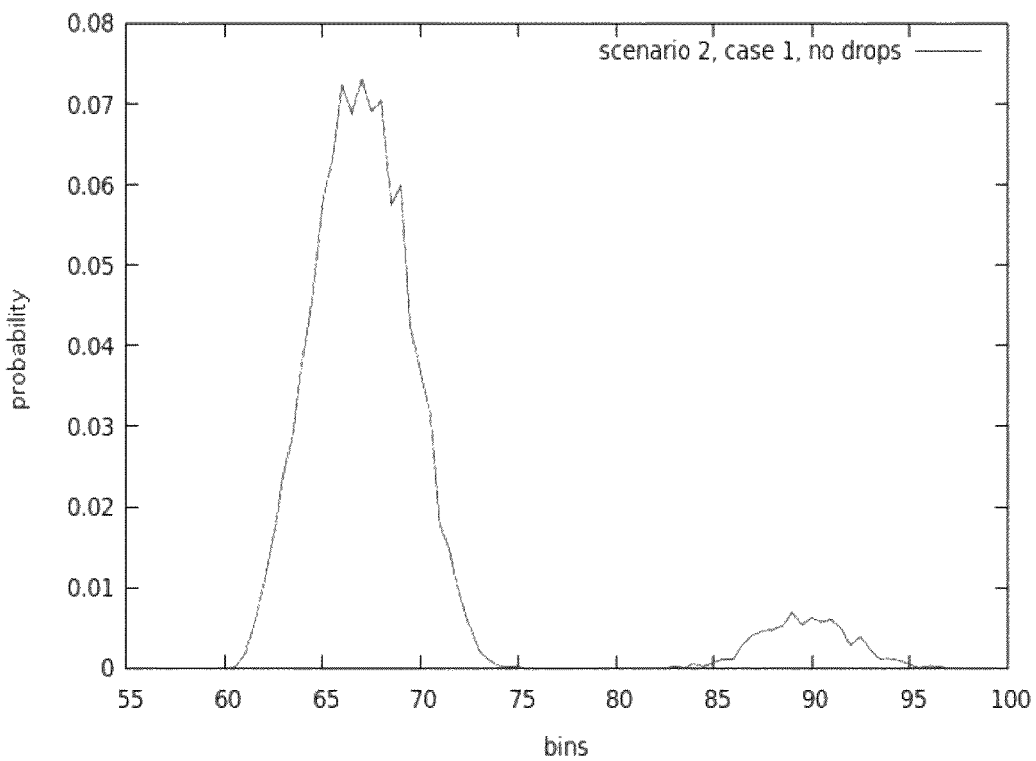
FIG. 26B is a chart of a probability density function of diffusion times for case 1 of scenario 2.

Because 5 cases at a time (such as 1 through 5 content items) do not have the same average diffusion time, pdfs of the diffusion time can not be overlaid on the same axes. Instead, a single pdf is shown in FIG. 26B for the first case, where one content item is present at each node. Compare FIG. 26B to FIG. 20B, which shows overlaid pdfs for cases 1 through 5 of scenario 1. While FIG. 26B, has two peaks, FIG. 20B has three peaks, with the extra peak being located between 40 and 50 seconds.

The extra peak represents a successful transmission of all the content items within two beacon cycles. However, when two content exchanges are necessary, as in scenario 2, an additional beacon cycle is required. The minimum number of cycles for the bi-directional configuration of scenario 2 may be calculated as two plus the ceiling function of the number of content items per node divided by a maximum space value. The ceiling function rounds a number up to the next whole number (integer).

The maximum space variable describes the maximum number of deliveries a node can make in a single beacon. The fixed plus two is caused by the fact that the beacons fire their first beacon after [JMIN, JMAX] and a second delivery. According to the above calculation, the minimum diffusion time for case 1 should occur after three beacon cycles—i.e., the interval [3*JMIN, 3*JMAX] (60 seconds to 75 seconds). FIG. 26B demonstrates that the first peak is, as predicted, in this region.

Figure 27B:
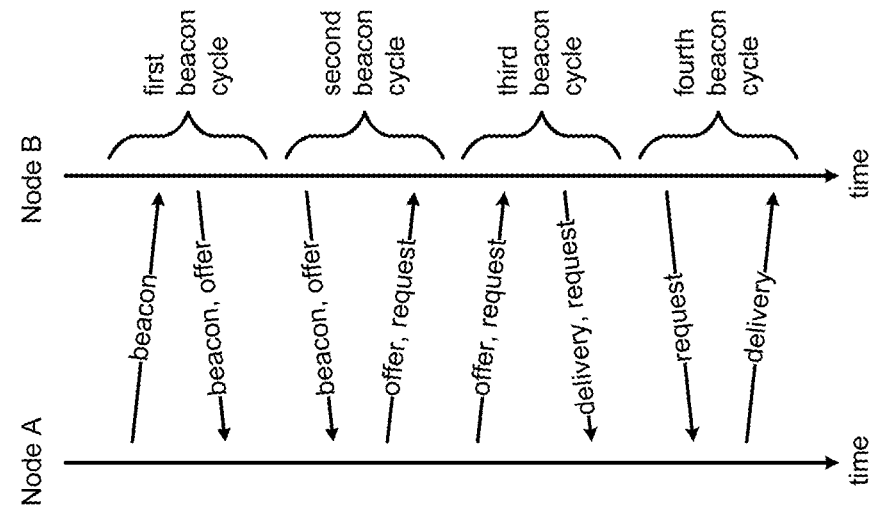
FIGS. 27A and 27B are exemplary packet exchanges when sending 1-5 content items from each node according to scenario 2.
Figure 27A:
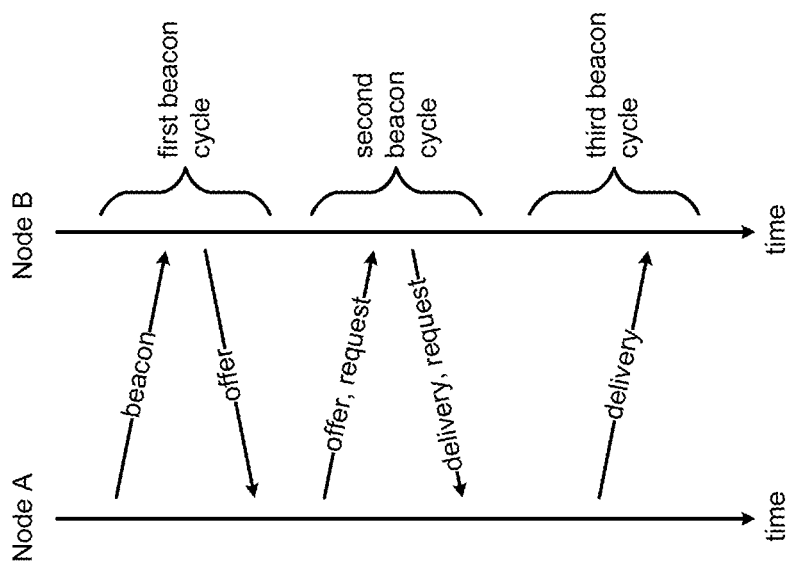

FIGS. 27A and 27B graphically illustrate beacon cycles for best case and worst case (assuming no packet loss) conditions. As seen from FIG. 27B, four beacon cycles are required and therefore the maximum diffusion time is in the range [4*JMIN, 4*JMAX]. Based on this information, the second peak in FIG. 26B is expected to be between 80 seconds and 100 seconds, which it is.

Based on the fact that each node fires its beacon periodically in a uniform random time interval [JMIN, JMAX] an effect called beacon overlapping occurs after a certain time. The effect of beacon overlapping causes the possibility that a node fires beacon number j while another node is already firing beacon number j+1. Thus, transmitted information may not match and additional beacon cycles are needed to exchange all the information to reach a saturated network.

Figure 28:
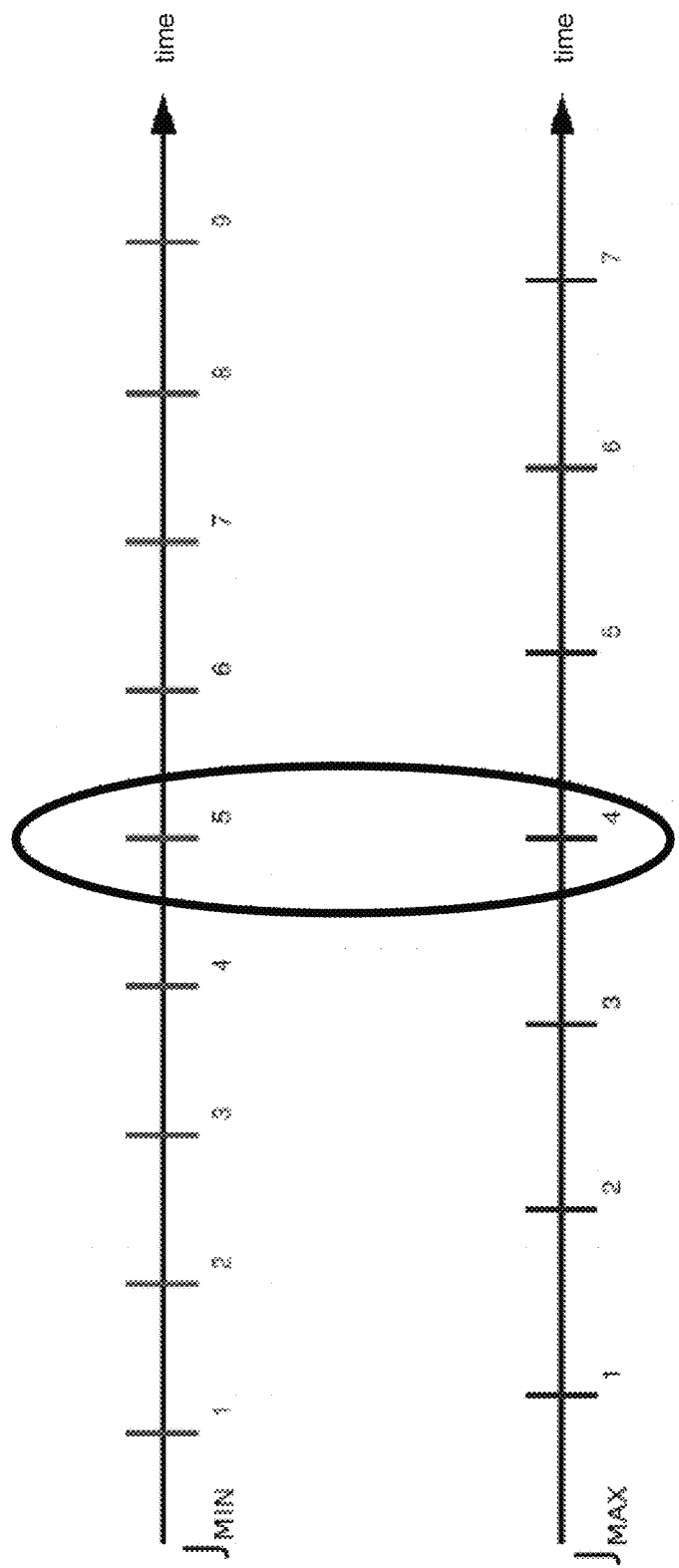
FIG. 28 is a graphical depiction of beacon overlapping for exemplary values of JMIN and JMAX.

FIG. 28 is a graphical depiction of beacon overlapping for exemplary values of JMIN and JMAX. FIG. 28 shows numbered beacons along a top row that are each spaced apart by only JMIN. FIG. 28 also shows beacons along a bottom row that are each spaced apart by JMAX. In this exaggerated example, where one node is transmitting beacons at the fastest rate, and another node is transmitting beacons at the slowest rate, beacon 4 of the slow rate occurs at the same time as beacon 5 of the fast rate. This condition is marked in FIG. 28 with an oval. FIG. 28 depicts values for JMIN and JMAX, 20 seconds and 25 seconds, which are used in the present disclosure for purposes of illustration only. Note that, using these values, 4*JMAX=5*JMIN=100 s.

Figure 29A:
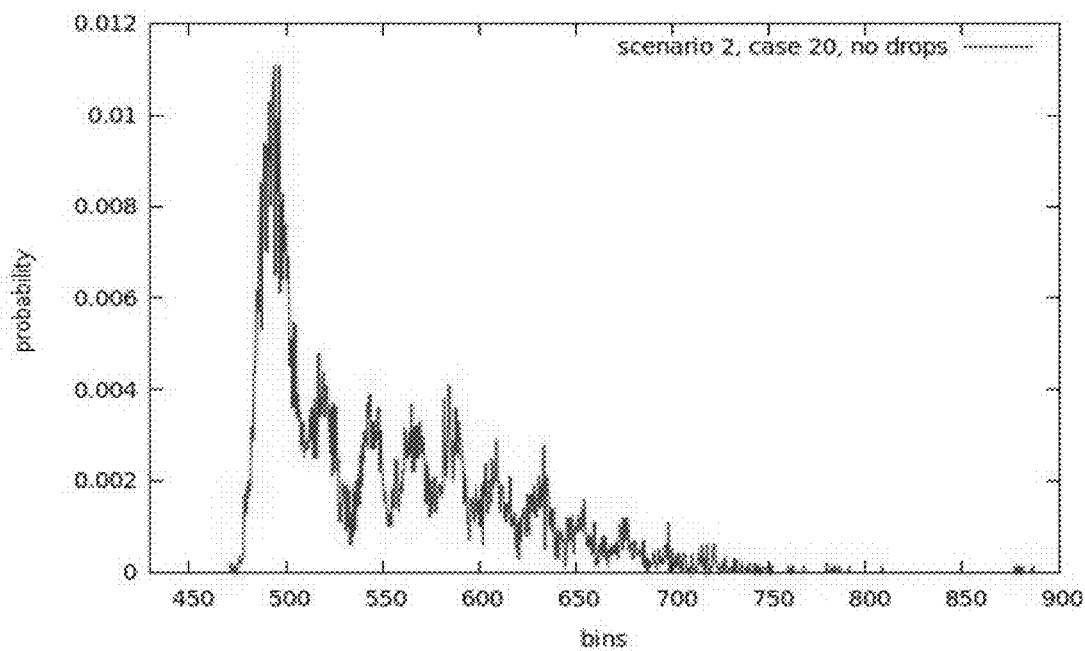
FIG. 29A is a chart of a probability density function of case 20 of scenario 2.

As beacons overlap, the probability density function of delay time changes shape significantly. For example, a pdf of case 20 of scenario 2 (each node has twenty content items) is shown in FIG. 29A. As a result of beacon overlapping, the pdf does not go down to zero between peaks. Further, the calculation described above for calculating the minimum number of beacon cycles becomes more inaccurate. Although the function calculates the minimum theoretical number, beacon overlapping may cause the minimum diffusion time to shift to higher values.

Figure 29B:
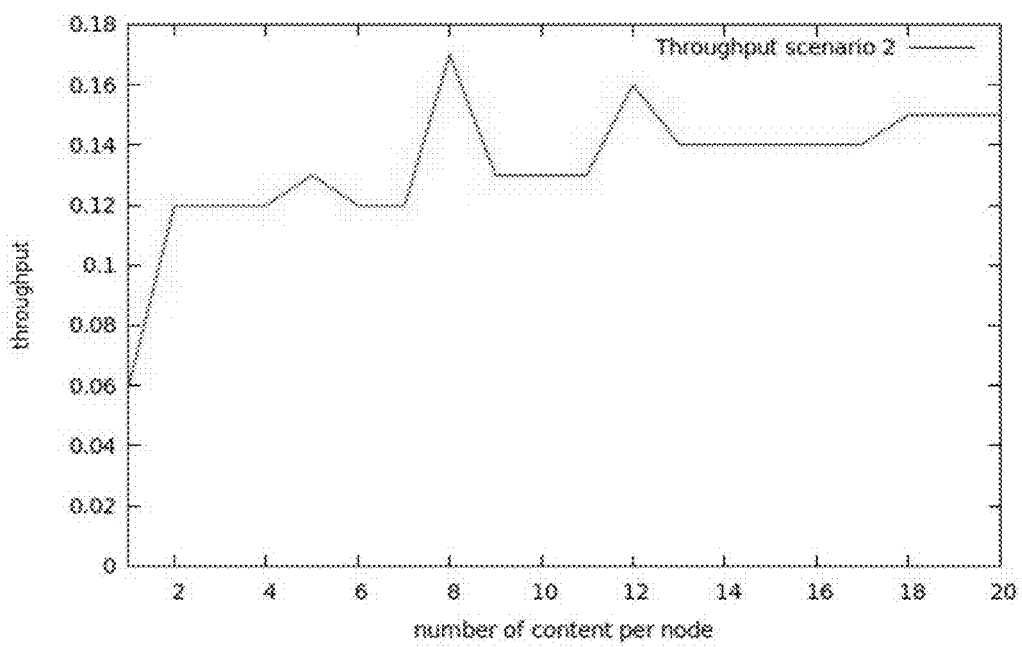
FIG. 29B is a chart of throughput with respect to number of content items transmitted according to scenario 2.

FIG. 29B graphically illustrates throughput for the cases of scenario 2. The variation in throughput values is caused by the split function. Sometimes there is no need for an additional cycle to transmit all the content in comparison to the previous case. As a result, the throughput is higher. However, when a node needs an additional cycle for just one content item, the throughput decreases. After these bigger variations, the throughput reaches an approximately constant value. The rather constant line at the end is due to the fairness of the protocol, which splits the available space in a beacon between offers and requests.

Figure 30:
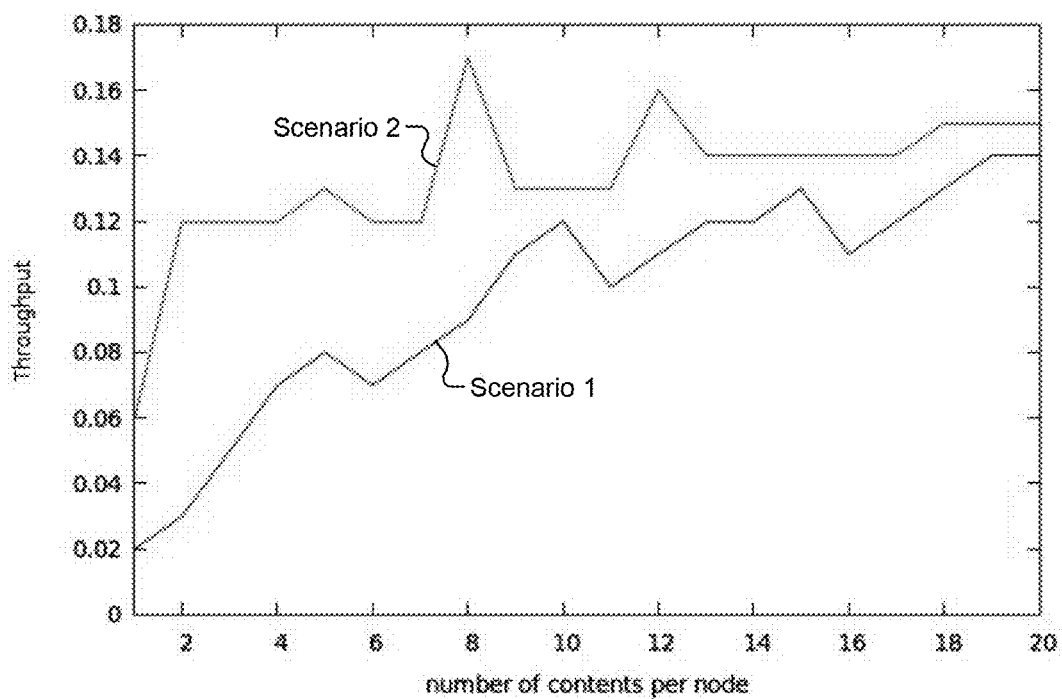
FIG. 30 is a chart comparing throughput for scenarios 1 and 2.

For comparison purposes, FIG. 30 depicts throughput for both scenarios 1 and 2. As expected, scenario 2 achieves a higher throughput than scenario 1. The network throughput is higher in scenario 1, while the per node throughput goes down. The per node throughput goes down because of how the splitting algorithm is defined. Without splitting, a node would be able to request more content, which corresponds to a faster saturation for a single node—but the network does not reach a saturated status just with selfish nodes.

Figure 31A:
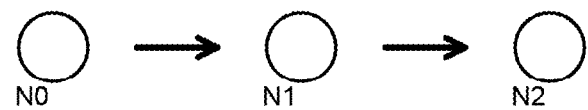
FIG. 31A is an exemplary network topology used for scenario 3.

To test how information can propagate through a linear mesh and travel through a path in the network, a three-node linear topology is presented. FIG. 31A depicts node 0 that transmits content to node 1, which in turn transmits content to node 2.

Figure 31B:
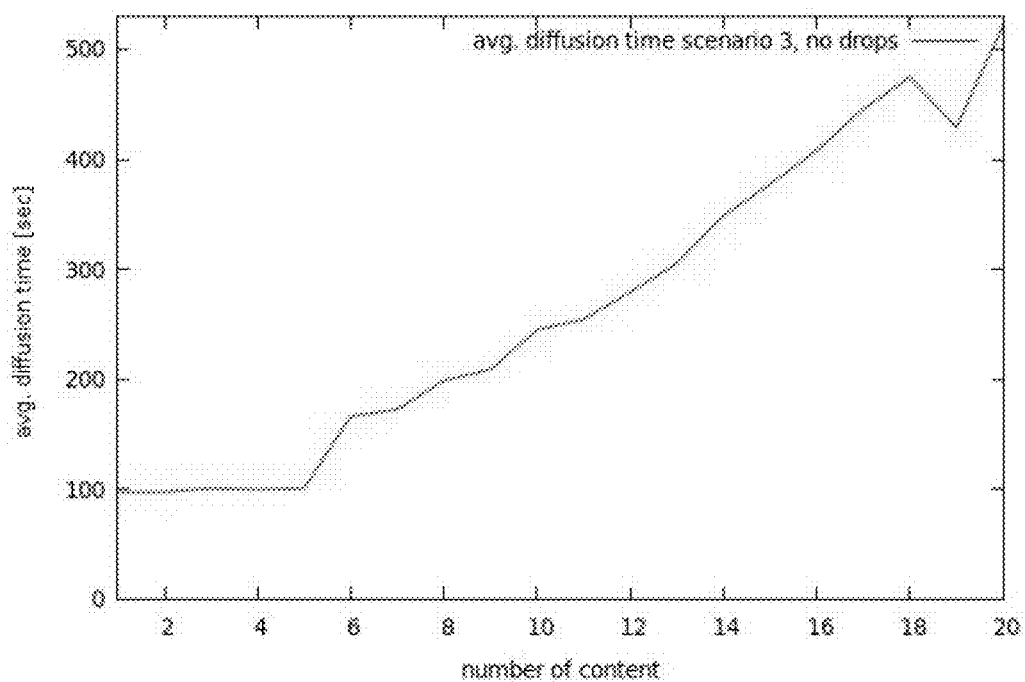
FIG. 31B is a chart of average diffusion time versus number of content items for scenario 3.

FIG. 31B illustrates average diffusion time over 20 cases (the number of content items transmitted ranges from 1 to 20) for scenario 3. In the implementation depicted in FIG. 31B, five content items can be transmitted in one beacon cycle (i=5). As a result, the average diffusion time does not increase for the first five contents, similar to the first five cases of scenario 1, depicted in FIG. 20A.

Figure 32:
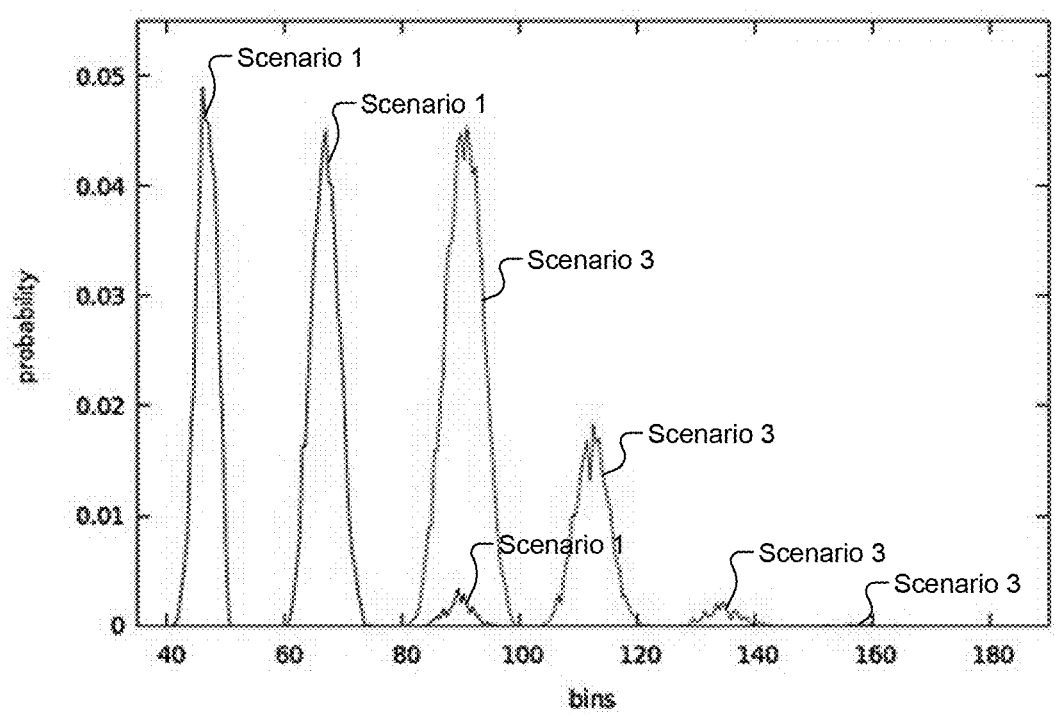
FIG. 32 is a chart comparing probability density functions for scenarios 1 and 2.

As the number of content items increases above 5, the nodes have to split available beacon space between offers and requests. This explains the approximately linear increase in the diffusion time. The discontinuity at the right side of FIG. 31B is explained by the fact that for a complete transaction, an additional cycle was necessary, a cycle that was under-utilized. Because the first five cases of scenario 3 behave similarly to the first five cases of scenario 1, FIG. 32 depicts pdfs for both scenarios 1 and 2 for the first case. Note that scenario 1 has three peaks, while scenario 2 has four peaks (a very small peak is located around 160 seconds).

Figure 33B:
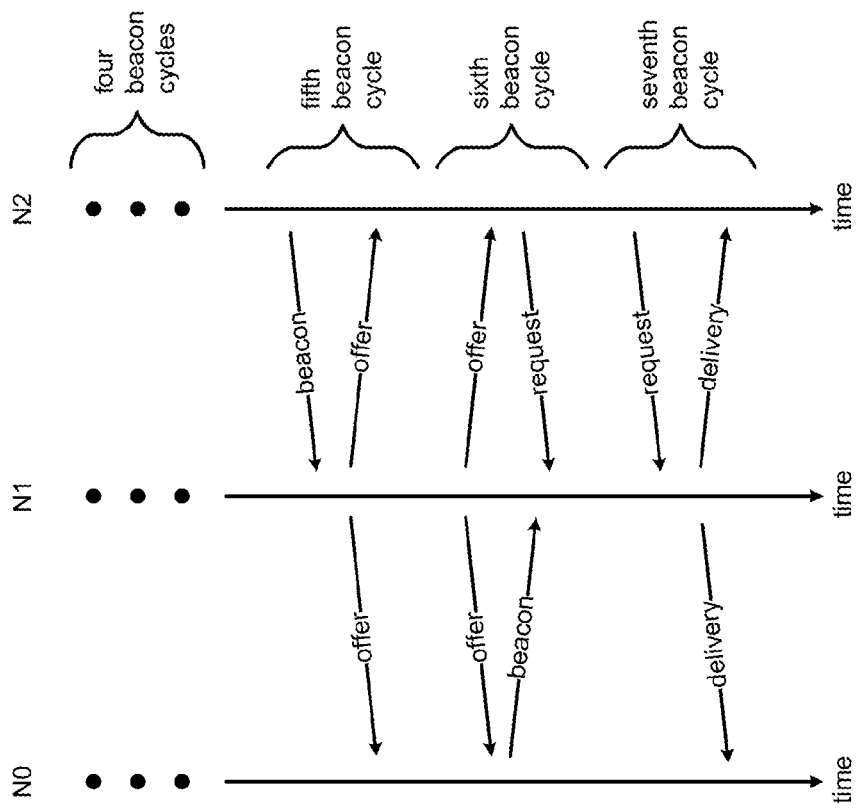
FIGS. 33A-33B are exemplary packet exchanges when 1 to 5 content items are transmitted according to scenario 3.
Figure 33A:
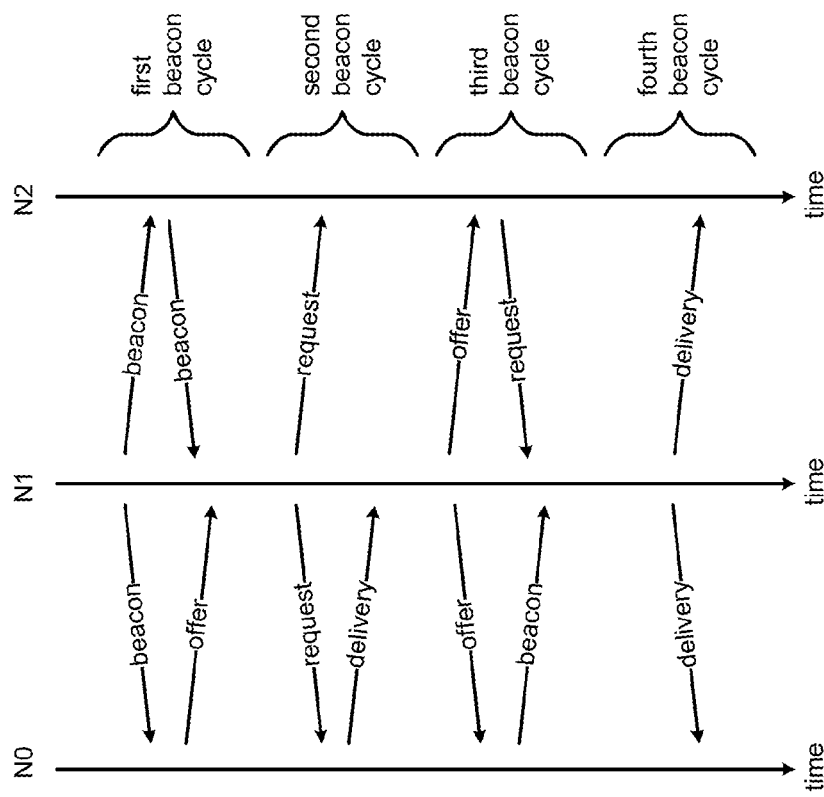

FIGS. 33A and 33B depict packets transmitted in best-case and worse-case situations, respectively, for scenario 3 case 1. In case 1, a single content item is transmitted from node 0 to node 1 and then from node 1 to node 2. A seen in FIG. 33A, the best case uses four beacon cycles. The minimum number of cycles may be determined by $$\left[chainlength \cdot \text{ceiling}\left(\frac{\text{number\_content\_items}}{\text{maximum\_space}}\right)\right] + 1.$$

Chainlength is the number of nodes in the chain from producer to end consumer, including the producer and the end consumer. This expression is similar to the expression for the minimum number of beacon cycles in scenario 1, except that in scenario 3, a factor weights the ceiling function.

Because the transaction between node 0 and node 1 is similar to scenario 1, the worst case for scenario 3 would include the worst case transaction between node 0 and node 1. The worst case transaction in scenario 1 used 4 beacon cycles. The transaction between node 1 and node 2 takes 3 more cycles in the worst case, so that the whole transaction takes 7 cycles—i.e., the interval between [7*JMIN, 7*JMAX] (140 seconds to 175 seconds).

Referring again to FIG. 32, scenario 3 case 1 can reach saturation after four, five, six, or seven cycles—the diffusion time is therefore in the range [4*JMIN, 7*JMAX] (80 seconds to 175 seconds). This explains the small fourth peak in FIG. 32 for scenario 3. Meanwhile, the fact that scenario 3 is right-shifted from scenario 1 is due to the packets having to first reach node 1 from node 0 prior to being transmitted to node 2. The minimum number of cycles for the content items to arrive at node 1 from node 0 is 2, corresponding to the right shift in scenario 3 compared to scenario 1.

Figure 34A:
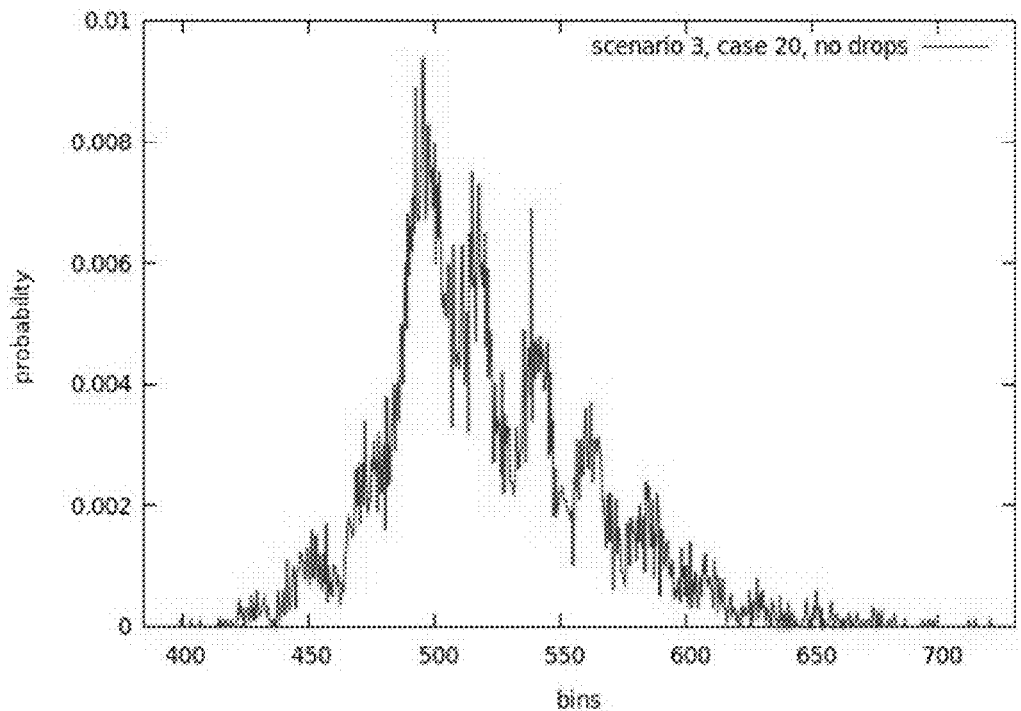
FIG. 34A is a chart of a probability density function of diffusion time for scenario 3, case 20.

FIG. 34A is a pdf of diffusion time for scenario 3 case 20 (20 content items), where the effects of beacon overlapping are plainly apparent. Instead of including a number of discrete peaks, the pdf of FIG. 34A shows a single peak with smaller peaks located in the shoulders of the single peak. With a high enough number of beacons, beacon overlapping essentially allows diffusion to end any time in the entire time span of FIG. 34A.

Figure 34B:
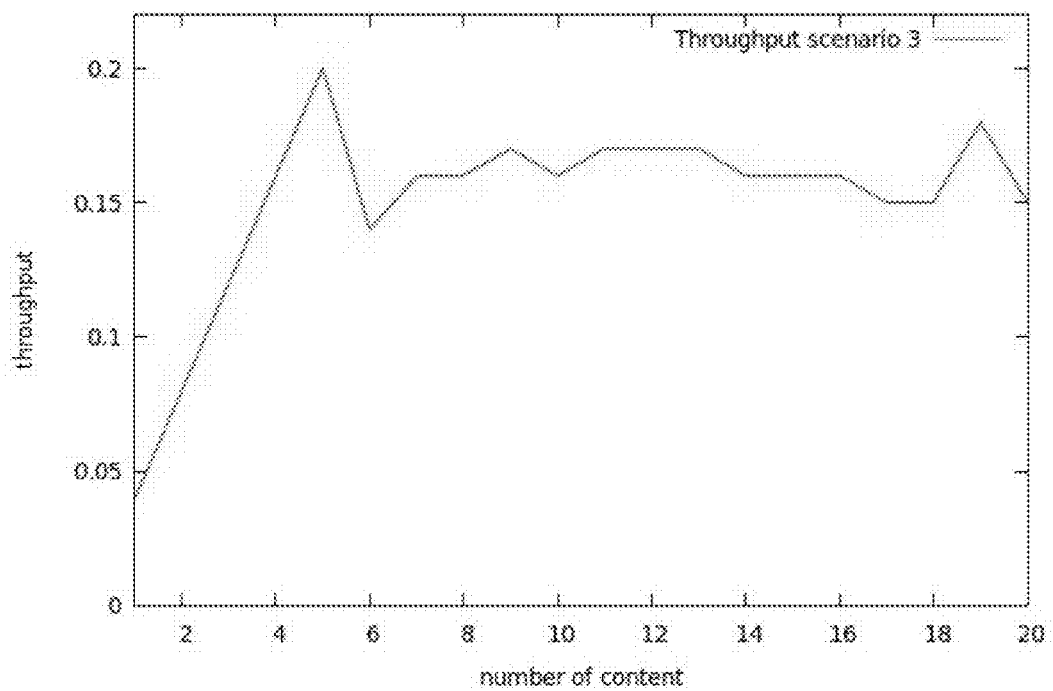
FIG. 34B is a chart of throughput with respect to number of content items transmitted according to scenario 3.

FIG. 34B depicts throughput for scenario 3 with respect to number of content items. Throughput increases up until five content items. At 6 content items, splitting between offers and requests decreases the throughput. The remaining variations in throughput have a similar explanation. Sometimes, an additional beacon cycle is needed to bring the network to a saturated state but the additional cycle is not fully utilized.

Using scenario 3, the effect on diffusion time of changing the split between offers and requests to favor offers can be studied. As above, twenty test cases are performed, starting with transmitting 1 content item through the chain and ending with transmitting 20 contents. The impact of the policy change is evident when sending a higher number of content items, so the following numbers are for case 20 (where 20 content items are transmitted). With the beacon cycle set between 20 and 25 seconds, favoring offers decreased the average diffusion time from 521 seconds to 334 seconds.

By favoring offers, nodes are acting less selfishly, offering more content than they request. As a result, newly delivered content gets forwarded faster. This means that the local diffusion times for a delivery increases while the global diffusion time decreases. Therefore, a dynamic algorithm for splitting the available space in a beacon between offers and requests may be even more efficient. For example, for larger numbers of content items, a split that favors offers may be selected, while for smaller numbers of content items, a split that favors requests may be selected. The splitting algorithm may be gradually adjusted from one extreme (e.g., strongly favoring requests) to the other (e.g., strong favoring offers) based on network conditions.

Figure 35A:
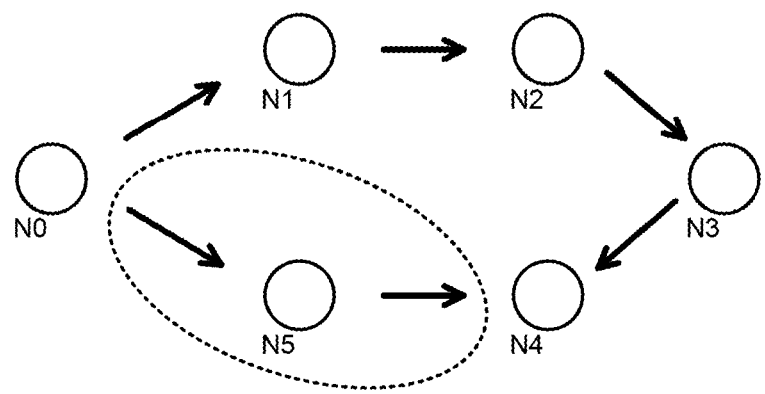
FIG. 35A is an exemplary network topology used for scenario 4.

FIG. 35A depicts an exemplary network topology used for scenario 4. Scenario 4 provides insight into the network benefit of cooperation. In FIG. 35A, nodes 0 to 4 are arranged in a five-node linear mesh, where node 0 is the source of a content item and node 4 is the end consumer (or, sink). Assume that nodes 0 to 4 share common interest vectors, and therefore content items are propagated along the mesh from node 0 to node 4.

Meanwhile, node 5, located between node 0 and node 4, does not share interests with nodes 0 and 4. Without cooperation, node 5 would not exchange any content with neither nodes 0 or 4. However, if node 5 is configured to cooperate, node 5 will receive content of interest to node 4, and such content will therefore diffuse through the network more quickly. For example only, the cooperation factor, which is equivalent to full cooperation. In other words, node 5 will express an interest in every content type in which its neighbor node 4 is interested.

Figure 35B:
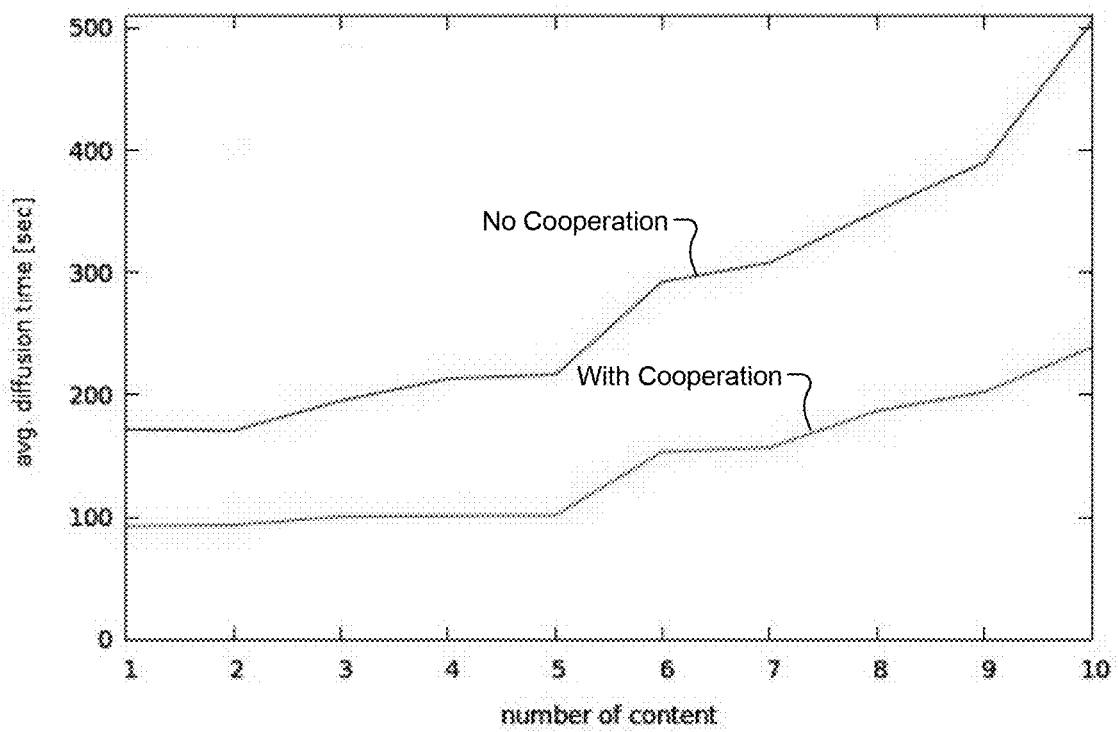
FIG. 35B is a comparison chart of average diffusion times with respect to number of content items transmitted for both cooperative and non-cooperative modes.

FIG. 35B graphically depicts average diffusion time with respect to number of content items diffused from node 0 for both cooperative and non-cooperative modes. In the non-cooperative mode, node 5 does not participate, and the diffusion time is governed by the time it takes content items to reach node 4 via nodes 1 through 3. With node 5 cooperating, FIG. 35B demonstrates that the average diffusion time is much less. This reflects the fact that diffusion time is now limited by the time it takes content items to reach node 3 via nodes 1 through 2 or via nodes 5 through 4.

As expected for an implementation where 5 content items can be transmitted in a beacon cycle, the average diffusion time with cooperation remains essentially constant for 1 through 5 content items. After 5 content items, additional beacon cycles are necessary to complete the full transaction, and splitting between offers and requests may be necessary. Without cooperation, the network is essentially equivalent to scenario 3, only with a 5-node chain instead of a 3-node chain. With cooperation, the network acts similarly to scenario 3, only with a 4-node chain instead of a 3-node chain. Because content items can reach node 3 via either node 2 or node 4 when in cooperative mode, average diffusion time would be expected to remain lower, as less optimal situations via one route are rendered moot by more optimal situations via the other route.

Figure 36:
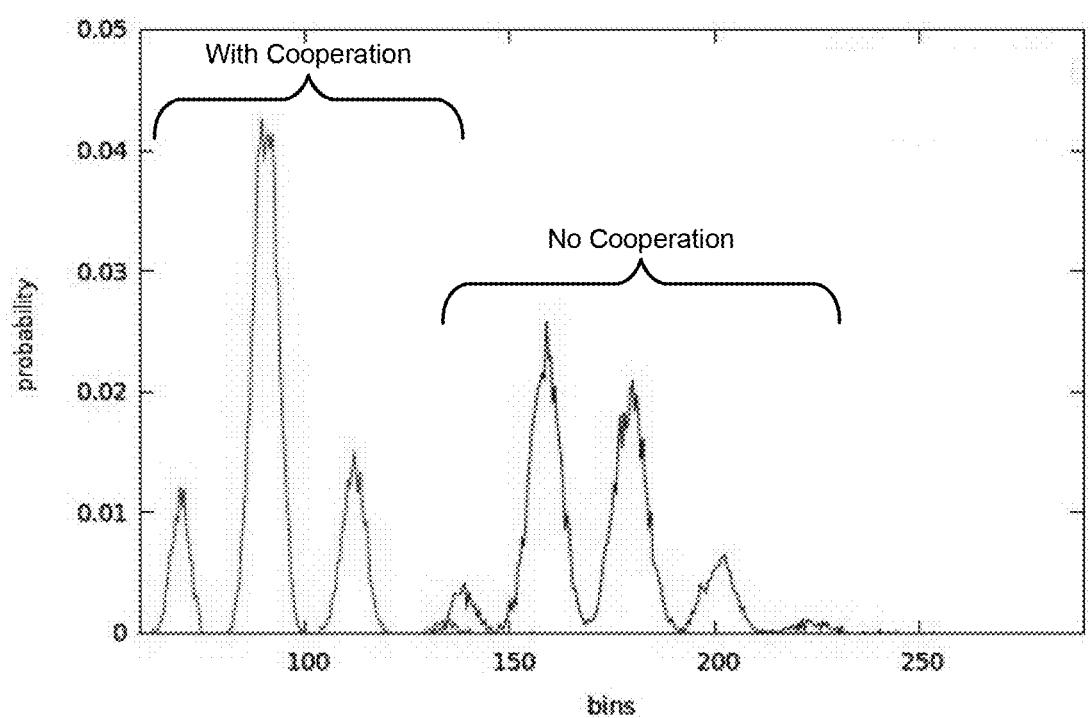
FIG. 36 depicts probability density functions of diffusion time for both cooperative and non-cooperative modes according to scenario 4, case 1.

FIG. 36 depicts pdfs of diffusion time for both cooperative and non-cooperative modes according to scenario 4, case 1. Note that due to the chain length in the non-cooperative mode, beacon overlapping has begun. For this reason, the pdf of the non-cooperative mode does not fall off to zero on either side of the peaks.

Figure 37A:
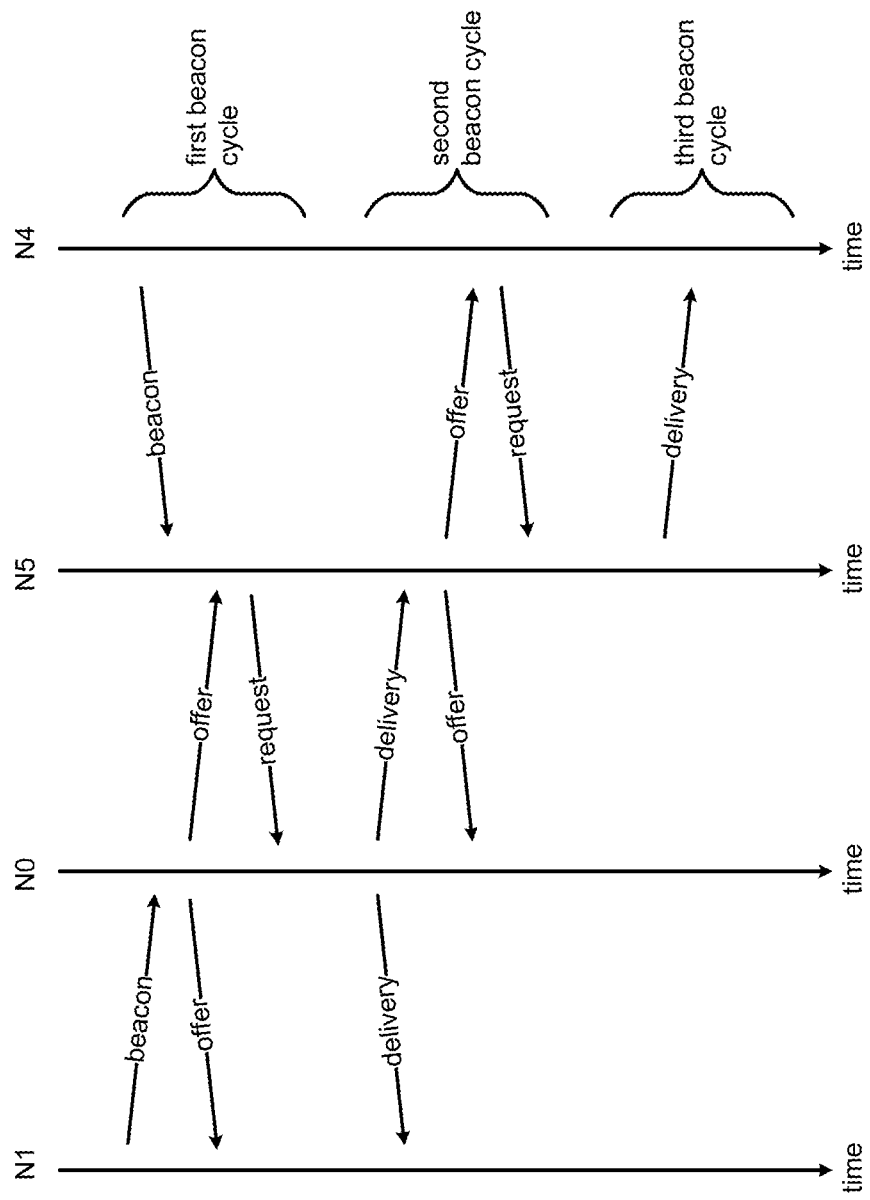
FIGS. 37A-37B are exemplary packet exchanges when 1 to 5 content items are transmitted according to scenario 4 in both cooperative and non-cooperative modes.

FIG. 37A depicts a best case for propagating content to node 4 in a cooperative mode. While node 1 is sending its interest to node 0, node 4 broadcasts its interest to node 5. Then, because β is set to 1 for node 5, node 5 includes node 4's interests into node 5's interest vector. Node 5 receives the content offer from node 0, even though the offer was based on interest expressed in the beacon from node 1. Now that node 5 is interested in the content being offered, node 5 can request the content on behalf of node 4. After the content is delivered to node 5 (as well as node 1), the transmission from node 5 to node 4 occurs as described above for scenario 1.

Figure 37B:
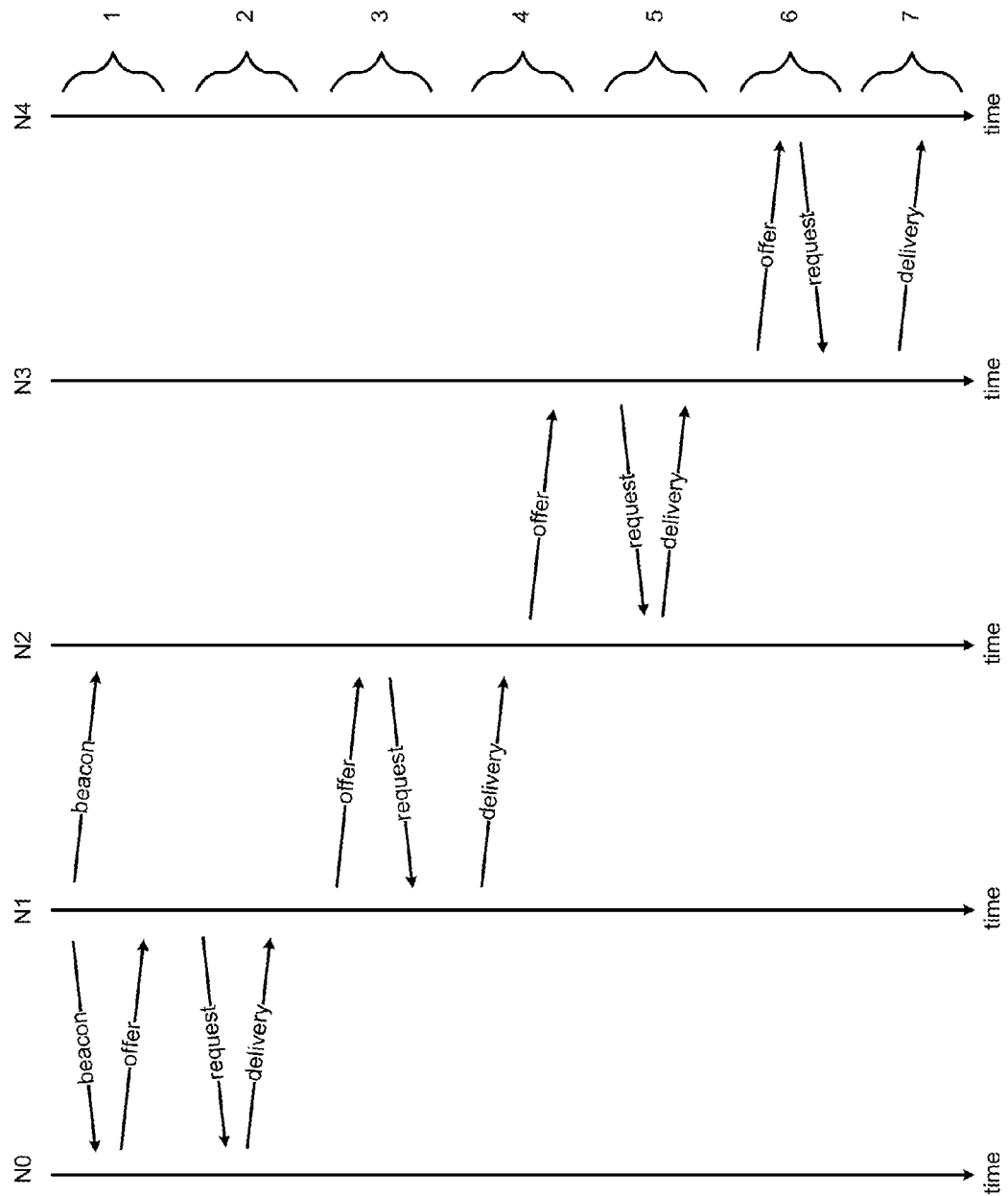

FIG. 37B depicts a best case for propagating content to node 4 when cooperation is not enabled. The content items propagate similarly to scenario 3, except that the chain length is 5 instead of 3.

Figure 38A:
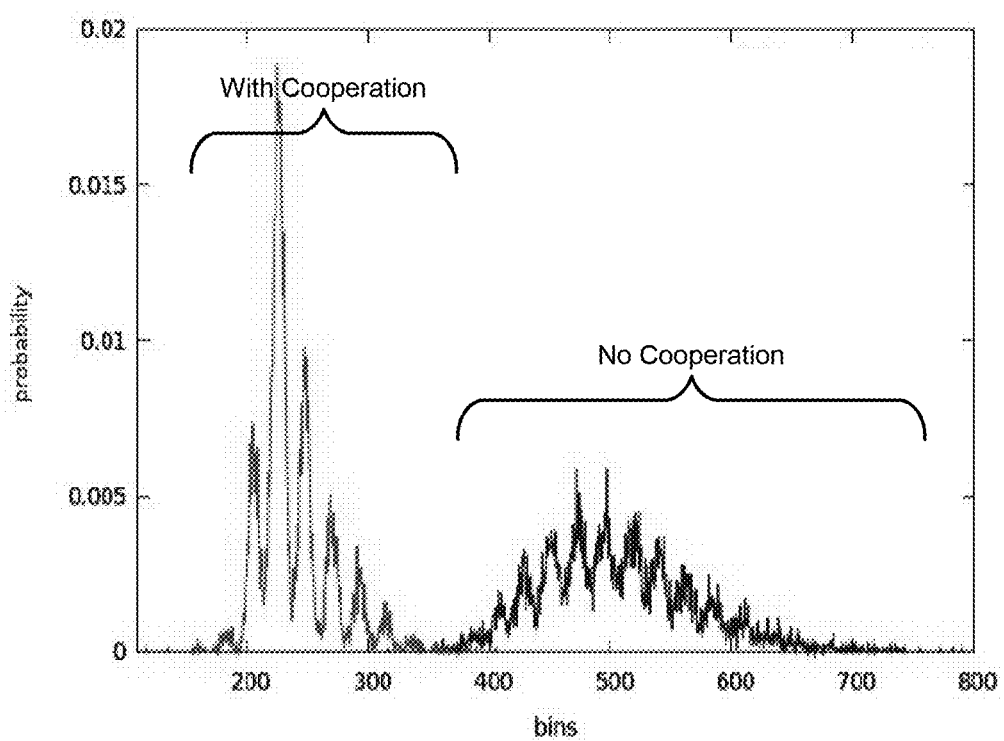
FIG. 38A is a comparison of probability density functions of average diffusion times for scenario 4, case 10 for both cooperative and non-cooperative modes.

FIG. 38A depicts pdfs for diffusion time in both cooperative and non-cooperative modes for scenario 4 case 10. Ignoring beacon overlapping, the minimum number of beacon cycles would be 7, which means the first peak of the pdf should be in the range [7*JMIN, 7*JMAX] (140 seconds to 175 seconds). However, beacon overlapping may allow the minimum number of beacon cycles to decrease slightly, though rarely. This explains the minimum diffusion time of approximately 130 seconds (for cooperative mode). Because the network topology is rather large, beacon overlapping occurs even when sending a single content item through the network. Therefore, the pdfs do not decrease to zero between peaks, as is clearly seen in FIG. 38A. Beacon overlapping and the different chain lengths explain the difference in shape between the two pdfs.

Figure 38B:
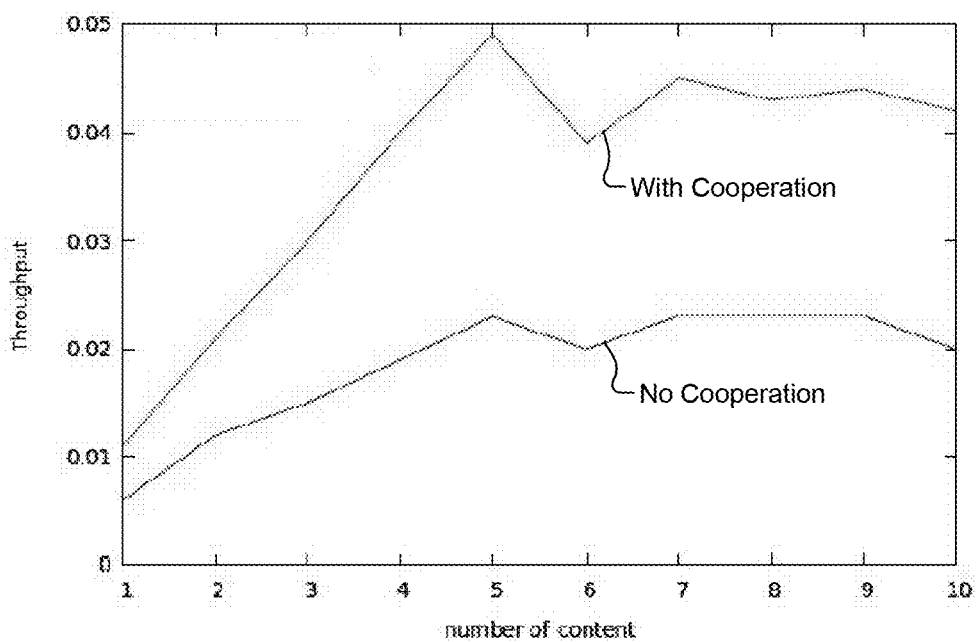
FIG. 38B is a comparison of throughputs versus number of content items transmitted for scenario 4, case 10 for both cooperative and non-cooperative modes.

FIG. 38B depicts throughput in both cooperative and non-cooperative modes for scenario 4 case 10. The similarity in the shapes of the throughput graphs is because in cooperation mode, the network acts essentially as a linear three-node chain, while in non-cooperative mode, the network acts essentially as a linear five-node chain. In this scenario, if node 5 were performing less than complete cooperation, the throughput might decrease because node 5 might not always request content on behalf of node 4.

The wireless channel used in a hardware implementation may be ZigBee, which is based on the IEEE 802.15.4-2003 standard for wireless personal area networks (WPANs). WPANs generally offer a low data rate, long battery life, and secure networking. The short-range ZigBee wireless channels can be used to create an ad hoc infrastructure, in contrast to the centralized model typically used by information publishing systems. This lessens the reliance on a fixed topology. New nodes can be set up quickly and malfunctioning nodes will not greatly hinder network performance. Further, interest driven content diffusion may lead to lower bandwidth usage.

Figure 39A:
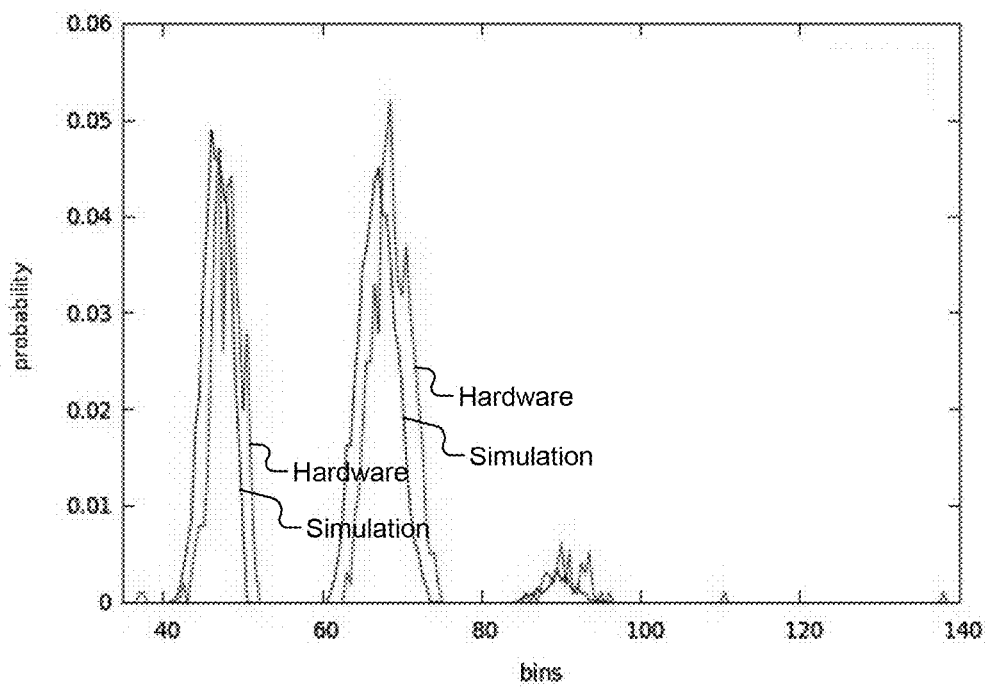
FIG. 39A is a comparison of probability density functions of average diffusion times for scenario 1, case 1 for both simulation and hardware implementation.

Simulation results can be compared to results obtained hardware implementations. FIG. 39A depicts pdfs for both the hardware implementation and the simulation. As seen in FIG. 39A, the pdfs are nearly indistinguishable. However, there is a slight shift of simulation results to the left (simulation results predicted a lower time). This occurs when the NS2 simulation does not account for the non-zero write time of the hardware devices. As a result, the hardware implementation takes slightly longer owing to the delay in writing.

Figure 39B:
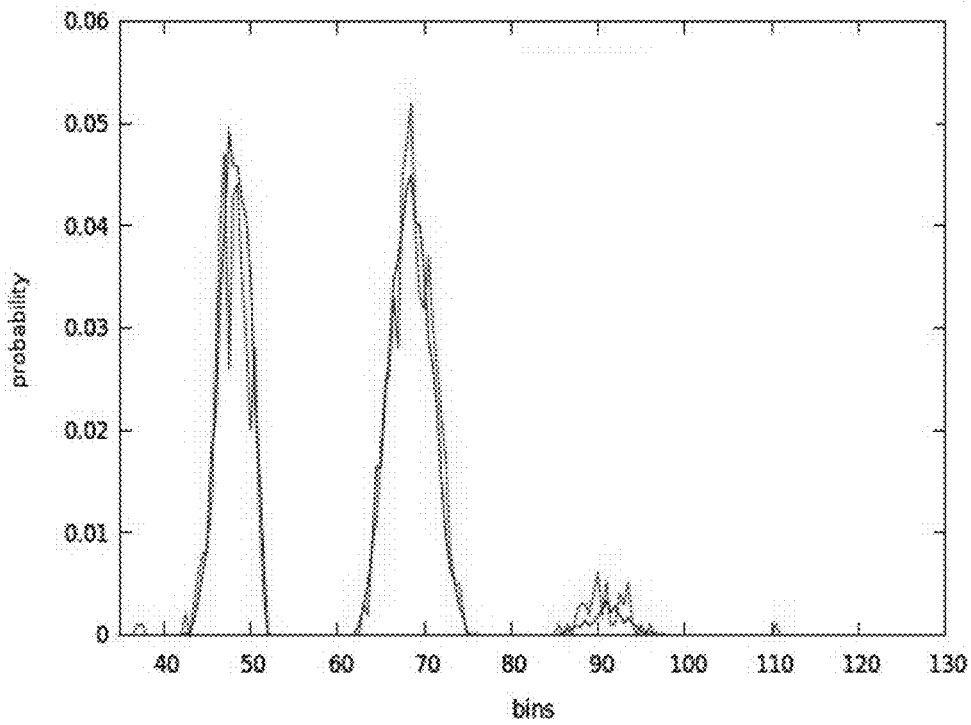
FIG. 39B is a chart of the probability density functions of FIG. 39A where the probability density function corresponding to simulation is right-shifted.

In addition, pdfs from the hardware implementation are more jagged because there are fewer iterations. In this example, the hardware implementation is tested 1,000 times for each case, while ease of simulation allowed 10,000 iterations for the NS2 simulator. The small peaks to the right of the theoretical boundaries in FIGS. 39A-39B are due to a random packet loss owing to the limitations of a real wireless channel. FIG. 39B depicts the same pdfs as FIG. 39A, with the simulation results shifted to the right (increased in time) by 1.5 seconds to compensate for physical write time.

Figure 40A:
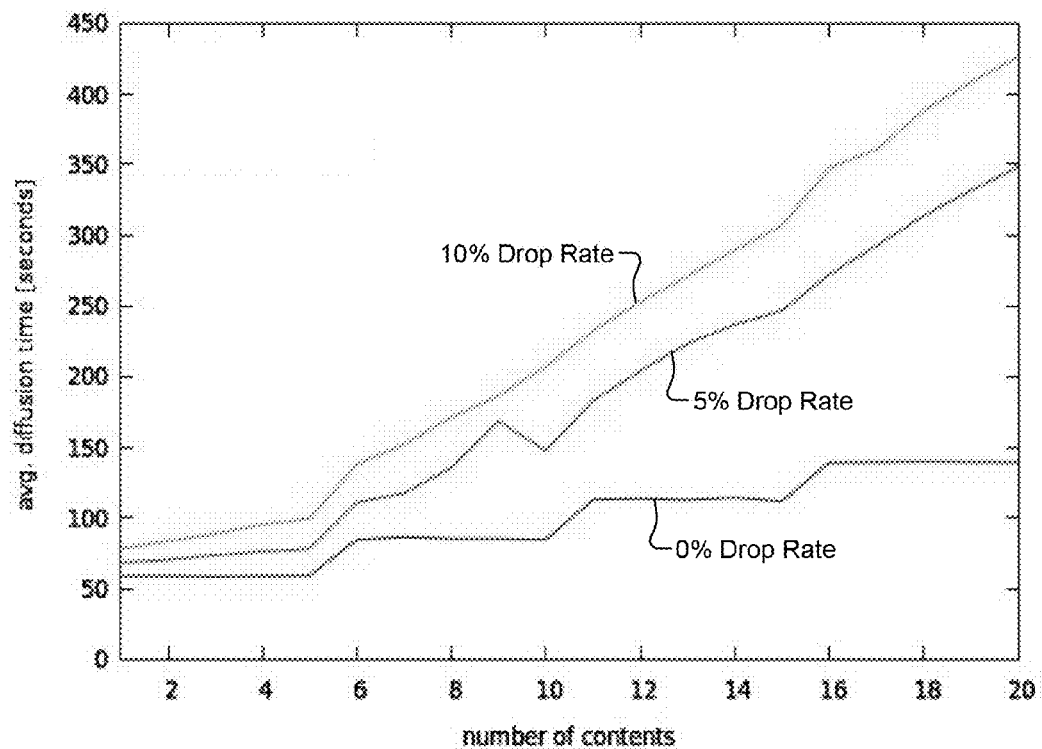
FIG. 40A is a comparison of average diffusion times versus number of content items for scenario 1 for varying drop rates.

Simulation may offer the ability to randomly enforce different drop rates (i.e., packet loss rates, such as may be caused by wireless interference). FIG. 40A depicts average diffusion time versus number of transmitted contents in scenario 1 for drop rates of 0%, 5%, and 10%. As expected, increasing the drop rate increases the average diffusion time. This is based on the fact that the random drops create situations where additional beacon cycles are necessary to complete a transaction.

Figure 40B:
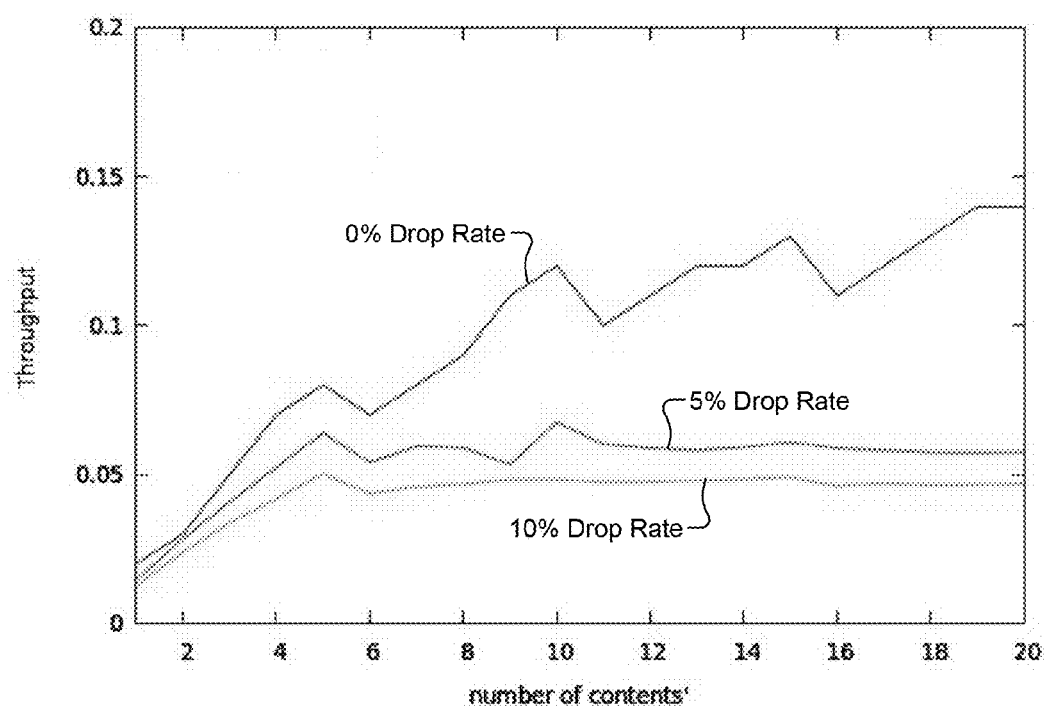
FIG. 40B is a comparison of throughput versus number of content items for scenario 1 for varying drop rates.

FIG. 40B depicts throughput versus number of transmitted contents in scenario 1 for the same drop rates of 0%, 5%, and 10%. Similarly, higher drop rates decreases throughput. The drop rate may be implemented in software by comparing a random variable in the range [0,1] to the target rate. If the random variable is higher than the target rate, the packet is considered to be transmitted successfully. Otherwise, the packet is considered to be dropped.

Referring to FIG. 40B, as the number of contents increases above 5, the traces representing 5^ and 10% drop rates remain generally parallel. This is explained by the fact that there are many cycles needed to complete a full delivery. In other words, there are many possibilities to drop packets and therefore more and more additional beacon cycles are necessary to complete the transaction. However, the additional beacon cycles can transmit more than one content. Whether the new beacon cycle has to transmit 1 content or 2 contents (for a higher drop rate), the increase in time is the same.

The foregoing description is merely exemplary in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical or.

What is claimed is:

1. A wireless apparatus comprising:
   a first mobile device including:
      a first network interface;
      a first control module maintaining a first profile; and
      a first storage module storing advertising content; and
   a second mobile device including:
      a second network interface establishing a direct peer-to-peer wireless connection with the first network interface;
      a second control module maintaining a second profile; and
      a second storage module storing advertising content,
   wherein:
      the first control module wirelessly transmits a beacon signal to the second control module, the beacon signal including a profile vector based on the first profile,
      without user intervention, the second control module selects advertising content from the second storage module based on the profile vector of the beacon signal,
      the second control module selectively wirelessly transmits the selected advertising content to the first control module,
      the first storage module stores neighbor interest vectors,
      the first network interface broadcasts a second beacon signal including a broadcast interest vector,
      the broadcast interest vector is based on the profile vector, a random interest vector, and an aggregate neighbor interest vector, and
      the aggregate neighbor interest vector is based on an average of the neighbor interest vectors.

2. The wireless apparatus of claim 1 wherein the second control module adjusts the second profile based on the profile vector of the beacon signal.

3. The wireless apparatus of claim 1 wherein the second control module wirelessly transmits an offer signal to the first control module that includes unique identifiers of the selected advertising content.

4. The wireless apparatus of claim 3 wherein the first control module:
   reviews the unique identifiers and selects and selectively adds desired ones of the unique identifiers to a request list; and
   transmits a request signal to the second control module that specifies the desired ones of the unique identifiers.

5. The wireless apparatus of claim 4 wherein the second control module transmits advertising content from the second storage module based only on the desired ones of the unique identifiers to the first control module.

6. A method of operating a wireless device, the method comprising:
   wirelessly receiving a beacon packet including an interest vector from a first node, where no packets prior to the beacon packet have been received from the first node;
   without user intervention, selecting a plurality of content items in response to the interest vector;
   wirelessly transmitting an offer packet including unique identifiers of the plurality of content items;
   wirelessly receiving a request packet identifying at least one of the plurality of content items;
   wirelessly transmitting data packets including the at least one of the plurality of content items;
   maintaining a personal interest vector;
   storing neighbor interest vectors including the interest vector from the first node; and
   broadcasting a second beacon packet including a broadcast interest vector,
   wherein the broadcast interest v for is based on the personal interest vector, a random interest vector, and an aggregate neighbor interest vector, and
   wherein the aggregate neighbor interest vector is based on an average of the neighbor interest vectors.

7. The method of claim 6 wherein the unique identifiers are selected by identifying stored content items that match the interest vector.

8. The method of claim 6 wherein the broadcast interest vector is based on a binary representation of a sum of the random interest vector, the personal interest vector, and the aggregate neighbor interest vector.

9. The method of claim 6 further comprising maintaining a record, for each neighbor, of time elapsed since a signal was last received from the neighbor, wherein the aggregate neighbor interest vector is based on a weighted average of the neighbor interest vectors, and wherein weights for the weighted average are determined based on the corresponding elapsed time.

10. The method of claim 9 further comprising deleting neighbor interest vectors whose corresponding elapsed time is greater than a predetermined threshold.

* * * * *

UNITED STATES PATENT AND TRADEMARK OFFICE
CERTIFICATE OF CORRECTION

PATENT NO. : 8,554,615 B2
APPLICATION NO. : 12/712075
DATED : October 8, 2013
INVENTOR(S) : Subir Biswas et al.

It is certified that error appears in the above-identified patent and that said Letters Patent is hereby corrected as shown below:

Title page, item (56) References Cited, Other Publications Column 1, Line 2 Delete "on line" and insert --online--,
Title page, item (56) References Cited, Other Publications Column 2, Line 6 Delete "on line" and insert --online--,
Title page 2, item (56) References Cited, Other Publications Column 2, Line 8 Delete "Cooperative" and insert --"Cooperative--,
Title page 2, item (56) References Cited, Other Publications Column 2, Line 9 Delete "Networks" and insert --Networks"--,
Title page 2, item (56) References Cited, Other Publications Column 2, Line 14 Delete "BUBBLE" and insert --"BUBBLE--,
Title page 2, item (56) References Cited, Other Publications Column 2, Line 15 Delete "Networks" and insert --Networks"--,
Title page 2, item (56) References Cited, Other Publications Column 2, Line 19 Delete "Vulkadinovic" and insert --Vukadinovic--, In the Specifications
Column 1, Line 39 Delete "laptop" and insert --laptop computer--,
Column 3, Line 39 Delete "presents", insert --presenting--,
Column 9, Line 17 After "amount", insert --of--,
Column 14, Line 31 Before "In", delete "module 758" and insert --752--,
Column 14, Line 31 After "interface", delete "758" and insert --752--,
Column 17, Line 64 Delete "(t)" and insert --(τ)--,
Column 29, Line 42 After "cycles", insert --is--,
Column 32, Line 4 Delete "A" and insert --As--,
Column 34, Line 40 After "obtained", insert --from--,
Column 35, Line 10 Delete "5^" and insert --5%--, In the Claims
Column 36, Line 37 In Claim 6, Delete "v for" and insert --vector--.

Signed and Sealed this
Twenty-eighth Day of January, 2014

Michelle K. Lee
*Deputy Director of the United States Patent and Trademark Office*